United States Patent
Shimizu et al.

(10) Patent No.: US 11,117,520 B2
(45) Date of Patent: Sep. 14, 2021

(54) DISPLAY CONTROL DEVICE, DISPLAY CONTROL SYSTEM, DISPLAY CONTROL METHOD, AND PROGRAM

(71) Applicant: JVC KENWOOD Corporation, Yokohama (JP)

(72) Inventors: Yoshiyuki Shimizu, Yokohama (JP); Ichiro Ishida, Yokohama (JP); Takuji Teruuchi, Yokohama (JP); Naoto Hayashi, Yokohama (JP); Noboru Katsumata, Yokohama (JP)

(73) Assignee: JVC KENWOOD Corporation, Yokohama (JP)

( * ) Notice: Subject to any disclaimer, the term of this patent is extended or adjusted under 35 U.S.C. 154(b) by 0 days.

(21) Appl. No.: 16/424,691

(22) Filed: May 29, 2019

(65) Prior Publication Data

US 2019/0275942 A1 Sep. 12, 2019

Related U.S. Application Data

(63) Continuation of application No. PCT/JP2018/014137, filed on Apr. 2, 2018.

(30) Foreign Application Priority Data

Jul. 31, 2017 (JP) ................................. 2017-148384
Jul. 31, 2017 (JP) .............................. JP2017-148336

(Continued)

(51) Int. Cl.
*G06T 7/10* (2017.01)
*B60R 1/00* (2006.01)
(Continued)

(52) U.S. Cl.
CPC .............. *B60R 1/002* (2013.01); *B60K 35/00* (2013.01); *B60R 1/00* (2013.01); *B60R 11/02* (2013.01);
(Continued)

(58) Field of Classification Search
CPC .......... B60R 1/00; H04N 5/262; H04N 5/265; H04N 5/247; B60K 35/00
See application file for complete search history.

(56) References Cited

U.S. PATENT DOCUMENTS

2004/0225419 A1* 11/2004 Sakai ..................... B60R 25/252
701/1
2014/0036063 A1* 2/2014 Kim ...................... G07C 5/0866
348/118
(Continued)

FOREIGN PATENT DOCUMENTS

CN       101727756      6/2010
CN       104385987      3/2015
(Continued)

OTHER PUBLICATIONS

International Search Report and Written Opinion for International Patent Application No. PCT/JP2018/014137 dated Jun. 19, 2018, 6 pages.
(Continued)

*Primary Examiner* — Dave Czekaj
*Assistant Examiner* — Berteau Joisil
(74) *Attorney, Agent, or Firm* — Amin, Turocy & Watson, LLP

(57) ABSTRACT

A display control device includes a video data acquiring unit that acquires video data from a plurality of cameras photographing a periphery of a vehicle, a bird's-eye view video generator that applies view point conversion processing and synthesis processing to the video data to generate a bird's-
(Continued)

eye view video, an adjacent information acquiring unit that acquires first obstacle information serving as information about obstacles around the vehicle when the vehicle has moved backward and entered the parked state, and second obstacle information serving as the information about the obstacles around the vehicle when the vehicle moves forward to exit the parked state, a comparing unit that compares the first obstacle information with the second obstacle information to determine whether the number of obstacles around the vehicle has increased when the vehicle exits the parked state, and a display controller.

19 Claims, 28 Drawing Sheets

(30) Foreign Application Priority Data

Jul. 31, 2017 (JP) .............................. JP2017-148385
Jul. 31, 2017 (JP) .............................. JP2017-148469

(51) Int. Cl.
| | |
|---|---|
| *G06T 7/70* | (2017.01) |
| *B60K 35/00* | (2006.01) |
| *G06K 9/00* | (2006.01) |
| *H04N 5/247* | (2006.01) |
| *H04N 5/262* | (2006.01) |
| *H04N 5/265* | (2006.01) |
| *B60R 11/04* | (2006.01) |
| *B60R 11/02* | (2006.01) |
| *H04N 7/18* | (2006.01) |

(52) U.S. Cl.
CPC .......... *B60R 11/04* (2013.01); *G06K 9/00805* (2013.01); *G06K 9/00832* (2013.01); *G06T 7/70* (2017.01); *H04N 5/247* (2013.01); *H04N 5/265* (2013.01); *H04N 5/2628* (2013.01); *H04N 7/18* (2013.01); *B60K 2370/173* (2019.05); *B60K 2370/176* (2019.05); *B60K 2370/52* (2019.05); *B60R 2300/105* (2013.01); *B60R 2300/303* (2013.01); *B60R 2300/607* (2013.01); *B60R 2300/802* (2013.01); *B60R 2300/806* (2013.01); *B60R 2300/8093* (2013.01); *G06K 2209/23* (2013.01); *G06T 2207/30192* (2013.01); *G06T 2207/30201* (2013.01); *G06T 2207/30261* (2013.01); *G06T 2207/30264* (2013.01)

(56) References Cited

U.S. PATENT DOCUMENTS

| | | | | |
|---|---|---|---|---|
| 2014/0222278 | A1* | 8/2014 | Fujita | .................... B60W 30/09 701/25 |
| 2015/0046058 | A1* | 2/2015 | Nagata | ................ B60W 30/143 701/93 |
| 2015/0145997 | A1* | 5/2015 | Terashima | ................ B60R 1/00 348/148 |

FOREIGN PATENT DOCUMENTS

| | | |
|---|---|---|
| CN | 105612568 | 5/2016 |
| JP | 2002-109697 | 4/2002 |
| JP | 2015-076645 | 4/2015 |

OTHER PUBLICATIONS

Extended European Search Report for European Patent Application No. 18840930.4 dated Jan. 22, 2020.

\* cited by examiner

US 11,117,520 B2

DISPLAY CONTROL DEVICE, DISPLAY CONTROL SYSTEM, DISPLAY CONTROL METHOD, AND PROGRAM

CROSS-REFERENCE TO RELATED APPLICATION(S)

This application is a continuation of PCT international application Ser. No. PCT/JP2018/014137 filed on Apr. 2, 2018 which designates the United States, incorporated herein by reference, and which claims the benefit of priority from Japanese Patent Application No. 2017-148336, filed on Jul. 31, 2017, Japanese Patent Application No. 2017-148384, filed on Jul. 31, 2017, Japanese Patent Application No. 2017-148385, filed on Jul. 31, 2017, and Japanese Patent Application No. 2017-148469, filed on Jul. 31, 2017, incorporated herein by reference.

BACKGROUND

1. Technical Field

The present disclosure relates to a display control device, a display control system, a display control method, and a program.

2. Description of the Related Art

Techniques are known relating to a vehicle periphery display device that displays a bird's-eye view image of a vehicle together with a vehicle image (refer to, for example, Japanese Laid-open Patent Publication No. 2015-076645 A). These techniques expand a display area of the bird's-eye view image behind the vehicle image when the vehicle has been switched from a forward movement to a backward movement.

As described in Patent Literature 1, since the bird's-eye view video of the vehicle is mainly intended for parking assistance when the vehicle enters a parking space, the bird's-eye view video is displayed when the vehicle moves backward to enter the parking space. Thus, when the vehicle moves backward to enter the parking space, a driver uses the bird's-eye view video to check a peripheral state including a blind zone in a visual sight or a mirror.

Since the bird's-eye view video is not displayed when the vehicle moves forward to exit the parking space, the driver checks the peripheral state by eyesight or using the mirror. The operation of the forward exit from the parking space is easier than that of the backward entry into the parking space. However, when a change in a peripheral checking condition, for example, a change in the peripheral state, a change of the driver, or a change in visibility has occurred, the peripheral state is, in some cases, preferably checked with the bird's-eye view video in addition to being checked by eyesight or using the mirror. When the vehicle moves forward to exit the parking space, if the bird's-eye view video is displayed regardless of the peripheral state, the bird's-eye view video is unexpectedly displayed when the bird's-eye view video need not be displayed, or the bird's-eye view video is unexpectedly displayed when a route is desired to be checked using a navigation system, for example.

It is an object of the present disclosure to at least partially solve the problems in the conventional technology.

SUMMARY

A display control device according to the present disclosure includes a video data acquiring unit configured to acquire video data from a plurality of photographing units configured to photograph a periphery of a vehicle, a bird's-eye view video generator configured to apply view point conversion processing and synthesis processing to the video data acquired by the video data acquiring unit to generate a bird's-eye view video, an information acquiring unit configured to acquire first information regarding a peripheral checking condition for the vehicle when the vehicle has moved backward and entered a parked state and second information regarding the peripheral checking condition for the vehicle when the vehicle moves forward to exit the parked state, a comparing unit configured to compare the first information with the second information to acquire a change in the peripheral checking condition between when the vehicle entered the parked state and when the vehicle exits the parked state, and a display controller configured to display the bird's-eye view video generated by the bird's-eye view video generator on a display unit when the vehicle exits the parked state, when the comparing unit determines that the peripheral checking condition has changed when the vehicle exits the parked state.

A display control system according to the present disclosure includes the display control device as described above, and at least either of a plurality of photographing units from which the video data acquiring unit acquires video data and a display unit on which the display controller displays a bird's-eye view video.

A display control method according to the present disclosure includes a video data acquiring step of acquiring video data from a plurality of photographing units that photograph a periphery of a vehicle, a bird's-eye view video generating step of applying view point conversion processing and synthesis processing to the video data acquired at the video data acquiring step to generate a bird's-eye view video, an adjacent information acquiring step of acquiring first information regarding a peripheral checking condition for the vehicle when the vehicle has moved backward and entered a parked state and second information regarding the peripheral checking condition for the vehicle when the vehicle moves forward to exit the parked state, a comparing step of comparing the first information with the second information to acquire a change in the peripheral checking condition between when the vehicle entered the parked state and when the vehicle exits the parked state, and a display control step of displaying the bird's-eye view video generated at the bird's-eye view video generating step on a display unit when the vehicle exits the parked state, when the comparing step determines that the peripheral checking condition has changed when the vehicle exits the parked state.

A non-transitory computer readable recording medium storing therein a program according to the present disclosure causes a computer that operates as a display control device to execute a video data acquiring step of acquiring video data from a plurality of photographing units that photograph a periphery of a vehicle, a bird's-eye view video generating step of applying view point conversion processing and synthesis processing to the video data acquired at the video data acquiring step to generate a bird's-eye view video, an adjacent information acquiring step of acquiring first information regarding a peripheral checking condition for the vehicle when the vehicle has moved backward and entered a parked state and second information regarding the peripheral checking condition for the vehicle when the vehicle moves forward to exit the parked state, a comparing step of comparing the first information with the second information to acquire a change in the peripheral checking condition between when the vehicle entered the parked state and when the vehicle exits the parked state, and a display control step of displaying the bird's-eye view video generated at the bird's-eye view video generating step on a display unit when the vehicle exits the parked state, when the comparing step determines that the peripheral checking condition has changed when the vehicle exits the parked state.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

The following describes in detail embodiments of a display control device 40, a display control system 1, a display control method, and a program according to the present disclosure, with reference to the accompanying drawings. The following embodiments will not limit the present disclosure.

First Embodiment

Figure 1:
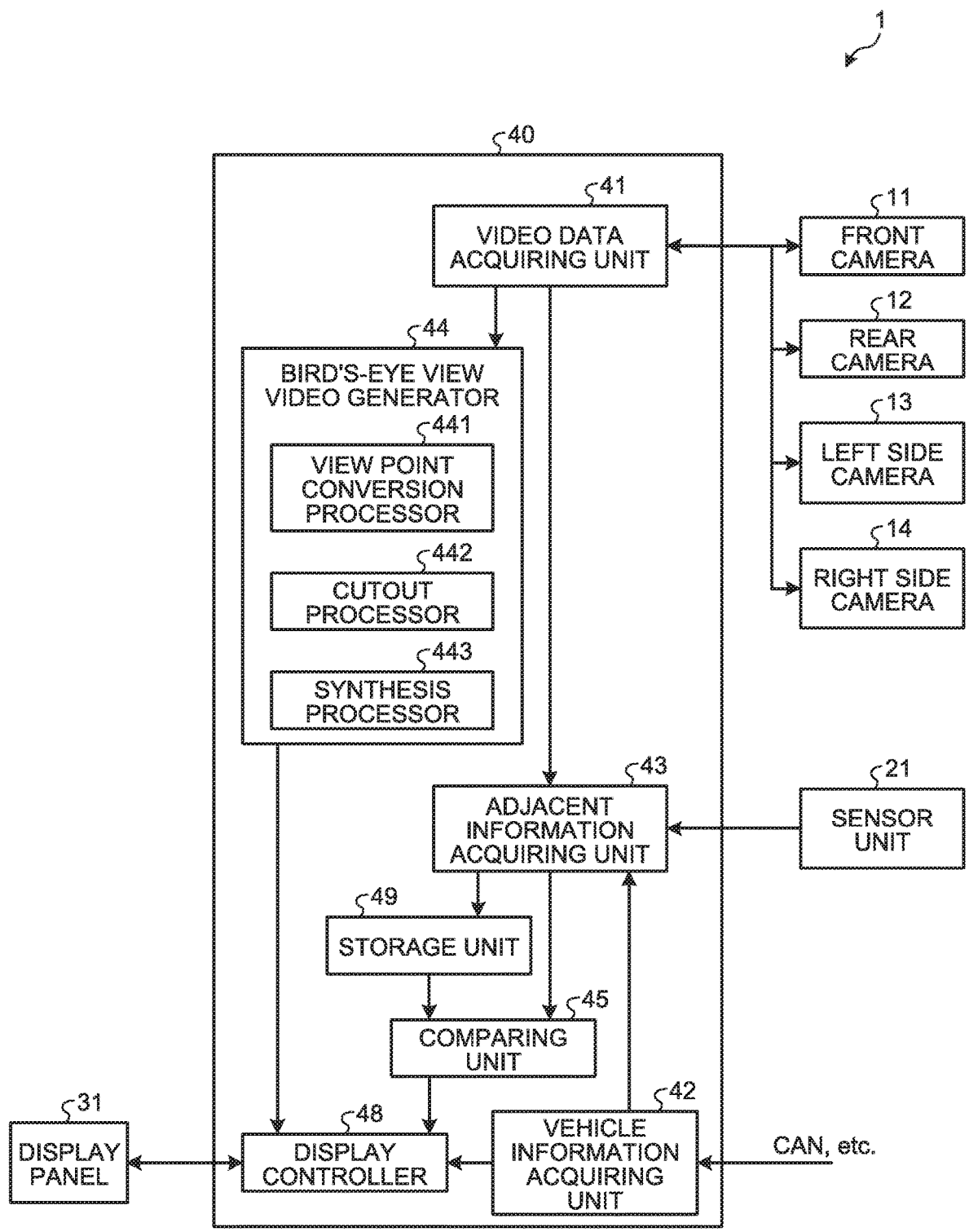
FIG. 1 is a block diagram illustrating a configuration example of a display control system according to a first embodiment of the present disclosure.
Figure 2:
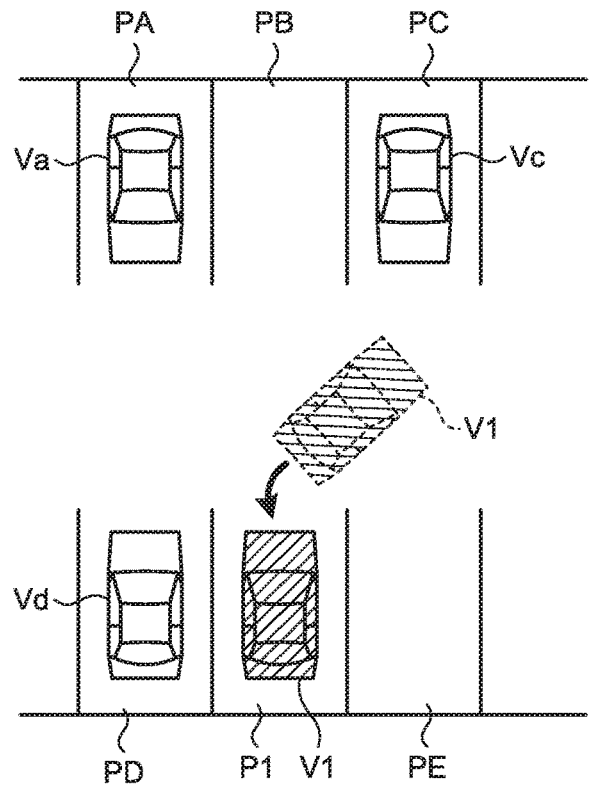
FIG. 2 is a diagram explaining parking spaces, and illustrates a state in which a vehicle enters one of the parking spaces.
Figure 3:
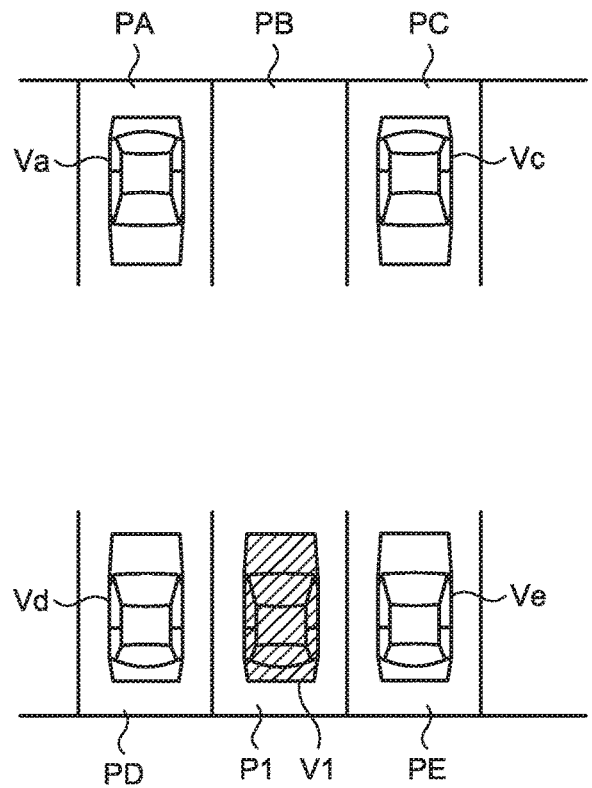
FIG. 3 is a diagram explaining the parking spaces, and illustrates a state in which the vehicle exits the parking space.

FIG. 1 is a block diagram illustrating a configuration example of the display control system according to a first embodiment of the present disclosure. FIG. 2 is a diagram explaining parking spaces, and illustrates a state in which a vehicle enters one of the parking spaces. FIG. 3 is a diagram explaining the parking spaces, and illustrates a state in which the vehicle exits the parking space. The display control system 1 appropriately displays a bird's-eye view video according to a change in a peripheral state (peripheral checking condition) when the vehicle exits the parking space. The display control system 1 is mounted on a vehicle V1. The display control system 1 may be placed on the vehicle V1, and in addition, may be a portable device usable on the vehicle V1.

In the present embodiment, the vehicle V1 is parked in a parking space P1. A parking space PA, a parking space PB, and a parking space PC are arranged side by side face to face with the parking space P1. The parking space PB faces the front of the parking space P1 with a pathway interposed therebetween. The parking space PA is located at the immediate left of the parking space PB as viewed from the vehicle V1. The parking space PC is located at the immediate right of the parking space PB as viewed from the vehicle V1. A parking space PD is located at the immediate left of the parking space P1. A parking space PE is located at the immediate right of the parking space P1.

The display control system 1 will be described using FIG. 1. The display control system 1 includes a front camera (photographing unit) 11, a rear camera (photographing unit) 12, a left side camera (photographing unit) 13, a right side camera (photographing unit) 14, a sensor unit (obstacle detector) 21, a display panel (display unit) 31, and the display control device 40.

The front camera 11 is a bird's-eye view video camera. The front camera 11 is disposed on the front section of the vehicle V1, and photographs a periphery around the front section of the vehicle V1. The front camera 11 photographs a photographing region of, for example, approximately 180 degrees. The photographing region includes a wide region extending in the front direction of the vehicle V1 from a display region of a bird's-eye view video 100. The front camera 11 outputs the captured video to a video data acquiring unit 41 of the display control device 40.

The rear camera 12 is a bird's-eye view video camera. The rear camera 12 is disposed behind the vehicle V1, and photographs a periphery around the rear of the vehicle V1. The rear camera 12 photographs a photographing region of, for example, approximately 180 degrees. The photographing region includes a wide region in the rear direction of the vehicle V1 from the display region of the bird's-eye view video 100. The rear camera 12 outputs the captured video to the video data acquiring unit 41 of the display control device 40.

The left side camera 13 is a bird's-eye view video camera. The left side camera 13 is disposed on the left side of the vehicle V1, and photographs a periphery around the left side of the vehicle V1. The left side camera 13 photographs a photographing region of, for example, approximately 180 degrees. The photographing region includes a wide region in the left side direction of the vehicle V1 from the display region of the bird's-eye view video 100. The left side camera 13 outputs the captured video to the video data acquiring unit 41 of the display control device 40.

The right side camera 14 is a bird's-eye view video camera. The right side camera 14 is disposed on the right side of the vehicle V1, and photographs a periphery around the right side of the vehicle V1. The right side camera 14 photographs a photographing region of, for example, approximately 180 degrees. The photographing region includes a wide region in the right side direction of the vehicle V1 from the display region of the bird's-eye view video 100. The right side camera 14 outputs the captured video to the video data acquiring unit 41 of the display control device 40.

The front camera 11, the rear camera 12, the left side camera 13, and the right side camera 14 photograph in all directions around the vehicle V1.

The sensor unit 21 includes a plurality of sensors mounted around the vehicle V1. The sensor unit 21 can detect obstacles present near the vehicle V1. In the present embodiment, the sensor unit 21 detects, as the obstacles present near the vehicle V1, adjacent vehicles present in the parking spaces PA to PE adjacent to the parking space P1 serving as a parking space into which the vehicle V1 enters. In the present embodiment, a front center sensor, a front left sensor, a front right sensor, a rear center sensor, a rear left sensor, a rear right sensor, a left side sensor, and a right side sensor are disposed as the sensor unit 21. Since the sensors are configured in the same way, the front center sensor will be described, and the other sensors will not be described.

The front center sensor is disposed on the front central portion of the vehicle V1, and detects an obstacle in the front center area on the vehicle V1. In the present embodiment, the front center sensor detects an adjacent vehicle present in the parking space PB. The front center sensor is, for example, an infrared sensor, an ultrasonic sensor, or a millimeter wave radar, or may be configured as a combination of these sensors. The front center sensor detects an adjacent vehicle at a distance of, for example, within approximately 5 m from the vehicle V1. The front center sensor detects an adjacent vehicle in a region of, for example, approximately 40 degrees around a central portion of the sensor in a vertical view. The detection region of the front center sensor may overlap portions of detection regions of the front left sensor and the front right sensor. The front center sensor outputs obstacle information serving as a detection result indicating whether an adjacent vehicle is present to an adjacent information acquiring unit (information acquiring unit) 43 of the display control device 40.

The sensor unit 21 described above can detect the adjacent vehicles present in all directions around the vehicle V1. In the present embodiment, detection results of the sensor unit 21 allow the detection of an adjacent vehicle in at least one of the right side and left side areas, the front right and front left areas, and the front area on the vehicle V1. In more detail, the detection results of the sensor unit 21 allow the detection of the adjacent vehicles present in the parking spaces PA to PE. In more detail, which of the parking spaces has been detected containing the adjacent vehicles is identified by sensors that have detected the adjacent vehicles and by a horizontal region of presence of the adjacent vehicles detected by the sensors; the sensors and the horizontal region of presence being included in the detection results.

The display panel 31 is, as an example, a display device commonly used by another system including a navigation system. The display panel 31 is a monitor for checking the periphery of the vehicle V1 at required times. The display panel 31 can have various forms as long as being allowed to check the periphery of the vehicle V1. An example of the display panel may use an electronic rearview mirror or may have a function of an instrument panel. The display panel 31 is a display including, for example, a liquid crystal display (LCD) or an organic electroluminescent (EL) display. The display panel 31 is disposed in a position easily visible from a driver. In the present embodiment, the display panel 31 is disposed on a dashboard, the instrument panel, or a center console in front of the driver of the vehicle V1. The display panel 31 displays the bird's-eye view video 100 of the vehicle V1 based on a video signal output from a display controller 48 of the display control device 40.

The display control device 40 provides information for assisting the parking. In more detail, the display control device 40 generates and displays the bird's-eye view video 100 when the vehicle enters the parked state and when the vehicle exits the parked state.

The display control device 40 is an arithmetic processing unit (controller) constituted by, for example, a central processing unit (CPU) and a processor for video processing. The display control device 40 loads in a memory a program stored in a storage unit 49, and executes instructions included in the program. The display control device 40 includes the video data acquiring unit 41, a vehicle information acquiring unit 42, an adjacent information acquiring unit 43, a bird's-eye view video generator 44, a comparing unit 45, the display controller 48, and the storage unit 49 serving as an internal memory. The display control device 40 may be constituted by one or a plurality of devices.

The video data acquiring unit 41 acquires the video data obtained by photographing the periphery of the vehicle V1. In more detail, the video data acquiring unit 41 acquires the video data output by the front camera 11, the rear camera 12, the left side camera 13, and the right side camera 14. The video data acquiring unit 41 outputs the acquired video data to the adjacent information acquiring unit 43 and the bird's-eye view video generator 44.

The vehicle information acquiring unit 42 acquires vehicle information, such as gear shift operation information of the vehicle V1, that serves as a parking start trigger or a parking end trigger serving as a parking assist display trigger from, for example, a Controller Area Network (CAN) and various sensors sensing states of the vehicle V1. The vehicle information acquiring unit 42 acquires, as the vehicle information, operation information about steering operations performed when the vehicle is parked from, for example, the CAN and the various sensors. The vehicle information acquiring unit 42 outputs the acquired vehicle information to the adjacent information acquiring unit 43 and the display controller 48.

The adjacent information acquiring unit 43 acquires first obstacle information (first information) when the vehicle V1 has moved backward and entered the parked state and second obstacle information (second information) when the vehicle V1 moves forward from the parked state to exit the parked state. In more detail, when the vehicle V1 has moved backward and entered the parked state, the adjacent information acquiring unit 43 acquires the first obstacle information from the sensor unit 21. The adjacent information acquiring unit 43 stores the first obstacle information acquired when the vehicle V1 enters the parked state in the storage unit 49. When the vehicle V1 moves forward from the parked state to exit the parked state, the adjacent information acquiring unit 43 acquires the second obstacle information from the sensor unit 21. The determination that the vehicle V1 has moved backward and entered the parked state and the determination that the vehicle V1 moves forward to exit the parked state are made based on, for example, the gear shift operation information and engine on/off information of the vehicle V1 acquired from the vehicle information acquiring unit 42. The adjacent information acquiring unit 43 outputs adjacent vehicle information acquired when the vehicle V1 exits the parked state to the comparing unit 45.

The first obstacle information is information about obstacles around the vehicle V1 when the vehicle V1 has moved backward and entered the parked state. In the present embodiment, the first obstacle information is information including whether an adjacent vehicle is present in each of the parking spaces PA to PE when the vehicle V1 has moved backward and entered the parked state.

The second obstacle information is information about obstacles around the vehicle V1 when the vehicle V1 moves forward from the parked state to exit the parked state. In the present embodiment, the second obstacle information is information including whether an adjacent vehicle is present in each of the parking spaces PA to PE when the vehicle V1 moves forward from the parked state to exit the parked state.

The fact that the vehicle V1 has moved backward and entered the parked state is detected, for example, based on the fact that, after the shift position has been placed into the "reverse" position and the vehicle V1 has moved backward, the shift position is brought into the "parking" position or the "neutral" position, or the fact that the speed has become and remains zero for a time of 5 seconds or longer, or based on a stop of the engine or an operation of the parking brake or the foot brake. Alternatively, the fact that the vehicle V1 has moved backward and entered the parked state may be detected based on any trigger, such as a user operation.

The fact that the vehicle V1 moves forward from the parked state to exit the parked state is detected, for example, based on the fact that the shift position is in the "parking" or "neutral" position, or the fact that the speed remains zero for a time of 5 seconds or longer, or the fact that the engine is started from the parked state in which the engine is stopped or the parking brake or the foot brake is operated, or the fact that the shift position is brought into the "drive" position, or the fact that the parking brake or the foot brake is released. Alternatively, the fact that the vehicle V1 moves forward to exit the parked state may be detected based on any trigger, such as a user operation.

The bird's-eye view video generator 44 applies view point conversion processing and synthesis processing to the peripheral video data acquired by the video data acquiring unit 41 to generate the bird's-eye view video 100. The bird's-eye view video generator 44 generates the bird's-eye view video 100 when the vehicle V1 enters the parked state. When the vehicle V1 moves forward to exit the parked state, if the peripheral state of the vehicle V1 is determined to have changed from when the vehicle V1 entered the parked state, the bird's-eye view video generator 44 generates the bird's-eye view video 100. In the present embodiment, if the comparing unit 45 determines that the number of adjacent vehicles has increased when the vehicle V1 exits the parked state, the bird's-eye view video generator 44 generates the bird's-eye view video 100. The bird's-eye view video generator 44 outputs the generated bird's-eye view video 100 to the display controller 48. The bird's-eye view video generator 44 includes a view point conversion processor 441, a cutout processor 442, and a synthesis processor 443.

The view point conversion processor 441 applies the view point conversion processing to the peripheral video data acquired by the video data acquiring unit 41 such that the vehicle V1 appears to be looked down on from above. In more detail, the view point conversion processor 441 generates a video converted through the view point conversion processing based on the peripheral video data photographed by the front camera 11, the rear camera 12, the left side camera 13, and the right side camera 14. The method of the view point conversion processing may be any know method, and is not limited to any method. The view point conversion processor 441 outputs the peripheral video data converted through the view point conversion processing to the cutout processor 442.

The cutout processor 442 performs cutout processing to cut out a video in a predetermined region from the peripheral video data converted through the view point conversion processing. What region is to be cut out as a cutout region has been registered and stored in advance. The cutout processor 442 outputs video data of the video cut out through the cutout processing to the synthesis processor 443.

The synthesis processor 443 performs the synthesis processing to synthesize the video data cut out through the cutout processing. The synthesis processor 443 generates the bird's-eye view video 100 that displays a vehicle icon 110 in the synthesized video.

Figure 4:
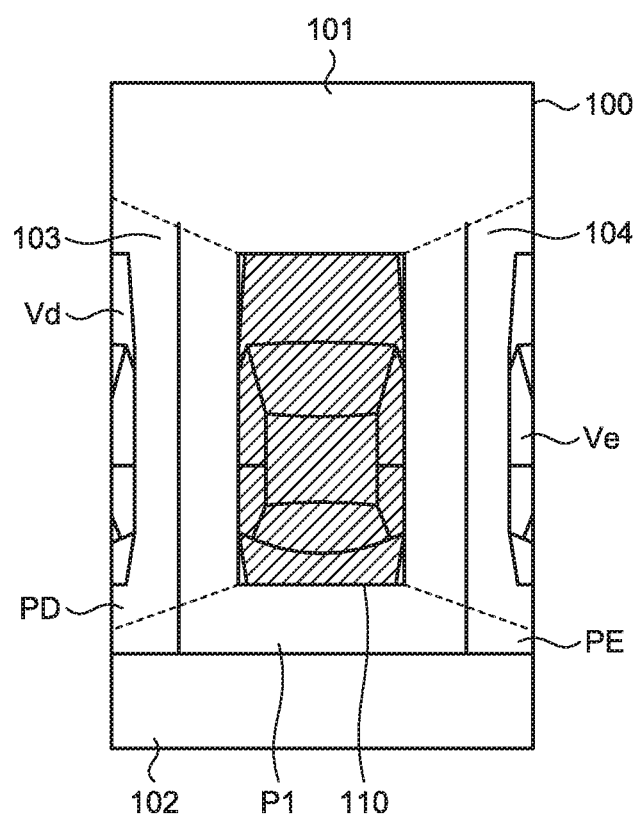
FIG. 4 is a diagram illustrating an example of a bird's-eye view video generated by a display control device of the display control system according to the first embodiment.

The bird's-eye view video 100 will be described using FIG. 4. FIG. 4 is a diagram illustrating an example of the bird's-eye view video generated by the display control device of the display control system according to the first embodiment. The bird's-eye view video 100 displays a region of approximately 2 m from the vehicle V1. The display region of the bird's-eye view video 100 includes an adjacent vehicle Vd present in the parking space PD and an adjacent vehicle Ve present in the parking space PE. The bird's-eye view video 100 includes a front video 101, a rear video 102, a left side video 103, and a right side video 104, and also the vehicle icon 110 located in a central portion surrounded by the front video 101, the rear video 102, the left side video 103, and the right side video 104. The vehicle icon 110 indicates the position and the direction of the vehicle V1. The vehicle icon 110 is disposed on the central portion with the front-rear direction thereof being parallel to the front-rear direction of the bird's-eye view video 100.

Referring beck to FIG. 1, the comparing unit 45 compares the first obstacle information with the second obstacle information to determine whether the number of obstacles to the vehicle V1 has increased when the vehicle V1 exits the parked state. In the present embodiment, the comparing unit 45 compares the first obstacle information with the second obstacle information to determine whether the number of adjacent vehicles has increased when the vehicle V1 exits the parked state. In more detail, the comparing unit 45 compares existence or nonexistence of vehicles in adjacent parking spaces when the vehicle V1 entered the parked state with existence or nonexistence of vehicles in the adjacent parking spaces when the vehicle V1 exits the parked state, and determines that the number of adjacent vehicles has increased if no adjacent vehicle is detected in the first obstacle information and a parking space with an adjacent vehicle detected is present in the second obstacle information.

When the vehicle V1 enters the parked state, the display controller 48 displays the bird's-eye view video 100 generated by the bird's-eye view video generator 44 on the display panel 31. If the comparing unit 45 determines that the number of adjacent obstacles has increased when the vehicle V1 exits the parked state, the display controller 48 displays the bird's-eye view video 100 generated by the bird's-eye view video generator 44 on the display panel 31. In the present embodiment, if the comparing unit 45 determines that the number of adjacent vehicles has increased when the vehicle V1 exits the parked state, the display controller 48 displays the bird's-eye view video 100 on the display panel 31. In more detail, if the comparing unit 45 determines that no vehicle was present in the adjacent parking spaces when the vehicle V1 entered the parked state and a vehicle is (or vehicles are) present in the adjacent parking spaces when the vehicle V1 exits the parked state, the display controller 48 displays the bird's-eye view video 100 on the display panel 31 when the vehicle V1 exits the parked state.

The storage unit 49 is used, for example, to temporarily store data in the display control device 40. The storage unit 49 is, for example, a semiconductor memory device such as a random access memory (RAM), a read-only memory (ROM), or a flash memory, or a storage device such as a hard disk or an optical disc. Alternatively, the storage unit 49 may be an external storage device wirelessly connected via a communication device (not illustrated).

Figure 5:
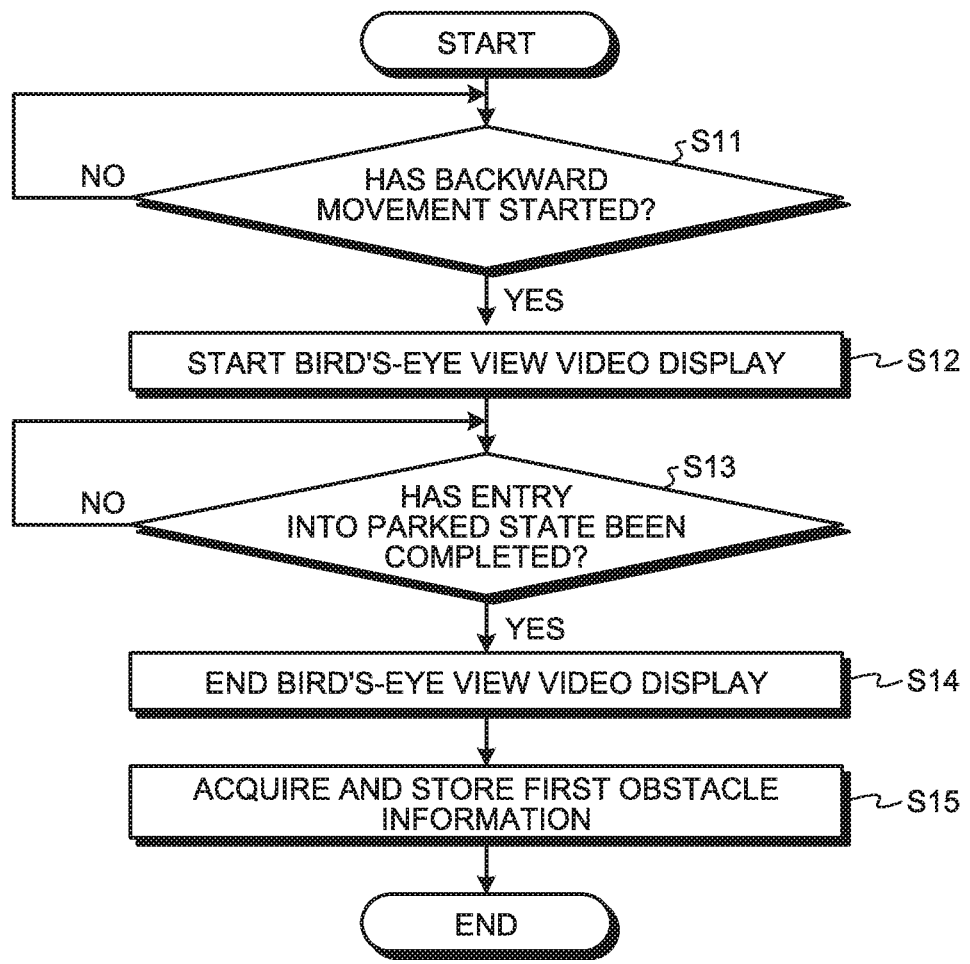
FIG. 5 is a flowchart illustrating an example of a flow of processing in the display control device of the display control system according to the first embodiment.
Figure 6:
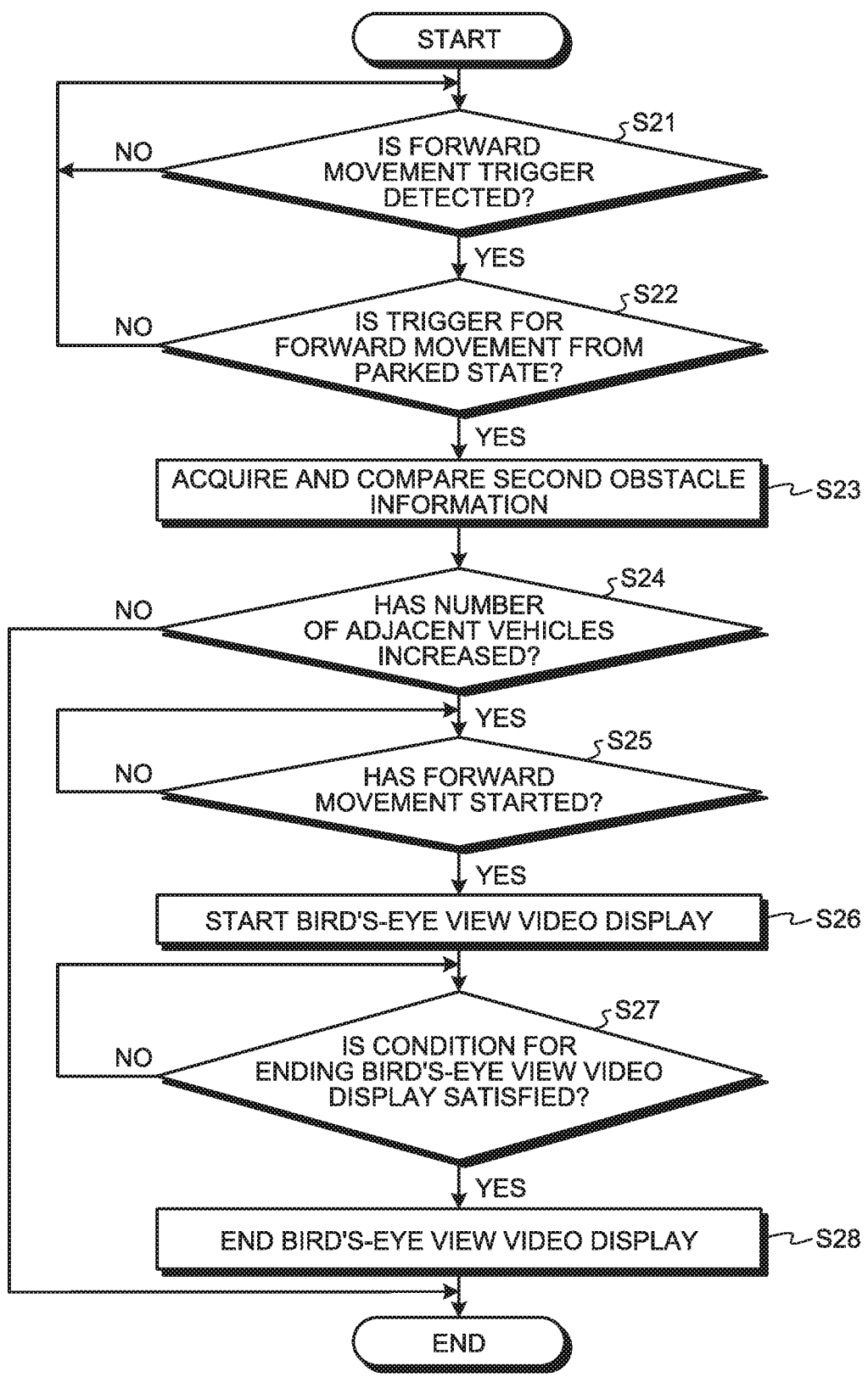
FIG. 6 is a flowchart illustrating another example of the flow of the processing in the display control device of the display control system according to the first embodiment.

The following describes a flow of processing in the display control device 40 of the display control system 1, using FIGS. 5 and 6. FIG. 5 is a flowchart illustrating an example of the flow of the processing in the display control device of the display control system according to the first embodiment. FIG. 6 is a flowchart illustrating another example of the flow of the processing in the display control device of the display control system according to the first embodiment.

After the display control system 1 is started, the display control device 40 causes the video data acquiring unit 41 to acquire the video data. The display control device 40 causes the vehicle information acquiring unit 42 to acquire the vehicle information.

The flow of the processing when the vehicle V1 enters the parked state will first be described.

The display control device 40 determines whether the backward movement has started (Step S11). The display control device 40 determines, based on the vehicle information acquired by the vehicle information acquiring unit 42, whether a backward movement trigger has been detected. The backward movement trigger is detected, for example, based on the fact that the shift position has been placed into the "reverse" position, or the fact that the direction of movement of the vehicle V1 has changed to backward. If the backward movement is determined to have not started (No at Step S11), the display control device 40 performs again the processing at Step S11. If the backward movement is determined to have started (Yes at Step S11), the display control device 40 proceeds to processing at Step S12.

If, at Step S11, the backward movement is determined to have started (Yes at Step S11), the display control device 40 starts the bird's-eye view video display (Step S12). In more detail, the display control device 40 causes the bird's-eye view video generator 44 to generate the bird's-eye view video 100, and causes the display controller 48 to display the bird's-eye view video 100 on the display panel 31. The display control device 40 proceeds to processing at Step S13.

The display control device 40 determines whether the entry into the parked state has been completed (Step S13). In more detail, if, based on the vehicle information acquired by the vehicle information acquiring unit 42, the display control device 40 detects, for example, that the shift position is in the "parking" or "neutral" position, or that the speed remains zero for a time of 5 seconds or longer, or the stop of the engine or the operation of the parking brake or the foot brake, the display control device 40 determines that the entry into the parked state has been completed. If the entry into the parked state is determined to have been completed, the display control device 40 determines to end the bird's-eye view video display (Yes at Step S13), and proceeds to processing at Step S14. If the entry into the parked state is determined to have not been completed, the display control device 40 determines not to end the bird's-eye view video display (No at Step S13), and performs again the processing at Step S13.

If the entry into the parked state is determined to have been completed (Yes at Step S13), the display control device 40 ends the bird's-eye view video display (Step S14). The display control device 40 proceeds to processing at Step S15.

The display control device 40 causes the adjacent information acquiring unit 43 to acquire the first obstacle information, and stores it in the storage unit 49 (Step S15). Then, the display control device 40 ends the processing.

The first obstacle information indicating the peripheral state of the vehicle V1 when the vehicle V1 enters the parked state will be described with reference to FIG. 2. When the vehicle V1 enters the parked state, an adjacent vehicle Va is present in the parking space PA, an adjacent vehicle Vc is present in the parking space PC, and the adjacent vehicle Vd is present in the parking space PD. No adjacent vehicle is present in the parking spaces PB and PE. These items of the information are detected by the sensor unit 21, and acquired as the first obstacle information by the adjacent information acquiring unit 43. The first obstacle information is stored in the storage unit 49 at Step S15.

The following describes the flow of the processing when the vehicle V1 exits the parked state.

The display control device 40 determines whether a forward movement trigger has been detected (Step S21). The display control device 40 determines, based on the vehicle information acquired by the vehicle information acquiring unit 42, whether the forward movement trigger has been detected. The forward movement trigger is detected, for example, based on the fact that the engine is started, or the fact that the shift position is brought into a position, such as the "drive" position, enabling the forward movement, or the fact that the parking brake or the foot brake is released. If the forward movement trigger is determined to have not been detected (No at Step S21), the display control device 40 performs again the processing at Step S21. If the forward movement trigger is determined to have been detected (Yes at Step S21), the display control device 40 proceeds to processing at Step S22.

If, at Step S21, the forward movement trigger is determined to have been detected (Yes at Step S21), the display control device 40 determines whether the trigger is for the forward movement from the parked state (Step S22). In more detail, if, based on the vehicle information acquired by the vehicle information acquiring unit 42, the state immediately before the forward movement trigger was detected is determined to be such that, for example, the shift position was in the "parking" or "neutral" position, or the speed remained zero for a time of 5 seconds or longer, or the engine was stopped, or the parking brake or the foot brake was operated, the display control device 40 determines that the trigger is for the forward movement from the parked state. Alternatively, the display control device 40 may determine that the trigger is for the forward movement from the parked state if the first obstacle information is stored in the storage unit 49. If the trigger is determined to be not for the forward movement from the parked state (No at Step S22), the display control device 40 performs again the processing at Step S21. If the trigger is determined to be for the forward movement from the parked state (Yes at Step S22), the display control device 40 proceeds to processing at Step S23.

The display control device 40 causes the adjacent information acquiring unit 43 to acquire the second obstacle information, and causes the comparing unit 45 to compare the first obstacle information with the second obstacle information (Step S23). The display control device 40 causes the comparing unit 45 to make the comparison to acquire a change in the peripheral state of the vehicle V1 between when the vehicle V1 entered the parked state and when the vehicle V1 exits the parked state. The display control device 40 proceeds to processing at Step S24.

The second obstacle information indicating the peripheral state of the vehicle V1 when the vehicle V1 exits the parked state will be described with reference to FIG. 3. When the vehicle V1 exits the parked state, the adjacent vehicle Va is present in the parking space PA, the adjacent vehicle Vc is present in the parking space PC, the adjacent vehicle Vd is present in the parking space PD, and the adjacent vehicle Ve is present in the parking space PE. These items of the information are detected by the sensor unit 21, and acquired as the second obstacle information by the adjacent information acquiring unit 43. The comparing unit 45 compares the first obstacle information with the second obstacle information to find that the adjacent vehicle Ve of the parking space PE that was not present when the vehicle V1 entered the parked state has been added thereafter.

The display control device 40 determines whether the number of adjacent vehicles has increased (Step S24). If the result of the comparison by the comparing unit 45 determines that the number of adjacent vehicles has not increased (No at Step S24), the display control device 40 ends the processing. In this case, the bird's-eye view video 100 is not displayed. If the result of the comparison by the comparing unit 45 determines that the number of adjacent vehicles has increased (Yes at Step S24), the display control device 40 proceeds to processing at Step S25.

The display control device 40 determines whether the vehicle V1 has started moving forward (Step S25). If, based on the vehicle information acquired by the vehicle information acquiring unit 42, the display control device 40 detects, for example, that the speed is zero or higher, or that the vehicle V1 has moved forward, the display control device 40 determines that the vehicle V1 has started moving forward. If the vehicle V1 is determined to have not started moving forward (No at Step S25), the display control device 40 performs again the processing at Step S25. If the vehicle V1 is determined to have started moving forward (Yes at Step S25), the display control device 40 proceeds to processing at Step S26.

If, at Step S25, the vehicle V1 is determined to have started moving forward (Yes at Step S25), the display control device 40 starts the bird's-eye view video display (Step S26). In more detail, the display control device 40 causes the bird's-eye view video generator 44 to generate the bird's-eye view video 100, and causes the display controller 48 to display the bird's-eye view video 100 on the display panel 31. The display control device 40 proceeds to processing at Step S27.

Step S26 has been exemplified as an example of timing of displaying the bird's-eye view video 100 on the display panel 31. However, the timing may be any timing appropriate for checking the peripheral state when the vehicle V1 exits the parked state, including, for example, when the engine of the vehicle V1 is started, when the shift position is brought into the "drive" position, and when the vehicle V1 starts moving forward.

The bird's-eye view video 100 displayed at Step S26 will be described with reference to FIG. 4. The display region of the bird's-eye view video 100 includes the adjacent vehicle Vd present in the parking space PD and the adjacent vehicle Ve present in the parking space PE.

The display control device 40 determines whether a condition for ending the bird's-eye view video display is satisfied (Step S27). In more detail, if, based on the vehicle information acquired by the vehicle information acquiring unit 42, the display control device 40 detects, for example, that the vehicle V1 has moved by a predetermined distance or more from a position where the forward movement has started, or that the vehicle speed has increased to a predetermined speed or higher, the display control device 40 determines that the condition for ending the bird's-eye view video display is satisfied. If the condition for ending the bird's-eye view video display is determined to be satisfied and end the bird's-eye view video display (Yes at Step S27), the display control device 40 proceeds to processing at Step S28. If the condition for ending the bird's-eye view video display is determined to be not satisfied, the display control device 40 determines not to end the video display (No at Step S27), and performs again the processing at Step S27.

If, at Step S27, the condition for ending the bird's-eye view video display is determined to be satisfied (Yes at Step S27), the display control device 40 ends the bird's-eye view video display (Step S28). The display control device 40 deletes the first obstacle information stored in the storage unit 49. Then, the display control device 40 ends the processing.

As described above, if the comparing unit 45 determines that the number of adjacent vehicles has increased when the vehicle V1 exits the parked state, the present embodiment displays the bird's-eye view video 100 generated by the bird's-eye view video generator 44 on the display panel 31. In this manner, the present embodiment can appropriately display the bird's-eye view video 100 according to the change in the peripheral state when the vehicle V1 exits the parked state. The present embodiment can display the bird's-eye view video 100 if the number of adjacent vehicles is larger when the vehicle V1 exits the parked state than when the vehicle V1 entered the parked state. This display allows the driver to appropriately check the periphery of the vehicle V1 with the bird's-eye view video 100 in addition to checking the periphery of the vehicle V1 by eyesight or using the mirror even if the number of adjacent vehicles has increased to make an operation to exit the parked state difficult.

The present embodiment displays the bird's-eye view video 100 only when the bird's-eye view video 100 may be displayed according to the change in the peripheral state when the vehicle V1 exits the parked state. In this manner, the present embodiment can restrain the bird's-eye view video from being displayed in situations where the bird's-eye view video need not be displayed, and restrain the bird's-eye view video from being displayed when, for example, a route is desired to be checked using the navigation system.

Second Embodiment

Figure 7:
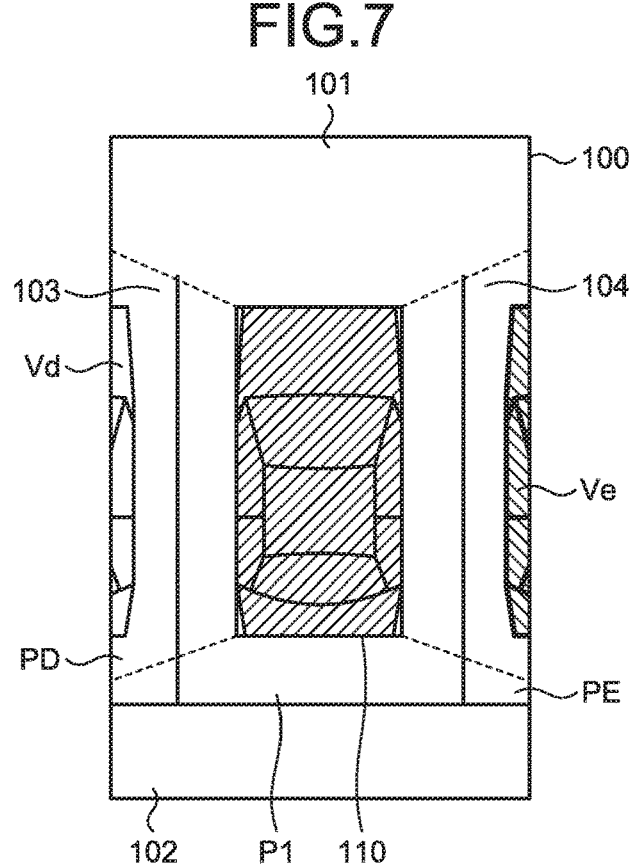
FIG. 7 is a diagram illustrating an example of the bird's-eye view video generated by the display control device of the display control system according to a second embodiment of the present disclosure.

The display control system 1 according to a second embodiment of the present disclosure will be described with reference to FIG. 7. FIG. 7 is a diagram illustrating an example of the bird's-eye view video generated by the display control device of the display control system according to the second embodiment. The basic configuration of the display control system 1 is the same as that of the display control system 1 of the first embodiment. In the following description, the same components as those of the display control system 1 will be assigned the same reference numerals or corresponding reference numerals, and description thereof will not be made. The display control system 1 differs from that of the first embodiment in that an added adjacent vehicle is highlighted in the generated bird's-eye view video 100.

If the comparing unit 45 determines that the number of adjacent vehicles has increased when the vehicle V1 exits the parked state, the synthesis processor 443 generates the bird's-eye view video 100 in which the added adjacent vehicle is highlighted. For example, the synthesis processor 443 highlights an adjacent vehicle changed in position by coloring it or enclosing it with a thick line.

The display controller 48 displays the bird's-eye view video 100 in which the adjacent vehicle determined by the comparing unit 45 to have been added is highlighted on the display panel 31.

The bird's-eye view video 100 will be described using FIG. 7. In the bird's-eye view video 100, the added adjacent vehicle Ve is colored to be highlighted.

As described above, if the comparing unit 45 determines that the number of adjacent vehicles has increased when the vehicle V1 exits the parked state, the present embodiment displays the bird's-eye view video 100 in which the added adjacent vehicle is highlighted on the display panel 31. According to the present embodiment, the information can easily be obtained regarding the adjacent vehicles having increased during a period from when the vehicle V1 entered the parked state to when the vehicle exits the parked state. According to the present embodiment, since what has changed from when the vehicle V1 entered the parked state can easily be recognized in the bird's-eye view video 100, the driver can easily identify points to pay attention to when the vehicle V1 exits the parked state.

Third Embodiment

Figure 8:
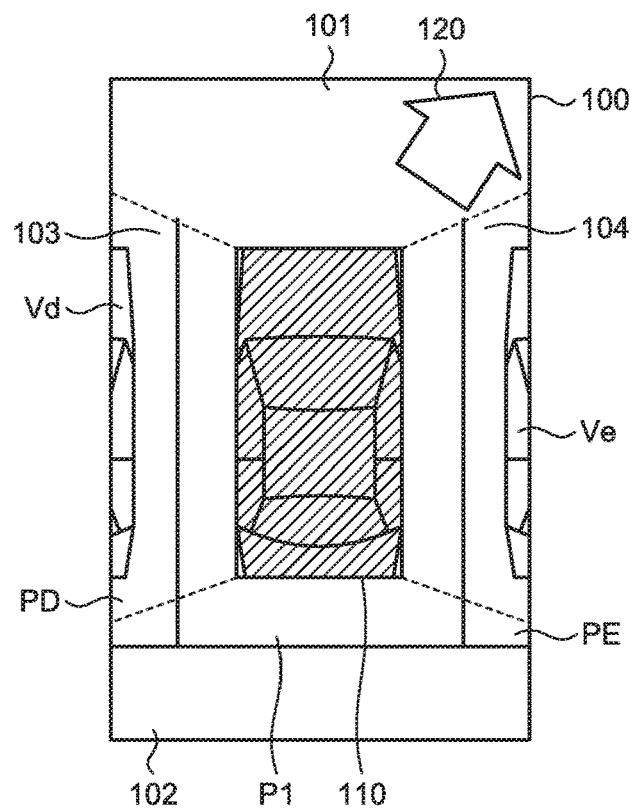
FIG. 8 is a diagram illustrating an example of the bird's-eye view video generated by the display control device of the display control system according to a third embodiment of the present disclosure.

The display control system 1 according to a third embodiment of the present disclosure will be described with reference to FIG. 8. FIG. 8 is a diagram illustrating an example of the bird's-eye view video generated by the display control device of the display control system according to the third embodiment. The basic configuration of the display control system 1 is the same as that of the display control system 1 of the first embodiment. The display control system 1 differs from that of the first embodiment in that the generated bird's-eye view video 100 displays a notification icon 120 that provides a notification of a direction in which an added adjacent vehicle is present.

If the comparing unit 45 determines that the number of adjacent vehicles has increased when the vehicle V1 exits the parked state, the synthesis processor 443 generates the bird's-eye view video 100 that displays the notification icon 120 indicating the direction in which the added adjacent vehicle is present.

If the comparing unit 45 determines that the number of adjacent vehicles has increased when the vehicle V1 exits the parked state, the display controller 48 displays the bird's-eye view video 100 including the notification icon 120 indicating the direction of the adjacent vehicle determined to have been added on the display panel 31.

The bird's-eye view video 100 will be described using FIG. 8. The present embodiment assumes that no adjacent vehicle is present in the parking space PC when the vehicle V1 enters the parked state, and the adjacent vehicle Vc is present in the parking space PC when the vehicle V1 exits the parked state. The bird's-eye view video 100 displays the notification icon 120 indicating the direction in which the added adjacent vehicle Vc is present.

As described above, if the comparing unit 45 determines that the number of adjacent vehicles has increased when the vehicle V1 exits the parked state, the present embodiment displays, on the display panel 31, the bird's-eye view video 100 that displays the notification icon 120 indicating the direction in which the added adjacent vehicle is present. According to the present embodiment, even if the added adjacent vehicle is not displayed in the bird's-eye view video 100, the information can easily be obtained regarding the direction in which the adjacent vehicle is present that has been added during a period from when the vehicle V1 entered the parked state to when the vehicle exits the parked state. According to the present embodiment, since what has changed from when the vehicle V1 entered the parked state can easily be recognized even if what has changed is not displayed in the bird's-eye view video 100, the driver can easily identify points to pay attention to when the vehicle V1 exits the parked state.

Fourth Embodiment

Figure 9:
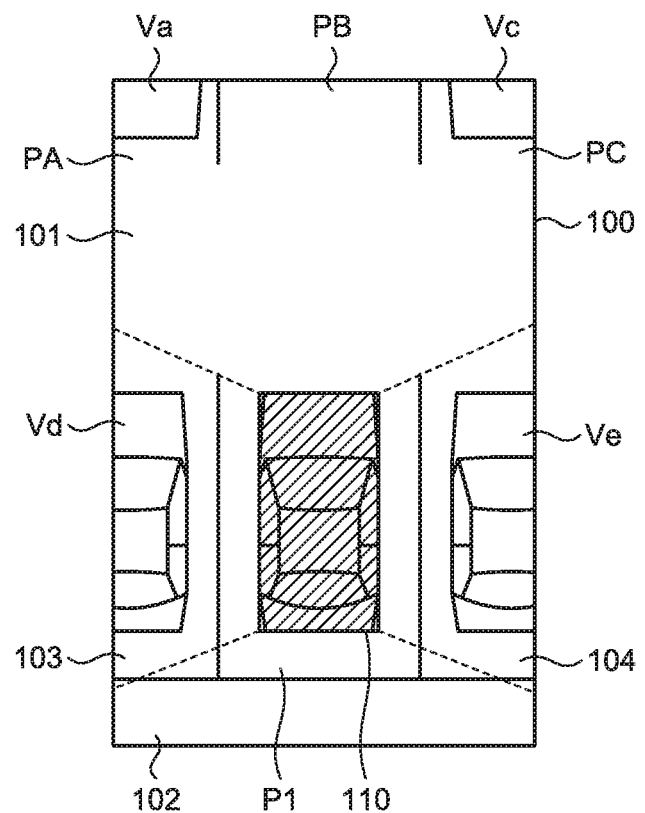
FIG. 9 is a diagram illustrating an example of the bird's-eye view video generated by the display control device of the display control system according to a fourth embodiment of the present disclosure.

The display control system 1 according to a fourth embodiment of the present disclosure will be described with reference to FIG. 9. FIG. 9 is a diagram illustrating an example of the bird's-eye view video generated by the display control device of the display control system according to the fourth embodiment. The basic configuration of the display control system 1 is the same as that of the display control system 1 of the first embodiment. The display control system 1 differs from that of the first embodiment in that the generated bird's-eye view video 100 is displayed with the display region thereof changed such that an added adjacent vehicle is included in the display region.

The cutout processor 442 cuts out the cutout region in which the added adjacent vehicle is included in the display region from the peripheral video data converted through the view point conversion processing. Only a part of the added adjacent vehicle may be included in the display region of the bird's-eye view video 100.

If the comparing unit 45 determines that the number of adjacent vehicles has increased when the vehicle V1 exits the parked state, the display controller 48 displays the bird's-eye view video 100 with the display region thereof changed so as to include the adjacent vehicle determined to have been added on the display panel 31.

The bird's-eye view video 100 will be described using FIG. 9. The present embodiment assumes that no adjacent vehicle is present in the parking space PC when the vehicle V1 enters the parked state, and the adjacent vehicle Vc is present in the parking space PC when the vehicle V1 exits the parked state. The bird's-eye view video 100 is displayed with the display region thereof enlarged forward so as to display the added adjacent vehicle Vc.

As described above, if the comparing unit 45 determines that the number of adjacent vehicles has increased when the vehicle V1 exits the parked state, the present embodiment displays, on the display panel 31, the bird's-eye view video 100 with the display region thereof changed so as to display the added adjacent vehicle. According to the present embodiment, the information can easily be obtained regarding the adjacent vehicles having increased during a period from when the vehicle V1 entered the parked state to when the vehicle exits the parked state since the added adjacent vehicle is displayed in the bird's-eye view video 100. According to the present embodiment, since what has changed from when the vehicle V1 entered the parked state can easily be recognized, the driver can easily identify points to pay attention to when the vehicle V1 exits the parked state.

Fifth Embodiment

Figure 13:
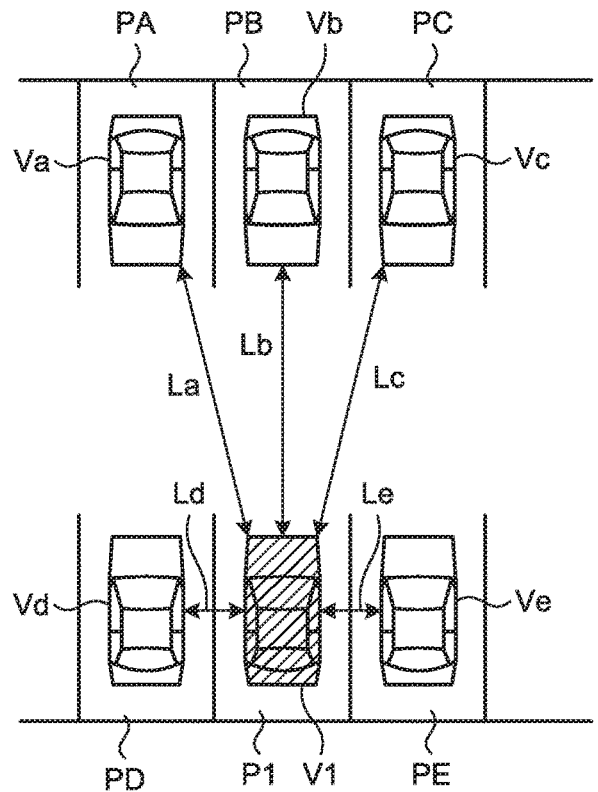
FIG. 13 is a diagram explaining the parking spaces, and illustrates a state in which the vehicle has entered one of the parking spaces.
Figure 14:
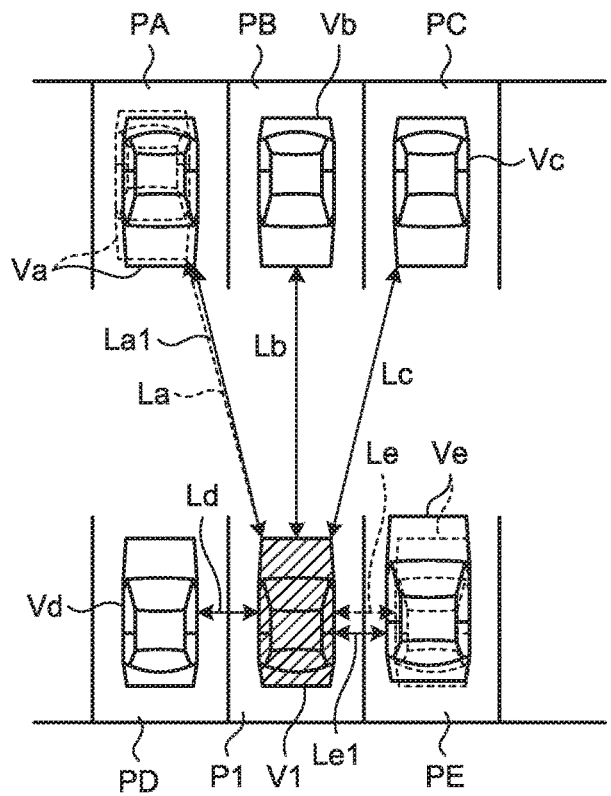
FIG. 14 is a diagram explaining the parking spaces, and illustrates a state in which the vehicle exits the parking space.

The display control system 1 according to a fifth embodiment of the present disclosure will be described with reference to FIGS. 13 to 15. FIG. 13 is a diagram explaining the parking spaces, and illustrates a state in which the vehicle has entered one of the parking spaces. FIG. 14 is a diagram explaining the parking spaces, and illustrates a state in which the vehicle exits the parking space. The basic configuration of the display control system 1 is the same as that of the display control system 1 of the first embodiment.

The sensor unit 21 can detect whether any obstacles are present near the vehicle V1, and in addition, can detect positions of the obstacles. In the present embodiment, the sensor unit 21 detects, as the positions of the obstacles present near the vehicle V1, positions of adjacent vehicles present in the parking spaces PA to PE adjacent to the parking space P1 serving as the parking space into which the vehicle V1 enters.

The front center sensor is disposed on the front central portion of the vehicle V1, and detects the position of an obstacle in the front center area on the vehicle V1. In the present embodiment, the front center sensor detects the position of the adjacent vehicle present in the parking space PB. The front center sensor outputs obstacle position information indicating the position of the adjacent vehicle serving as a detection result to the adjacent information acquiring unit 43 of the display control device 40. Examples of the obstacle position information include whether an adjacent vehicle is present in the detection region of the front center sensor, the distance to the adjacent vehicle, and the horizontal region of presence of the adjacent vehicle.

The distance to the adjacent vehicle refers to the distance from the vehicle V1 to the nearest portion of the adjacent vehicle. A distance La to the adjacent vehicle Va is the distance from a front left end portion of the vehicle V1 to a portion of the adjacent vehicle Va nearest to the vehicle V1. A distance Lb to an adjacent vehicle Vb is the distance from a front end portion of the vehicle V1 to a portion of the adjacent vehicle Vb nearest to the vehicle V1. A distance Lc to the adjacent vehicle Vc is the distance from a front right end portion of the vehicle V1 to a portion of the adjacent vehicle Vc nearest to the vehicle V1. A distance Ld to the adjacent vehicle Vd is the distance from a left side surface of the vehicle V1 to a right side surface of the adjacent vehicle Vd. A distance Le to the adjacent vehicle Ve is the distance from a right side surface of the vehicle V1 to a left side surface of the adjacent vehicle Ve.

The sensor unit 21 described above can detect the positions of the adjacent vehicles in all directions around the vehicle V1. In the present embodiment, the detection results of the sensor unit 21 enables the detection of the position of an adjacent vehicle in at least one of the right side and left side areas, the front right and front left areas, and the front area on the vehicle V1. In more detail, the detection results of the sensor unit 21 enables the detection of the positions of the adjacent vehicles present in the parking spaces PA to PE. In more detail, the positions of the adjacent vehicles in the respective parking spaces are identified by the sensors that have detected the adjacent vehicles, the distances to the adjacent vehicles detected by the sensors, and the horizontal region of presence of the adjacent vehicles detected by the sensors; the sensors, the distances, and the horizontal region of presence being included in the detection results.

The adjacent information acquiring unit 43 acquires first obstacle position information when the vehicle V1 has moved backward and entered the parked state and second obstacle position information when the vehicle V1 moves forward from the parked state to exit the parked state. In more detail, the adjacent information acquiring unit 43 acquires the first obstacle position information from the sensor unit 21 when the vehicle V1 has moved backward and entered the parked state. The adjacent information acquiring unit 43 stores the first obstacle position information acquired when the vehicle V1 enters the parked state in the storage unit 49. The adjacent information acquiring unit 43 acquires the second obstacle position information from the sensor unit 21 when the vehicle V1 moves forward from the parked state to exit the parked state. The adjacent information acquiring unit 43 outputs the second obstacle position information acquired when the vehicle V1 exits the parked state to the comparing unit 45.

The first obstacle position information is position information about the obstacles around the vehicle V1 when the vehicle V1 has moved backward and entered the parked state. In the present embodiment, the first obstacle position information is the position information about the adjacent vehicles present in the parking spaces PA to PE when the vehicle V1 has moved backward and entered the parked state.

The second obstacle position information is position information about the obstacles around the vehicle V1 when the vehicle V1 moves forward from the parked state to exit the parked state. In the present embodiment, the second obstacle position information is the position information about the adjacent vehicles present in the parking spaces PA to PE when the vehicle V1 moves forward from the parked state to exit the parked state.

If the comparing unit 45 determines that the position of any of the adjacent vehicles has changed in a direction closer to the vehicle V1 when the vehicle V1 exits the parked state, the bird's-eye view video generator 44 generates the bird's-eye view video 100.

The comparing unit 45 compares the first obstacle position information with the second obstacle position information to determine whether the position of any of the obstacles to the vehicle V1 has changed when the vehicle V1 exits the parked state. In the present embodiment, the comparing unit 45 compares the first obstacle position information with the second obstacle position information to determine whether the position of any of the adjacent vehicles has changed in the direction closer to the vehicle V1 when the vehicle V1 exits the parked state. In more detail, the comparing unit 45 compares the positions of the adjacent vehicles in the respective parking spaces when the vehicle V1 entered the parked state with the positions of the adjacent vehicles in the respective parking spaces when the vehicle V1 exits the parked state, and, if the distance of any of the adjacent vehicles from the vehicle V1 is smaller than that when the vehicle V1 entered the parked state, determines that the position of the adjacent vehicle has changed in the direction closer to the vehicle V1. The comparing unit 45 compares the positions of the adjacent vehicles in the respective parking spaces when the vehicle V1 entered the parked state with the positions of the adjacent vehicles in the respective parking spaces when the vehicle V1 exits the parked state, and, if only adjacent vehicles are present that are more distant from the vehicle V1 than when the vehicle V1 entered the parked state, or that have not changed in distance from the vehicle V1, determines that the positions of the adjacent vehicles have not changed in the direction closer to the vehicle V1. Even if the adjacent vehicles have been replaced between when the vehicle V1 entered the parked state and when the vehicle V1 exits the parked state, the comparing unit 45 determines that no change has occurred if the positions have not changed. In this description, the case where the positions have not changed may include a case of, for example, a change of smaller than 5 cm, in addition to a case of completely the same positions.

If the comparing unit 45 determines that the position of any of the adjacent obstacles to the vehicle V1 has changed when the vehicle V1 exits the parked state, the display controller 48 displays the bird's-eye view video 100 generated by the bird's-eye view video generator 44 on the display panel 31. In the present embodiment, if the comparing unit 45 determines that any one of the positions of the adjacent vehicles has changed in the direction closer to the vehicle V1 when the vehicle V1 exits the parked state, the display controller 48 displays the bird's-eye view video 100 on the display panel 31. In more detail, if the comparing unit 45 determines that the distance of any of the adjacent vehicles from the vehicle V1 is smaller than that when the vehicle V1 entered the parked state, the display controller 48 displays the bird's-eye view video 100 on the display panel 31 when the vehicle V1 exits the parked state.

Figure 15:
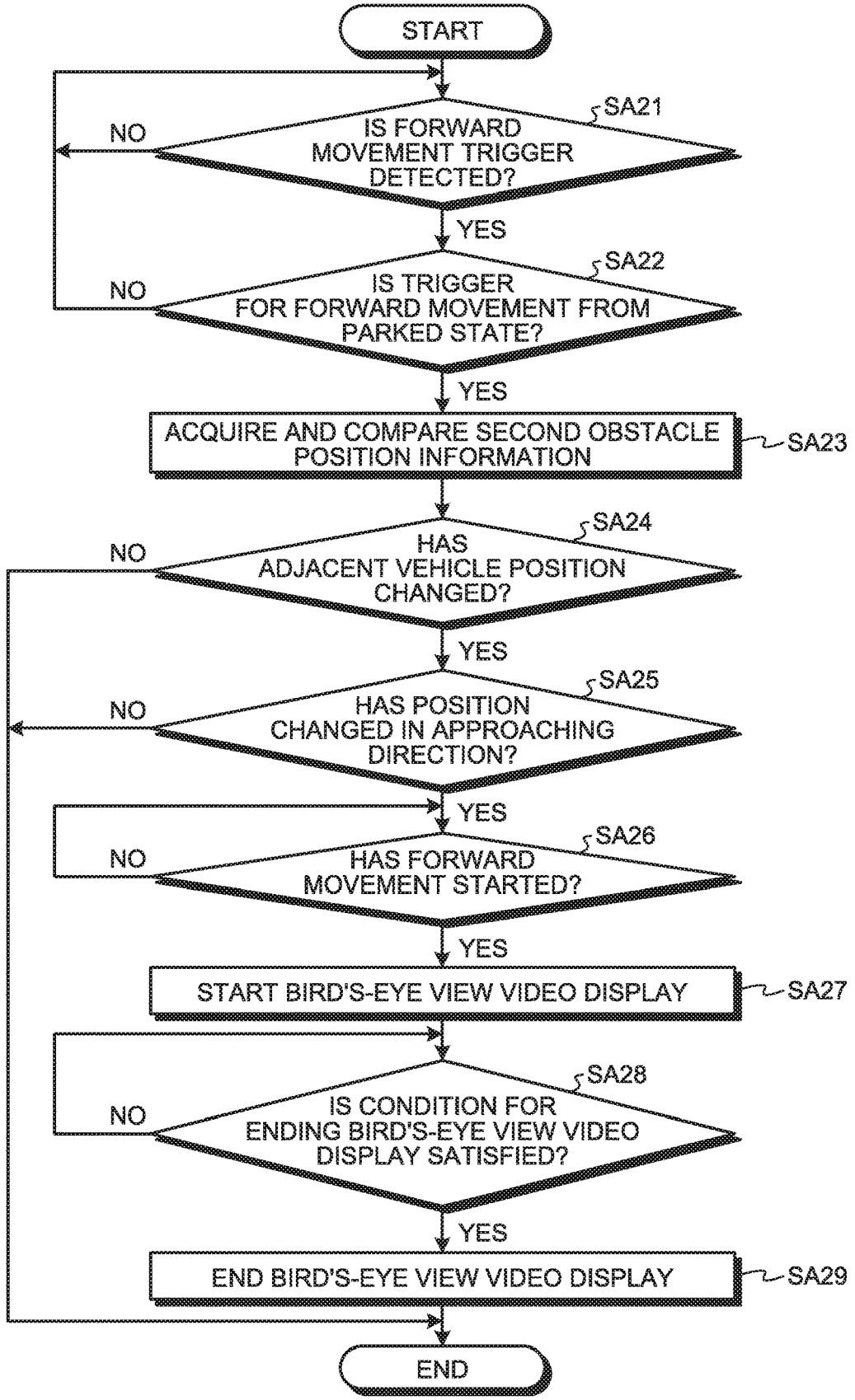
FIG. 15 is a flowchart illustrating another example of the flow of the processing in the display control device of the display control system according to a fifth embodiment of the present disclosure.

The following describes the flow of the processing in the display control device 40 of the display control system 1, using FIG. 15. FIG. 15 is a flowchart illustrating another example of the flow of the processing in the display control device of the display control system according to the fifth embodiment.

When the vehicle V1 enters the parked state, the display control device 40 performs the same processing as that of the flowchart illustrated in FIG. 5. At Step S15, the display control device 40 causes the adjacent information acquiring unit 43 to acquire the first obstacle position information, and stores it in the storage unit 49.

The first obstacle position information indicating the peripheral state of the vehicle V1 when the vehicle V1 enters the parked state will be described with reference to FIG. 13. When the vehicle V1 enters the parked state, the adjacent vehicle Va is present in the parking space PA, the adjacent vehicle Vb is present in the parking space PB, the adjacent vehicle Vc is present in the parking space PC, the adjacent vehicle Vd is present in the parking space PD, and the adjacent vehicle Ve is present in the parking space PE. The position information about the adjacent vehicles Va to Ve when the vehicle V1 enters the parked state is detected by the sensor unit 21, and is acquired as the first obstacle position information by the adjacent information acquiring unit 43. The first obstacle position information is stored in the storage unit 49 at Step S15.

The following describes the flow of the processing when the vehicle V1 exits the parked state. Processing performed at Steps SA21, SA22, and SA26 to SA29 is the same as the processing at Steps S21, S22, and S25 to S28 of the flowchart illustrated in FIG. 6.

The display control device 40 causes the adjacent information acquiring unit 43 to acquire the second obstacle position information, and causes the comparing unit 45 to compare the first obstacle position information with the second obstacle position information (Step SA23). The display control device 40 causes the comparing unit 45 to make the comparison to acquire a change in the peripheral state of the vehicle V1 from when the vehicle V1 entered the parked state to when the vehicle exits the parked state. The display control device 40 proceeds to processing at Step SA24.

The second obstacle position information indicating the peripheral state of the vehicle V1 when the vehicle V1 exits the parked state will be described with reference to FIG. 14. When the vehicle V1 exits the parked state, the positions of the adjacent vehicle Va in the parking space PA and the adjacent vehicle Ve in the parking space PE have changed. A distance Lai of the adjacent vehicle Va from the vehicle V1 when the vehicle V1 exits the parked state is smaller than the distance La of the adjacent vehicle Va from the vehicle V1 when the vehicle V1 entered the parked state. A distance Le1 of the adjacent vehicle Ve from the vehicle V1 when the vehicle V1 exits the parked state is smaller than the distance Le of the adjacent vehicle Ve from the vehicle V1 when the vehicle V1 entered the parked state. The positions of the adjacent vehicles Va and Ve when the vehicle V1 entered the parked state are indicated by dashed lines. The position information about the adjacent vehicles Va to Ve when the vehicle V1 exits the parked state is detected by the sensor unit 21, and is acquired as the second obstacle position information by the adjacent information acquiring unit 43. The comparing unit 45 compares the first obstacle position information with the second obstacle position information to find that the positions of the adjacent vehicle Va and the adjacent vehicle Ve have changed.

The display control device 40 determines whether the position of any of the adjacent vehicles has changed (Step SA24). If the result of the comparison by the comparing unit 45 determines that none of the positions of the adjacent vehicles has changed (No at Step SA24), the display control device 40 ends the process. In this case, the bird's-eye view video 100 is not displayed. If the result of the comparison by the comparing unit 45 determines that any one of the positions of the adjacent vehicles has changed (Yes at Step SA24), the display control device 40 proceeds to processing at Step SA25.

The display control device 40 determines whether the position of the adjacent vehicle has changed in a direction closer to the vehicle V1 (Step SA25). The first obstacle position information is compared with the second obstacle position information, and, if the position of the adjacent vehicle is determined to have not changed in the direction closer to the vehicle V1 (No at Step SA25), the display control device 40 ends the process. The first obstacle position information is compared with the second obstacle position information, and, if the position of the adjacent vehicle is determined to have changed in the direction closer to the vehicle V1 (Yes at Step SA25), the display control device 40 proceeds to the processing at Step SA26.

As described above, if the comparing unit 45 determines that the position of the adjacent vehicle is determined to have changed in the direction closer to the vehicle V1 when the vehicle V1 exits the parked state, the present embodiment displays the bird's-eye view video 100 generated by the bird's-eye view video generator 44 on the display panel 31. In this manner, the present embodiment can appropriately display the bird's-eye view video 100 according to the change in the peripheral state when the vehicle V1 exits the parked state. The present embodiment can display the bird's-eye view video 100 if the position of the adjacent vehicle has changed in the direction closer to the vehicle V1 when the vehicle V1 exits the parked state from when the vehicle V1 entered the parked state. This display allows the driver to appropriately check the periphery of the vehicle V1 with the bird's-eye view video 100 in addition to checking the periphery of the vehicle V1 by eyesight or using the mirror even if the position of the adjacent vehicle has changed in the direction closer to the vehicle V1 to make the operation to exit the parked state difficult.

The present embodiment displays the bird's-eye view video 100 only when the bird's-eye view video 100 may be displayed according to the change in the peripheral state when the vehicle V1 exits the parked state. In this manner, the present embodiment can restrain the bird's-eye view video from being displayed in situations where the bird's-eye view video need not be displayed, and restrain the bird's-eye view video from being displayed when, for example, a route is desired to be checked using the navigation system.

Sixth Embodiment

The basic configuration of the display control system 1 is the same as that of the display control system 1 of the fifth embodiment. The display control system 1 differs from that of the fifth embodiment in that the adjacent vehicle changed in position is highlighted in the generated bird's-eye view video 100.

If the comparing unit 45 determines that the position of an adjacent vehicle has changed when the vehicle V1 exits the parked state, the synthesis processor 443 generates the bird's-eye view video 100 in which the adjacent vehicle changed in position is highlighted. For example, the synthesis processor 443 highlights the adjacent vehicle changed in position by coloring it or enclosing it with a thick line.

The display controller 48 displays the bird's-eye view video 100 in which the adjacent vehicle determined by the comparing unit 45 to have changed in position is highlighted on the display panel 31.

The bird's-eye view video 100 will be described using FIG. 7 used in the description in the second embodiment. The present embodiment assumes that the position of the adjacent vehicle Ve in the parking space PE has changed. In the bird's-eye view video 100, the adjacent vehicle Ve changed in position is colored to be highlighted.

As described above, if the comparing unit 45 determines that the position of an adjacent vehicle has changed when the vehicle V1 exits the parked state, the present embodiment displays the bird's-eye view video 100 in which the adjacent vehicle changed in position is highlighted on the display panel 31. According to the present embodiment, the information can easily be obtained regarding the adjacent vehicle changed in position from when the vehicle V1 entered the parked state to when the vehicle exits the parked state. According to the present embodiment, since what has changed from when the vehicle V1 entered the parked state can easily be recognized in the bird's-eye view video 100, the driver can easily identify points to pay attention to when the vehicle V1 exits the parked state.

Seventh Embodiment

The basic configuration of the display control system 1 is the same as that of the display control system 1 of the fifth embodiment. The display control system 1 differs from that of the fifth embodiment in that the generated bird's-eye view video 100 displays the notification icon 120 that provides a notification of a direction in which the adjacent vehicle changed in position is present.

If the comparing unit 45 determines that the position of an adjacent vehicle has changed when the vehicle V1 exits the parked state, the synthesis processor 443 generates the bird's-eye view video 100 that displays the notification icon 120 indicating the direction in which the adjacent vehicle changed in position is present. For example, the synthesis processor 443 displays the notification icon 120 having an arrow shape.

If the comparing unit 45 determines that the position of an adjacent vehicle has changed when the vehicle V1 exits the parked state, the display controller 48 displays the bird's-eye view video 100 including the notification icon 120 indicating the direction of the adjacent vehicle determined to have changed in position on the display panel 31.

The bird's-eye view video 100 will be described using FIG. 8 used in the description in the second embodiment. The present embodiment assumes that the position of the adjacent vehicle Vc in the parking space PC has changed. The bird's-eye view video 100 displays the notification icon 120 indicating the direction in which the adjacent vehicle Vc changed in position is present.

As described above, if the comparing unit 45 determines that the position of an adjacent vehicle has changed when the vehicle V1 exits the parked state, the present embodiment displays, on the display panel 31, the bird's-eye view video 100 that displays the notification icon 120 indicating the direction in which the adjacent vehicle changed in position is present. According to the present embodiment, even if the adjacent vehicle changed in position is not displayed in the bird's-eye view video 100, the information can easily be obtained regarding the direction in which the adjacent vehicle is present that has changed in position from when the vehicle V1 entered the parked state to when the vehicle exits the parked state. According to the present embodiment, since what has changed from when the vehicle V1 entered the parked state can easily be recognized even if what has changed is not displayed in the bird's-eye view video 100, the driver can easily identify points to pay attention to when the vehicle V1 exits the parked state.

Eighth Embodiment

Figure 16:
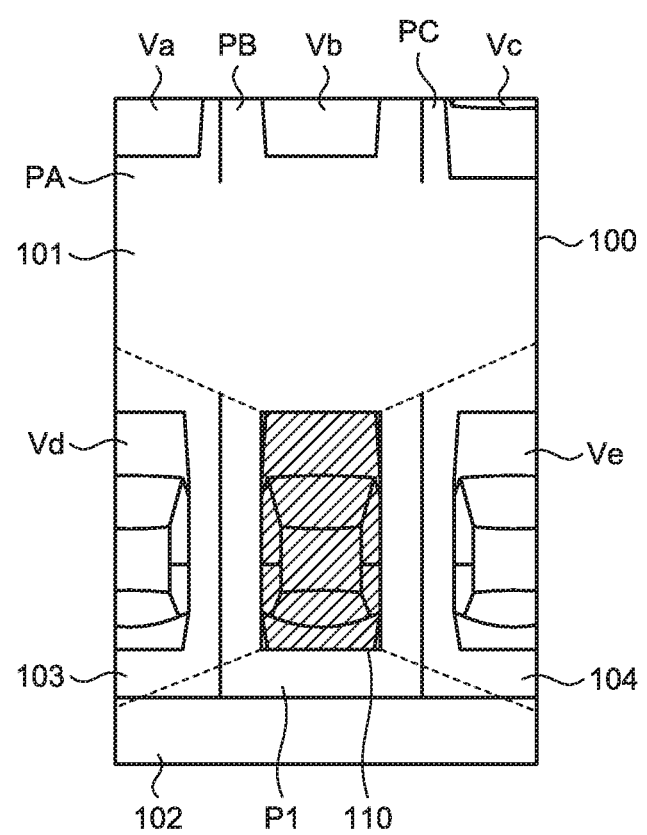
FIG. 16 is a diagram illustrating an example of the bird's-eye view video generated by the display control device of the display control system according to an eighth embodiment of the present disclosure.

The display control system 1 according to an eighth embodiment of the present disclosure will be described with reference to FIG. 16. FIG. 16 is a diagram illustrating an example of the bird's-eye view video generated by the display control device of the display control system according to the eighth embodiment. The basic configuration of the display control system 1 is the same as that of the display control system 1 of the fifth embodiment. The display control system 1 differs from that of the fifth embodiment in that the generated bird's-eye view video 100 is displayed with the display region thereof changed such that an adjacent vehicle changed in position is included in the display region.

The cutout processor 442 cuts out the cutout region in which the adjacent vehicle changed in position is included in the display region from the peripheral video data converted through the view point conversion processing. Only a part of the added adjacent vehicle may be included in the display region of the bird's-eye view video 100.

If the comparing unit 45 determines that the position of an adjacent vehicle has changed when the vehicle V1 exits the parked state, the display controller 48 displays the bird's-eye view video 100 with the display region thereof changed so as to include the adjacent vehicle determined to have changed in position on the display panel 31.

The bird's-eye view video 100 will be described using FIG. 16. The present embodiment assumes that the position of the adjacent vehicle Vc in the parking space PC has changed. The bird's-eye view video 100 is displayed with the display region thereof enlarged forward so as to display the adjacent vehicle Vc that has changed in position.

As described above, if the comparing unit 45 determines that the position of an adjacent vehicle has changed when the vehicle V1 exits the parked state, the present embodiment displays, on the display panel 31, the bird's-eye view video 100 with the display region thereof changed so as to display the adjacent vehicle changed in position. According to the present embodiment, the information can easily be obtained regarding the adjacent vehicle changed in position from when the vehicle V1 entered the parked state to when the vehicle exits the parked state since the adjacent vehicle changed in position is displayed in the bird's-eye view video 100. According to the present embodiment, since what has changed from when the vehicle V1 entered the parked state can easily be recognized, the driver can easily identify points to pay attention to when the vehicle V1 exits the parked state.

Ninth Embodiment

Figure 17:
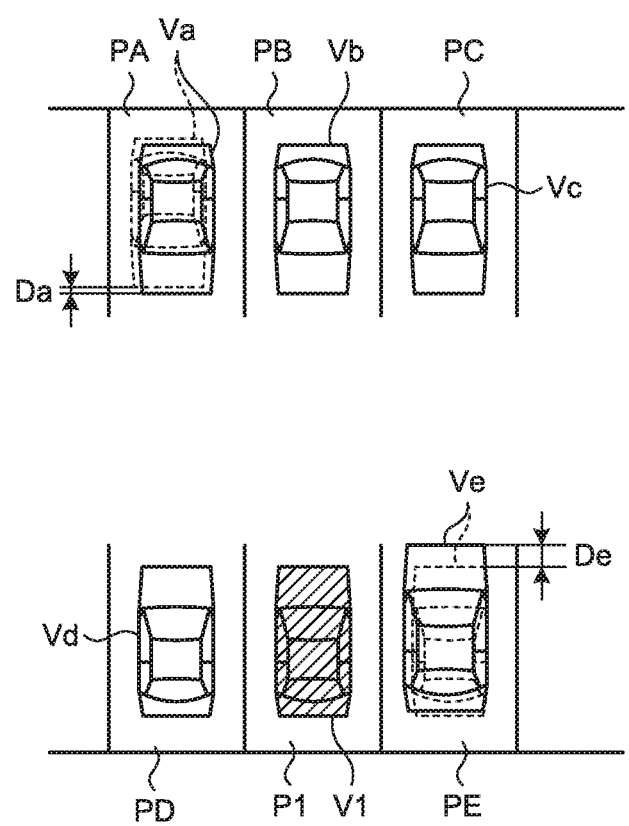
FIG. 17 is a diagram illustrating the parking spaces for explaining processing in the display control device of the display control system according to a ninth embodiment of the present disclosure.
Figure 18:
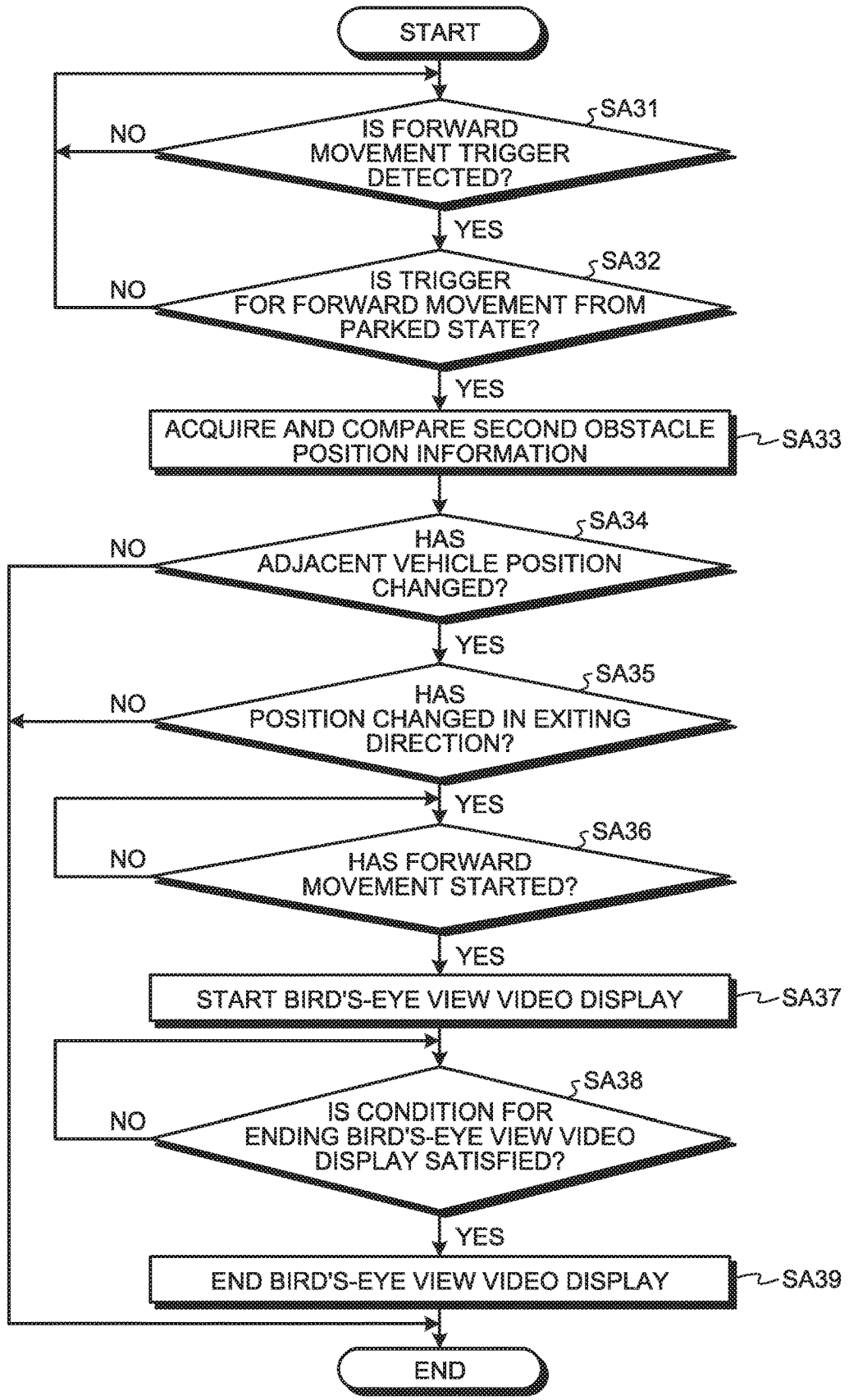
FIG. 18 is a flowchart illustrating an example of a flow of the processing in the display control device of the display control system according to the ninth embodiment.

The display control system 1 according to a ninth embodiment of the present disclosure will be described with reference to FIGS. 17 and 18. FIG. 17 is a diagram illustrating the parking spaces for explaining processing in the display control device of the display control system according to the ninth embodiment. FIG. 18 is a flowchart illustrating an example of a flow of the processing in the display control device of the display control system according to the ninth embodiment. The basic configuration of the display control system 1 is the same as that of the display control system 1 of the fifth embodiment. The display control system 1 differs from that of the fifth embodiment in that the bird's-eye view video is displayed if the position of an adjacent vehicle has changed in the exiting direction of the vehicle when the vehicle V1 exits the parked state.

If the comparing unit 45 determines that the position of any of the adjacent vehicles has changed in the exiting direction of the vehicle V1 when the vehicle V1 exits the parked state, the bird's-eye view video generator 44 generates the bird's-eye view video 100.

The expression "change in the exiting direction of the vehicle V1" refers to a state that the adjacent vehicles change in position toward the front of the respective parking spaces. In the parking spaces illustrated in FIG. 17, the adjacent vehicles Va and Ve have changed forward in position, or in other words, have changed in position in the exiting direction of the vehicle V1. The front end portion of the adjacent vehicle Va when the vehicle V1 exits the parked state has moved to a position ahead of the adjacent vehicle Va when the vehicle V1 entered the parked state by a distance Da. The front end portion of the adjacent vehicle Ve when the vehicle V1 exits the parked state has moved to a position ahead of the adjacent vehicle Ve when the vehicle V1 entered the parked state by a distance De. The positions of the adjacent vehicles Va and Ve when the vehicle V1 entered the parked state are indicated by dashed lines.

The comparing unit 45 compares the first obstacle position information with the second obstacle position information to determine whether the position of any of the adjacent vehicles has changed in the exiting direction of the vehicle V1 when the vehicle V1 exits the parked state. In more detail, the comparing unit 45 compares the positions of the adjacent vehicles in the respective parking spaces when the vehicle V1 entered the parked state with the positions of the adjacent vehicles in the respective parking spaces when the vehicle V1 exits the parked state, and, if the position of any of the adjacent vehicles has changed forward, determines that the position of the adjacent vehicle has changed in the exiting direction of the vehicle V1. The comparing unit 45 compares the positions of the adjacent vehicles in the respective parking spaces when the vehicle V1 entered the parked state with the positions of the adjacent vehicles in the respective parking spaces when the vehicle V1 exits the parked state, and, if only adjacent vehicles are present that have changed backward in position or that have not changed in position, determines that the positions of the adjacent vehicles have not changed in the exiting direction of the vehicle V1. Even if the adjacent vehicles have been replaced between when the vehicle V1 entered the parked state and when the vehicle V1 exits the parked state, the comparing unit 45 determines that no change has occurred if the positions have not changed.

If the comparing unit 45 determines that the position of any of the adjacent vehicles has changed in the exiting direction of the vehicle V1 when the vehicle V1 exits the parked state, the display controller 48 displays the bird's-eye view video 100 on the display panel 31. In more detail, if the comparing unit 45 determines that the position of any of the adjacent vehicles when the vehicle V1 exits the parked state has changed in the exiting direction of the vehicle V1 from the position of the adjacent vehicle when the vehicle V1 entered the parked state, the display controller 48 displays the bird's-eye view video 100 on the display panel 31 when the vehicle V1 exits the parked state.

The following describes the flow of the processing in the display control device 40 of the display control system 1, using FIG. 18. Processing performed at Steps SA31 to SA34 and SA36 to SA39 is the same as the processing at Steps SA21 to SA24 and SA26 to SA29 of the flowchart illustrated in FIG. 15.

The display control device 40 determines whether the position of any of the adjacent vehicles has changed in the exiting direction of the vehicle V1 (Step SA35). The first obstacle position information is compared with the second obstacle position information, and, if the position of any of the adjacent vehicles is determined to have not changed in the exiting direction of the vehicle V1 (No at Step SA35), the display control device 40 ends the process. The first obstacle position information with the second obstacle position information, and, if the position of any of the adjacent vehicles is determined to have changed in the exiting direction of the vehicle V1 (Yes at Step SA35), the display control device 40 proceeds to the processing at Step SA36.

As described above, if the comparing unit 45 determines that the position of any of the adjacent vehicles has changed in the exiting direction of the vehicle V1 when the vehicle V1 exits the parked state, the present embodiment displays the bird's-eye view video 100 generated by the bird's-eye view video generator 44 on the display panel 31. In this manner, the present embodiment can appropriately display the bird's-eye view video 100 according to the change in the peripheral state when the vehicle V1 exits the parked state. The present embodiment can display the bird's-eye view video 100 if the position of any of the adjacent vehicles has changed in the exiting direction of the vehicle V1 when the vehicle V1 exits the parked state from when the vehicle V1 entered the parked state. This display allows the driver to appropriately check the periphery of the vehicle V1 with the bird's-eye view video 100 in addition to checking the periphery of the vehicle V1 by eyesight or using the mirror even if the position of any of the adjacent vehicles has changed in the exiting direction of the vehicle V1 to make the operation to exit the parked state difficult.

Tenth Embodiment

Figure 21:
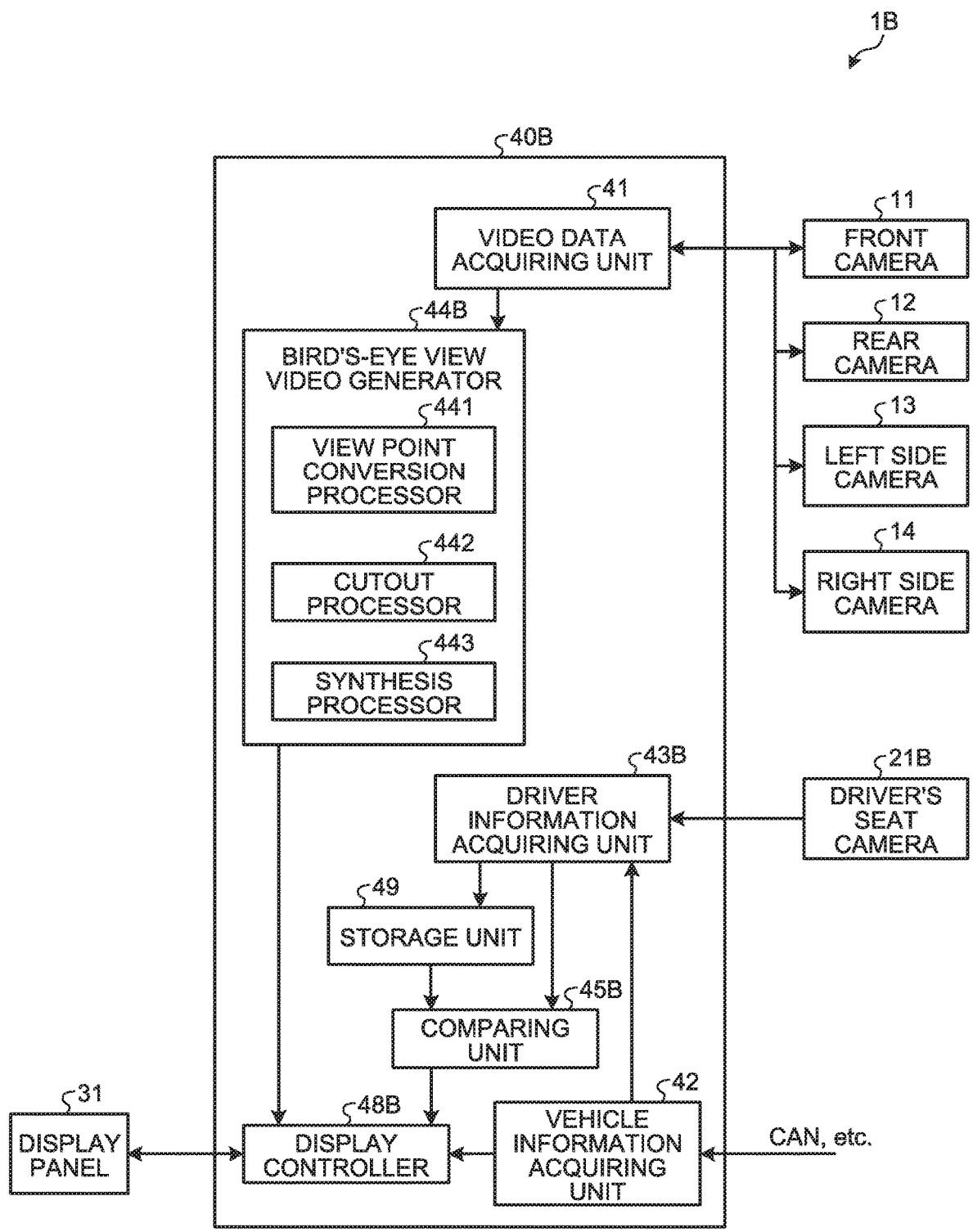
FIG. 21 is a block diagram illustrating a configuration example of a display control system according to a tenth embodiment of the present disclosure.

A display control system 1B according to a tenth embodiment of the present disclosure will be described with reference to FIGS. 21 to 24. FIG. 21 is a block diagram illustrating a configuration example of the display control system according to the tenth embodiment. The basic configuration of the display control system 1B is the same as that of the display control system 1 of the first embodiment. The display control system 1B appropriately displays the bird's-eye view video according to the change in the driver (peripheral checking condition) when the vehicle V1 exits the parked state.

The display control system 1B will be described using FIG. 21. The display control system 1B includes the front camera (photographing unit) 11, the rear camera (photographing unit) 12, the left side camera (photographing unit) 13, the right side camera (photographing unit) 14, a driver's seat camera (driver's seat detector) 21B, the display panel (display unit) 31, and a display control device 40B.

The driver's seat camera 21B is disposed facing a seating position of a driver's seat of the vehicle V1. The driver's seat camera 21B photographs the driver seated in the driver's seat so as to be capable of person recognition. In other words, a video captured by the driver's seat camera 21B includes information capable of recognizing the driver as a person. The driver's seat camera 21B outputs the captured video to a driver information acquiring unit (information acquiring unit) 43B of the display control device 40B.

The display control device 40B includes the video data acquiring unit 41, the vehicle information acquiring unit 42, the driver information acquiring unit 43B, a bird's-eye view video generator 44B, a comparing unit 45B, a display controller 48B, and the storage unit 49 serving as the internal memory.

The driver information acquiring unit 43B causes the driver's seat camera 21B to acquire first driver information (first information) recognizing the driver of the vehicle V1 when the vehicle V1 has moved backward and entered the parked state and second driver information (second information) recognizing the driver of the vehicle V1 when the vehicle V1 moves forward from the parked state to exit the parked state. In more detail, the driver information acquiring unit 43B acquires video data obtained by photographing the driver with the driver's seat camera 21B when the vehicle V1 has moved backward and entered the parked state as the first driver information. The driver information acquiring unit 43B stores the first driver information acquired when the vehicle V1 entered the parked state in the storage unit 49. The driver information acquiring unit 43B acquires the video data obtained by photographing the driver with the driver's seat camera 21B when the vehicle V1 moves forward from the parked state to exit the parked state as the second driver information. The determination that the vehicle V1 has moved backward and entered the parked state and the determination that the vehicle V1 moves forward to exit the parked state are made based on, for example, the gear shift operation information and the engine on/off information of the vehicle V1 acquired from the vehicle information acquiring unit 42. The driver information acquiring unit 43B stores the second driver information acquired when the vehicle V1 exits the parked state in the storage unit 49.

The first driver information is the video data obtained by photographing the face of the driver of the vehicle V1 when the vehicle V1 has moved backward and entered the parked state.

The second driver information is the video data obtained by photographing the face of the driver of the vehicle V1 when the vehicle V1 moves forward from the parked state to exit the parked state.

If the second driver information acquired when the vehicle V1 exits the parked state is determined to differ from the first driver information, the bird's-eye view video generator 44B generates the bird's-eye view video 100. In the present embodiment, the bird's-eye view video generator 44B generates the bird's-eye view video 100 if the comparing unit 45B determines that the driver when the vehicle V1 exits the parked state differs from the driver when the vehicle V1 entered the parked state.

Figure 22:
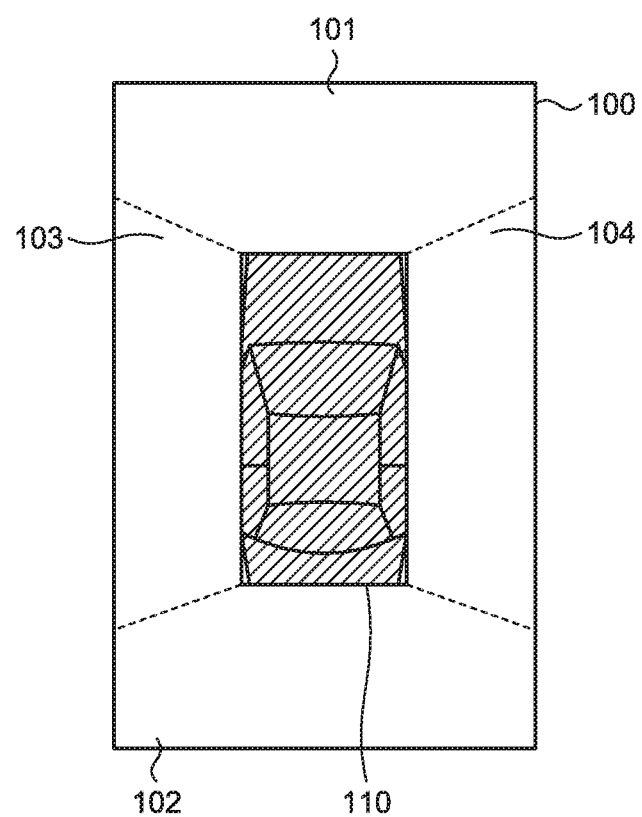
FIG. 22 is a diagram illustrating an example of the bird's-eye view video generated by a display control device of the display control system according to the tenth embodiment.

The bird's-eye view video 100 will be described using FIG. 22. FIG. 22 is a diagram illustrating an example of the bird's-eye view video generated by the display control device of the display control system according to the tenth embodiment. The bird's-eye view video 100 displays a region of approximately 2 m from the vehicle V1. The bird's-eye view video 100 includes the front video 101, the rear video 102, the left side video 103, and the right side video 104, and also the vehicle icon 110 located in a central portion surrounded by the front video 101, the rear video 102, the left side video 103, and the right side video 104. The vehicle icon 110 indicates the position and the direction of the vehicle V1. The vehicle icon 110 is disposed on the central portion with the front-rear direction thereof being parallel to the front-rear direction of the bird's-eye view video 100.

Referring back to FIG. 21, the comparing unit 45B compares the first driver information with the second driver information to compare the driver between when the vehicle V1 entered the parked state and when the vehicle V1 exits the parked state. In the present embodiment, the comparing unit 45B applies image processing to a video obtained by photographing the driver when the vehicle V1 enters the parked state and a video obtained by photographing the driver when the vehicle V1 exits the parked state, and compares these videos with each other to determine whether the driver when the vehicle V1 entered the parked state is the same as the driver when the vehicle V1 exits the parked state.

When the vehicle V1 enters the parked state, the display controller 48B displays the bird's-eye view video 100 generated by the bird's-eye view video generator 44B on the display panel 31. If the comparing unit 45B determines that the second driver information acquired when the vehicle V1 exits the parked state differs from the first driver information, the display controller 48B displays the bird's-eye view video 100 generated by the bird's-eye view video generator 44B on the display panel 31. In the present embodiment, if the comparing unit 45B determines that the driver when the vehicle V1 entered the parked state differs from the driver when the vehicle V1 exits the parked state, the display controller 48B displays the bird's-eye view video 100 on the display panel 31.

Figure 23:
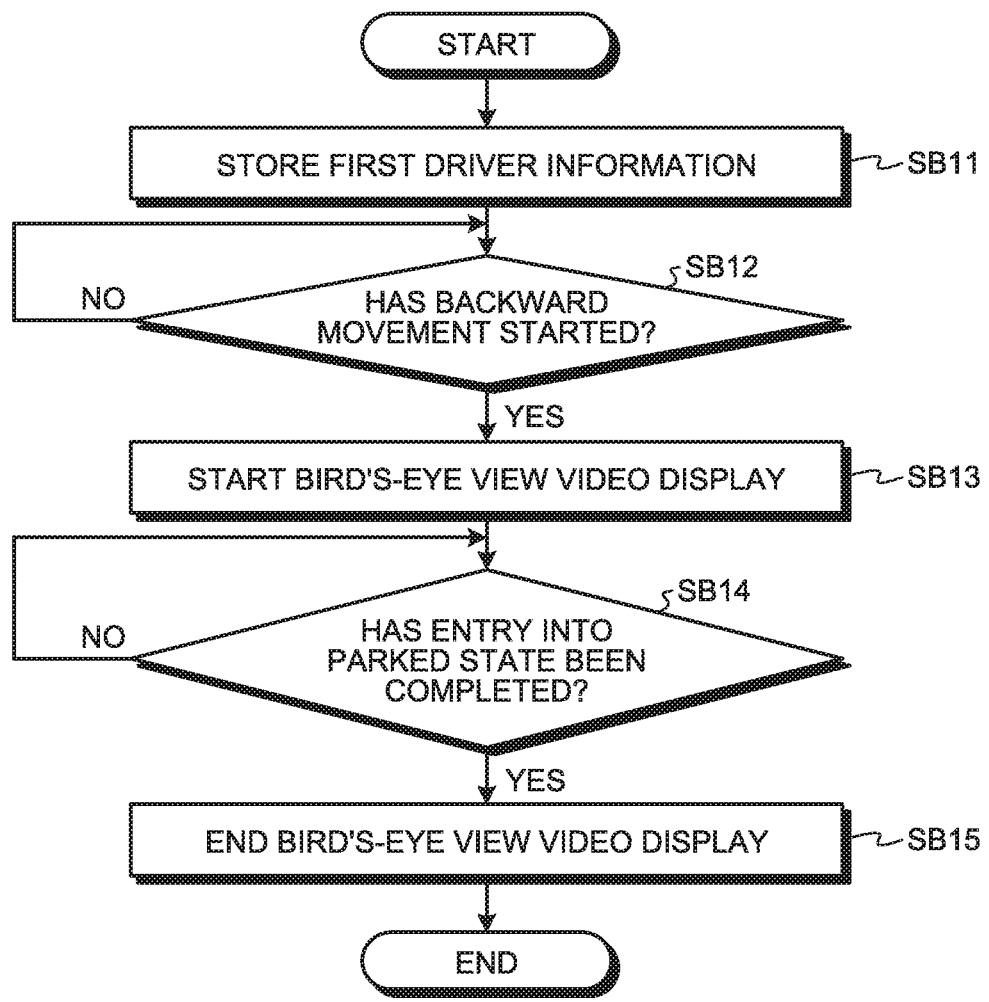
FIG. 23 is a flowchart illustrating an example of a flow of processing in the display control device of the display control system according to the tenth embodiment.
Figure 24:
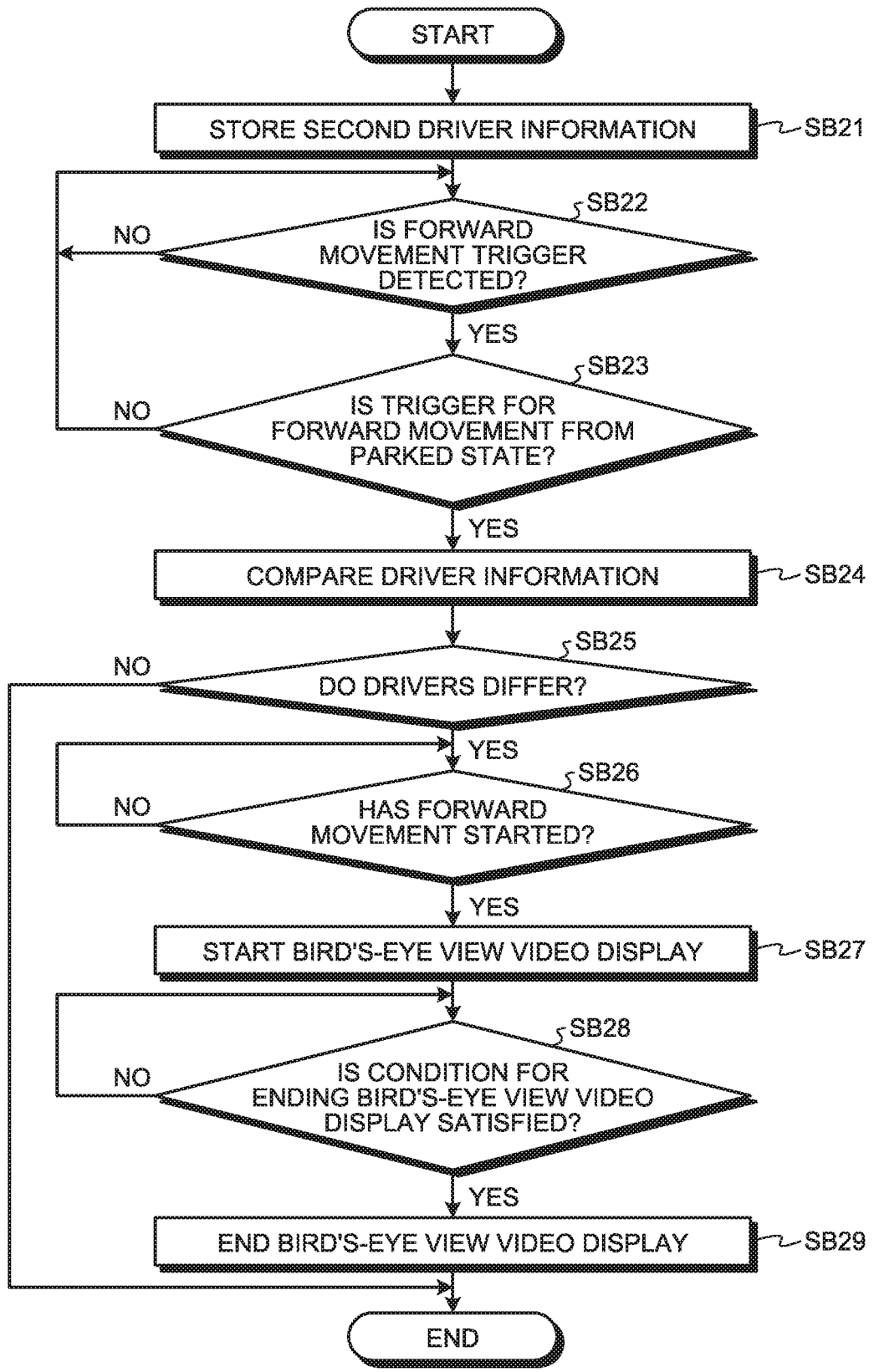
FIG. 24 is a flowchart illustrating another example of the flow of the processing in the display control device of the display control system according to the tenth embodiment.

The following describes a flow of processing in the display control device 40B of the display control system 1B, using FIGS. 23 and 24. FIG. 23 is a flowchart illustrating an example of the flow of the processing in the display control device of the display control system according to the tenth embodiment. FIG. 24 is a flowchart illustrating another example of the flow of the processing in the display control device of the display control system according to the tenth embodiment.

The flow of the processing when the vehicle V1 enters the parked state will first be described. Processing performed at Steps SB12 to SB15 is the same as the processing at Steps S11 to S14 of the flowchart illustrated in FIG. 5.

The display control device 40B causes the driver information acquiring unit 43B to acquire the first driver information, and stores it in the storage unit 49 (Step SB11). Then, the display control device 40B proceeds to the processing at Step SB12.

The following describes the flow of the processing when the vehicle V1 exits the parked state. Processing performed at Steps SB22, SB23, and SB26 to SB29 is the same as the processing at Steps S21, S22, and S25 to S28 of the flowchart illustrated in FIG. 6.

The display control device 40B causes the driver information acquiring unit 43B to acquire the second driver information, and stores it in the storage unit 49 (Step SB21). Then, the display control device 40B proceeds to the processing at Step SB22.

The display control device 40B causes the comparing unit 45B to compare the first driver information with the second driver information (Step SB24). The display control device 40B causes the comparing unit 45B to make the comparison to determine whether the driver of the vehicle V1 when the vehicle V1 entered the parked state is the same as the driver of the vehicle V1 when the vehicle exits the parked state. The display control device 40B proceeds to processing at Step SB25.

The display control device 40B determines whether the drivers differ (Step SB25). If the result of the comparison by the comparing unit 45B determines that the drivers are the same (No at Step SB25), the display control device 40B ends the processing. In this case, the bird's-eye view video 100 is not displayed. If the result of the comparison by the comparing unit 45B determines that the drivers differ (Yes at Step SB25), the display control device 40B proceeds to the processing at Step SB26.

As described above, if the comparing unit 45B determines that the driver when the vehicle V1 entered the parked state differs from the driver when the vehicle V1 exits the parked state, the present embodiment displays the bird's-eye view video 100 generated by the bird's-eye view video generator 44B on the display panel 31. In this manner, the present embodiment can appropriately display the bird's-eye view video 100 according to the change of the driver when the vehicle V1 exits the parked state. This display allows the driver to appropriately check the periphery of the vehicle V1 with the bird's-eye view video 100 in addition to checking the periphery of the vehicle V1 by eyesight or using the mirror if the driver when the vehicle V1 entered the parked state differs from the driver when the vehicle V1 exits the parked state.

The present embodiment displays the bird's-eye view video 100 only when the bird's-eye view video 100 needs to be displayed according to the change of the driver when the vehicle V1 exits the parked state. In this manner, when the vehicle V1 is driven out of the parking space by the same driver as the driver when the vehicle V1 entered the parking space, the present embodiment can restrain the bird's-eye view video from being displayed in situations where the bird's-eye view video need not be displayed, and restrain the bird's-eye view video from being displayed when, for example, a route is desired to be checked using the navigation system.

Eleventh Embodiment

Figure 25:
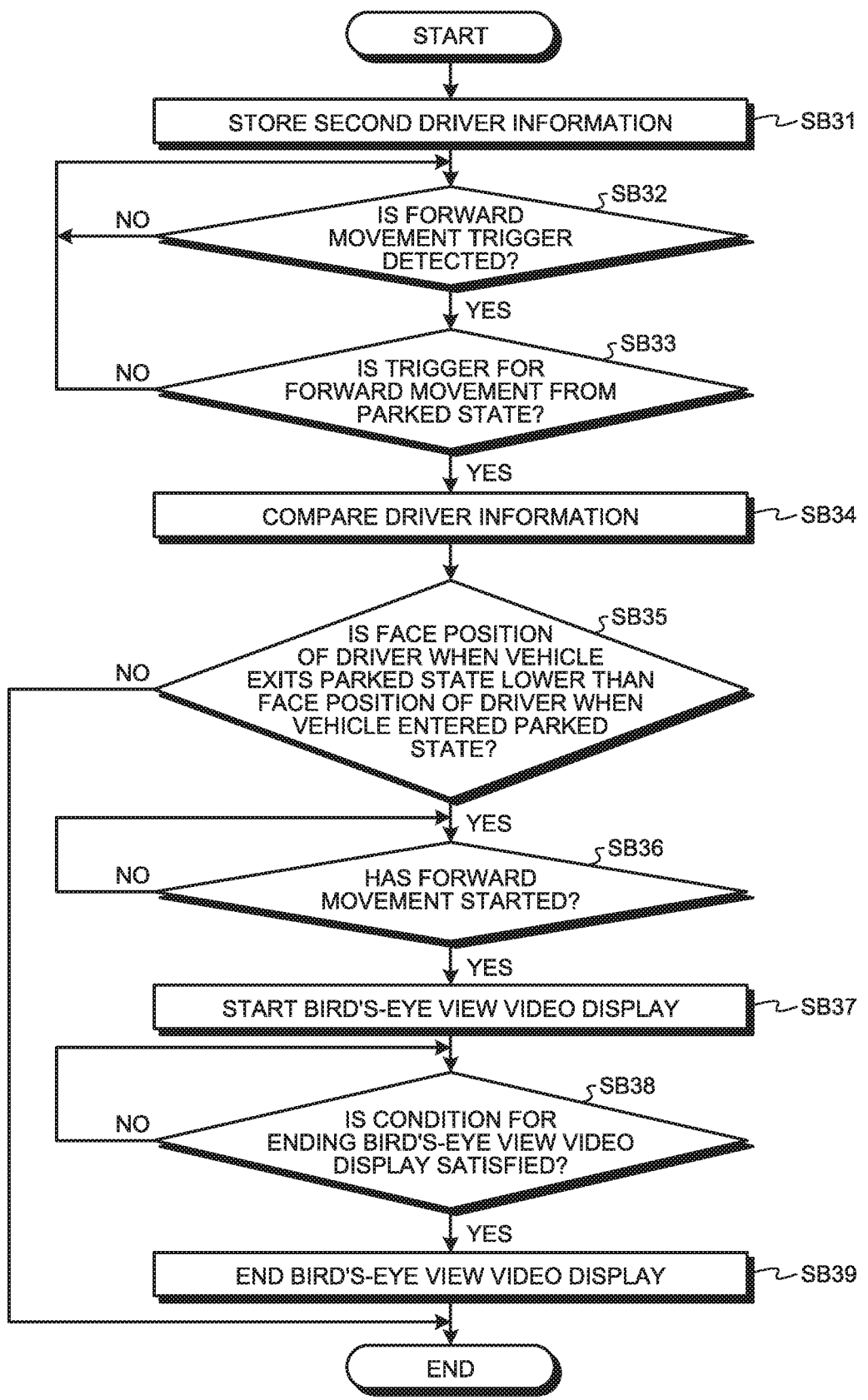
FIG. 25 is a flowchart illustrating an example of a flow of processing in the display control device of the display control system according to an eleventh embodiment of the present disclosure.

The display control system 1B according to an eleventh embodiment of the present disclosure will be described with reference to FIG. 25. FIG. 25 is a flowchart illustrating an example of a flow of processing in the display control device of the display control system according to the eleventh embodiment. The basic configuration of the display control system 1B is the same as that of the display control system 1B of the tenth embodiment. The display control system 1B differs from that of the tenth embodiment in that the bird's-eye view video 100 is displayed if the face position of the driver when the vehicle V1 exits the parked state is lower than the face position of the driver when the vehicle V1 entered the parked state by a predetermined distance or longer.

The driver's seat camera 21B takes a photograph so as to be capable of recognizing the face position of the driver relative to the vehicle V1. For example, the driver's seat camera 21B photographs a portion in a fixed position of the vehicle V1 and the face of the driver as a photographic subject. Alternatively, the driver's seat camera 21B takes a photograph so as to be capable of recognizing a change in the face position of the driver. For example, the driver's seat camera 21B photographs the same photographing region when the vehicle V1 enters the parked state and when the vehicle exits the parking space. The face position of the driver is obtained by applying the image processing to the video captured by the driver's seat camera 21B described above. The expression "face position of the driver" mentioned herein may be replaced with "position of the eyes of the driver".

The driver information acquiring unit 43B acquires the information about the face position of the driver. The driver information acquiring unit 43B acquires the information about the face position of the driver when the vehicle V1 enters the parked state as the first driver information and the information about the face position of the driver when the vehicle V1 exits the parked state as the second driver information.

If the comparing unit 45B determines that the face position of the driver when the vehicle V1 exits the parked state is lower than the face position of the driver when the vehicle V1 entered the parked state by the predetermined distance or longer, the bird's-eye view video generator 44B generates the bird's-eye view video 100.

The comparing unit 45B performs the image processing, and compares the face position of the driver when the vehicle V1 entered the parked state with the face position of the driver when the vehicle V1 exits the parked state to determine whether a difference in position of the predetermined distance or longer is present in the up-down direction between the face position of the driver when the vehicle V1 entered the parked state and the face position of the driver when the vehicle V1 exits the parked state. The difference in position of the predetermined distance or longer is, for example, 5 cm.

If the comparing unit 45B determines that the face position of the driver when the vehicle V1 exits the parked state is lower than the face position of the driver when the vehicle V1 entered the parked state by the predetermined distance or longer, the display controller 48B displays the bird's-eye view video 100 on the display panel 31.

The following describes the flow of the processing in the display control device 40B of the display control system 1B, using FIG. 25. Processing performed at Steps SB31 to SB34 and SB36 to SB39 is the same as the processing at Steps SB21 to SB24 and SB26 to SB29 of the flowchart illustrated in FIG. 24.

The display control device 40B determines whether the face position of the driver when the vehicle V1 exits the parked state is lower than the face position of the driver when the vehicle V1 entered the parked state (Step SB35). The first driver information is compared with the second driver information, and, if the face position of the driver when the vehicle V1 exits the parked state is determined to be not lower than the face position of the driver when the vehicle V1 entered the parked state by the predetermined distance or longer (No at Step SB35), the display control device 40B ends the process. The first driver information is compared with the second driver information, and, if the face position of the driver when the vehicle V1 exits the parked state is determined to be lower than the face position of the driver when the vehicle V1 entered the parked state by the predetermined distance or longer (Yes at Step SB35), the display control device 40B proceeds to the processing at SB36.

As described above, if the comparing unit 45B determines that the face position of the driver when the vehicle V1 exits the parked state is lower than the face position of the driver when the vehicle V1 entered the parked state, the present embodiment displays the bird's-eye view video 100 generated by the bird's-eye view video generator 44B on the display panel 31. In this manner, the present embodiment can appropriately display the bird's-eye view video 100 according to the change in the face position of the driver when the vehicle V1 exits the parked state. This display allows the driver to appropriately check the periphery of the vehicle V1 with the bird's-eye view video 100 in addition to checking the periphery of the vehicle V1 by eyesight or using the mirror even if the face position of the driver when the vehicle V1 exits the parked state has become lower than that when the vehicle V1 entered the parked state, and thus the region visible from the driver's seat has changed.

Twelfth Embodiment

Figure 26:
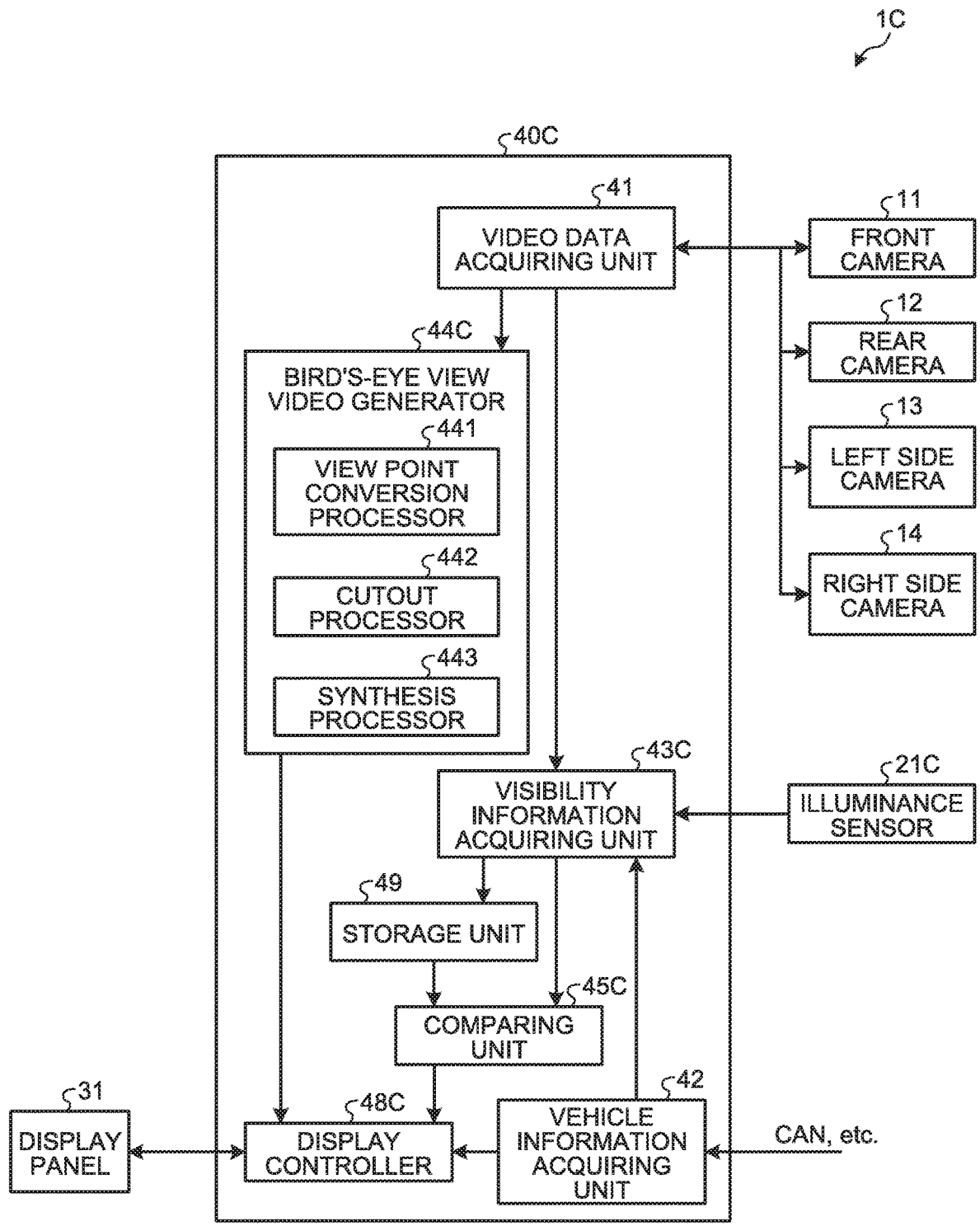
FIG. 26 is a block diagram illustrating a configuration example of a display control system according to a twelfth embodiment of the present disclosure.

A display control system 1C according to a twelfth embodiment of the present disclosure will be described with reference to FIGS. 26 to 28. FIG. 26 is a block diagram illustrating a configuration example of the display control system according to the twelfth embodiment. The basic configuration of the display control system 1C is the same as that of the display control system 1 of the first embodiment. The display control system 1C appropriately displays the bird's-eye view video 100, for example, if visibility (peripheral checking condition) around the vehicle when the vehicle exits the parked state is lower than the visibility around the vehicle V1 when the vehicle V1 entered the parked state.

The display control system 1C will be described using FIG. 26. The display control system 1C includes the front camera (photographing unit) 11, the rear camera (photographing unit) 12, the left side camera (photographing unit) 13, the right side camera (photographing unit) 14, an illuminance sensor 21C, the display panel (display unit) 31, and a display control device 40C.

The illuminance sensor 21C is disposed, for example, on the front section, the right side, or the left side of the vehicle V1, and measures illuminance of a road surface in the front area on the vehicle V1. The illuminance sensor 21C outputs the measurement result to a visibility information acquiring unit (information acquiring unit) 43C of the display control device 40C.

The display control device 40C includes the video data acquiring unit 41, the vehicle information acquiring unit 42, the visibility information acquiring unit 43C, a bird's-eye view video generator 44C, a comparing unit 45C, a display controller 48C, and the storage unit 49 serving as the internal memory. The display control device 40C may be constituted by one or a plurality of devices.

The vehicle information acquiring unit 42 outputs the acquired vehicle information to the visibility information acquiring unit 43C and the display controller 48C.

The visibility information acquiring unit 43C causes the illuminance sensor 21C to acquire first visibility information (first information) serving as information indicating the visibility around the vehicle V1 when the vehicle V1 has moved backward and entered the parked state and second visibility information (second information) serving as information indicating the visibility around the vehicle V1 when the vehicle V1 moves forward from the parked state to exit the parked state. In more detail, when the vehicle V1 has moved backward and entered the parked state, the visibility information acquiring unit 43C acquires the illuminance information measured by the illuminance sensor 21C as the first visibility information. The visibility information acquiring unit 43C stores the first visibility information acquired when the vehicle V1 has entered the parked state in the storage unit 49. When the vehicle V1 moves forward from the parked state to exit the parked state, the visibility information acquiring unit 43C acquires the illuminance information measured by the illuminance sensor 21C as the second visibility information. The determination that the vehicle V1 has moved backward and entered the parked state and the determination that the vehicle V1 moves forward to exit the parked state are made based on, for example, the gear shift operation information and the engine on/off information of the vehicle V1 acquired from the vehicle information acquiring unit 42. The visibility information acquiring unit 43C outputs the second visibility information acquired when the vehicle V1 exits the parked state to the comparing unit 45C.

The first visibility information is the illuminance information about the road surface in the front area, the right side area, or the left side area on the vehicle V1 acquired when the vehicle V1 has moved backward and entered the parked state.

The second visibility information is the illuminance information about the road surface in the front area, the right side area, or the left side area on the vehicle V1 acquired when the vehicle V1 moves forward from the parked state to exit the parked state. If the second visibility information is information obtained by the illuminance sensor 21C disposed on the front section of the vehicle V1, the illuminance information when headlamps and the like of the vehicle V1 are unlit is used as the second visibility information. If the second visibility information is information obtained by the illuminance sensor 21C disposed on the right side or the left side of the vehicle V1, the illuminance information before the vehicle V1 exits the parked state is used as the second visibility information, regardless of the state of the headlamps and the like of the vehicle V1.

If the comparing unit 45C determines that the visibility in the second visibility information acquired when the vehicle V1 exits the parked state is lower than that in the first visibility information, the bird's-eye view video generator 44C generates the bird's-eye view video 100. In the present embodiment, if the comparing unit 45C determines that the illuminance when the vehicle V1 exits the parked state is lower than the illuminance when the vehicle V1 entered the parked state, the bird's-eye view video generator 44C generates the bird's-eye view video 100. In more detail, in the present embodiment, if the comparing unit 45C determines that the vehicle V1 entered the parked state at daytime illuminance and exits the parked state at nighttime illuminance, the bird's-eye view video generator 44C generates the bird's-eye view video 100.

The comparing unit 45C compares the first visibility information with the second visibility information to compare the visibility around the vehicle V1 between when the vehicle V1 entered the parked state and when the vehicle V1 exits the parked state. In the present embodiment, the comparing unit 45C compares the illuminance around the vehicle V1 when the vehicle V1 entered the parked state with the illuminance around the vehicle V1 when the vehicle V1 exits the parked state to determine whether the illuminance when the vehicle V1 exits the parked state is lower than the illuminance when the vehicle V1 entered the parked state. In more detail, the comparing unit 45C compares the illuminance around the vehicle V1 when the vehicle V1 entered the parked state with the illuminance around the vehicle V1 when the vehicle V1 exits the parked state to determine whether the vehicle V1 entered the parked state at the daytime illuminance and exits the parked state at the nighttime illuminance.

The present embodiment assumes that the daytime illuminance is 2000 lux or higher, and the nighttime illuminance is 500 lux or lower.

If the comparing unit 45C determines that the visibility in the second visibility information acquired when the vehicle V1 exits the parked state is lower than that in the first visibility information, the display controller 48C displays the bird's-eye view video 100 generated by the bird's-eye view video generator 44C on the display panel 31. In the present embodiment, if the comparing unit 45C determines that the illuminance when the vehicle V1 exits the parked state is lower than the illuminance when the vehicle V1 entered the parked state, the display controller 48C displays the bird's-eye view video 100 on the display panel 31. In more detail, if the comparing unit 45C determines that the vehicle V1 entered the parked state at the daytime illuminance and exits the parked state at the nighttime illuminance, the display controller 48C displays the bird's-eye view video 100 on the display panel 31.

Figure 27:
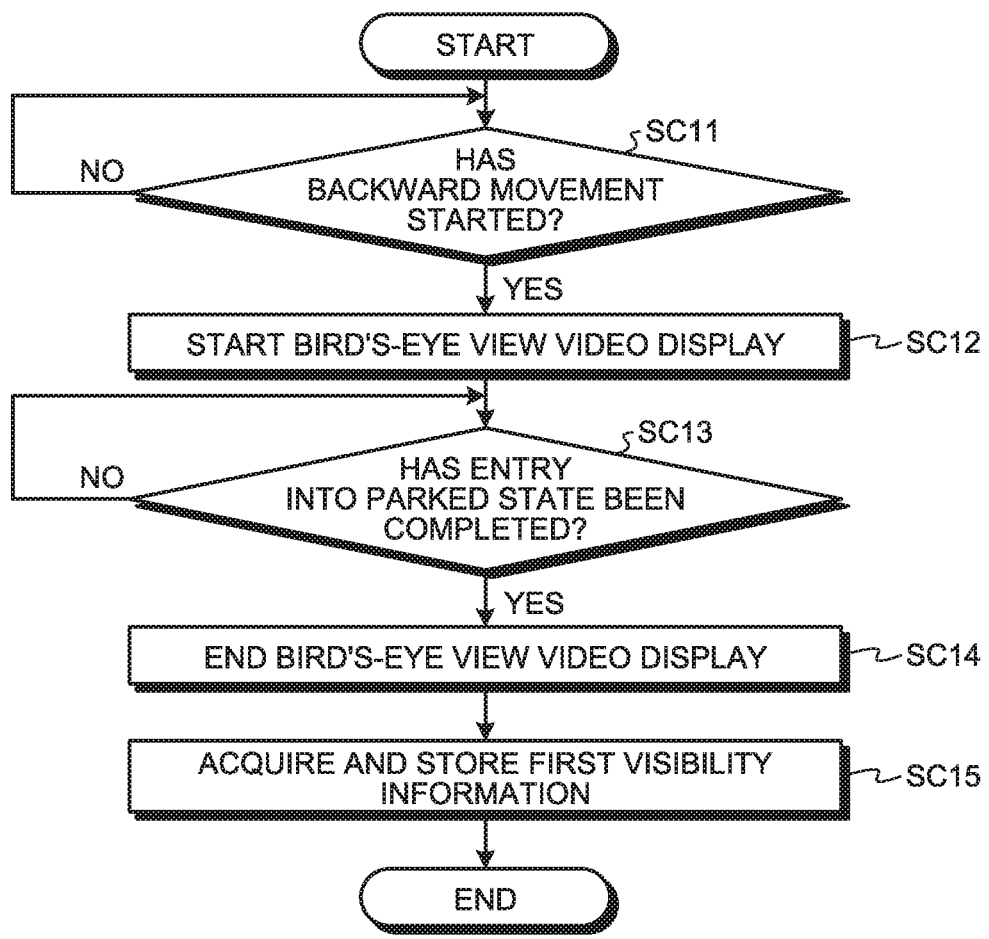
FIG. 27 is a flowchart illustrating an example of a flow of processing in a display control device of the display control system according to the twelfth embodiment.
Figure 28:
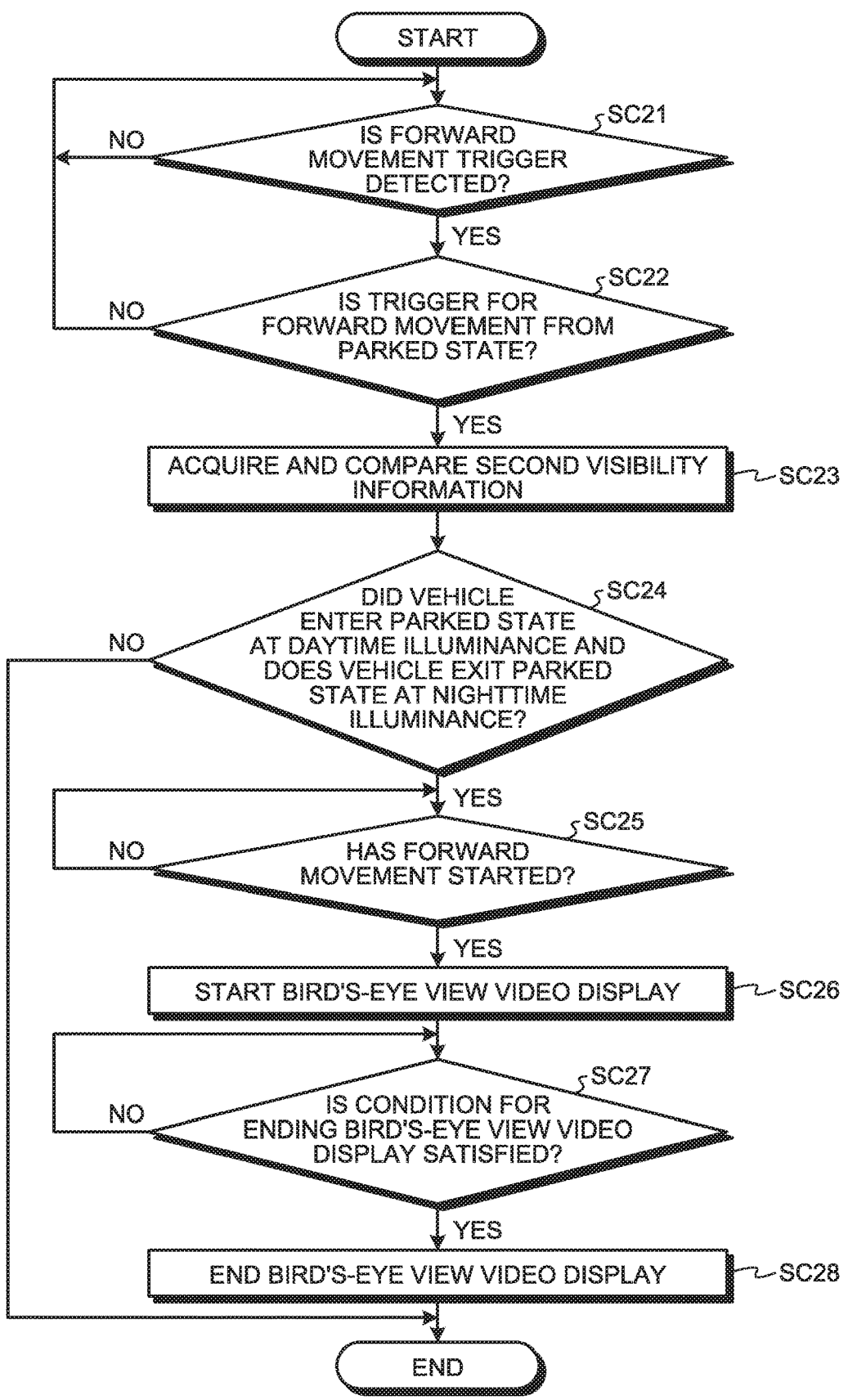
FIG. 28 is a flowchart illustrating another example of the flow of the processing in the display control device of the display control system according to the twelfth embodiment.

The following describes a flow of processing in the display control device 40C of the display control system 1C, using FIGS. 27 and 28. FIG. 27 is a flowchart illustrating an example of the flow of the processing in the display control device of the display control system according to the twelfth embodiment. FIG. 28 is a flowchart illustrating another example of the flow of the processing in the display control device of the display control system according to the twelfth embodiment.

The flow of the processing when the vehicle V1 enters the parked state will first be described. Processing performed at Steps SC11 to SC14 is the same as the processing at Steps S11 to S14 of the flowchart illustrated in FIG. 5.

The display control device 40C causes the visibility information acquiring unit 43C to acquire the first visibility information and stores it in the storage unit 49 (Step SC15). Then, the display control device 40C ends the process.

The following describes the flow of the processing when the vehicle V1 exits the parked state. Processing performed at Steps SC21, SC22, and SC25 to SC28 is the same as the processing at Steps S21, S22, and S25 to S28 of the flowchart illustrated in FIG. 6.

The display control device 40C causes the visibility information acquiring unit 43C to acquire the second visibility information, and makes a comparison (Step SC23). In more detail, the display control device 40C causes the visibility information acquiring unit 43C to acquire the second visibility information. The display control device 40C causes the comparing unit 45C to compare the first visibility information with the second visibility information. The display control device 40C causes the comparing unit 45C to make the comparison to determine whether the visibility around the vehicle V1 has changed from when the vehicle V1 entered the parked state to when the vehicle V1 exits the parked state. The display control device 40C proceeds to processing at Step SC24.

The display control device 40C determines whether the result of the comparison by the comparing unit 45C is that the vehicle V1 entered the parked state at the daytime illuminance and exits the parked state at the nighttime illuminance (Step SC24). In the present embodiment, if the illuminance when the vehicle V1 entered the parked state was not the daytime illuminance, or the illuminance when the vehicle V1 exits the parked state is not the nighttime illuminance (No at Step SC24), the display control device 40C ends the process. In this case, the bird's-eye view video 100 is not displayed. If the vehicle V1 entered the parked state at the daytime illuminance and exits the parked state at the nighttime illuminance (Yes Step SC24), the display control device 40C proceeds to the processing at SC25.

As described above, if the comparing unit 45C determines that the vehicle V1 entered the parked state at the daytime illuminance and exits the parked state at the nighttime illuminance, the present embodiment displays the bird's-eye view video 100 generated by the bird's-eye view video generator 44C on the display panel 31. In this manner, the present embodiment can appropriately display the bird's-eye view video 100 according to the change in the illuminance around the vehicle V1 when the vehicle V1 exits the parked state. This display allows the driver to appropriately check the periphery of the vehicle V1 with the bird's-eye view video 100 in addition to checking the periphery of the vehicle V1 by eyesight or using the mirror even if the vehicle V1 entered the parked state at the daytime illuminance and exits the parked state at the nighttime illuminance, and thus, the visibility around the vehicle V1 has dropped.

The present embodiment displays the bird's-eye view video 100 only when the bird's-eye view video 100 needs to be displayed according to the change in the illuminance around the vehicle V1 when the vehicle V1 exits the parked state. In this manner, the present embodiment can restrain the bird's-eye view video from being displayed in situations where the bird's-eye view video need not be displayed, and restrain the bird's-eye view video from being displayed when, for example, a route is desired to be checked using the navigation system.

Thirteenth Embodiment

Figure 29:
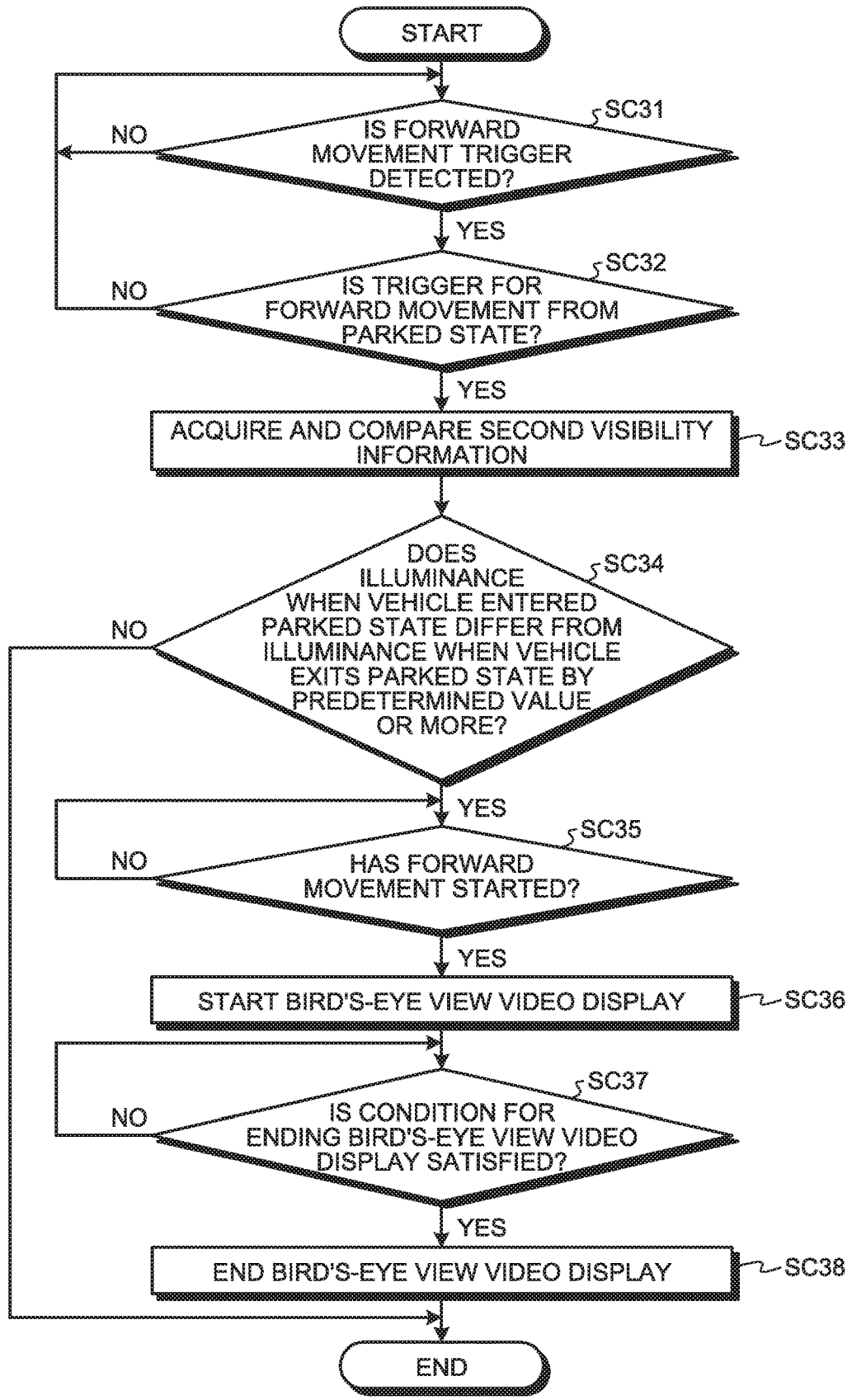
FIG. 29 is a flowchart illustrating an example of a flow of processing in the display control device of the display control system according to a thirteenth embodiment of the present disclosure.

The display control system 1C according to a thirteenth embodiment of the present disclosure will be described with reference to FIG. 29. FIG. 29 is a flowchart illustrating an example of a flow of processing in the display control device of the display control system according to the thirteenth embodiment. The basic configuration of the display control system 1C is the same as that of the display control system 1C of the twelfth embodiment. The display control system 1C differs from that of the twelfth embodiment in that the bird's-eye view video 100 is displayed if the illuminance when the vehicle V1 entered the parked state differs from the illuminance when the vehicle V1 exits the parked state by a predetermined value or more.

If the comparing unit 45C determines that the illuminance when the vehicle V1 entered the parked state differs from the illuminance when the vehicle V1 exits the parked state by the predetermined value or more, the bird's-eye view video generator 44C generates the bird's-eye view video 100.

The comparing unit 45C compares the illuminance around the vehicle V1 when the vehicle V1 entered the parked state with the illuminance around the vehicle V1 when the vehicle V1 exits the parked state to determine whether the illuminance when the vehicle V1 entered the parked state differs from the illuminance when the vehicle V1 exits the parked state by the predetermined value or more. The difference in illuminance by the predetermined value or more is, for example, 5000 lux.

If the comparing unit 45C determines that the illuminance when the vehicle V1 entered the parked state differs from the illuminance when the vehicle V1 exits the parked state by the predetermined value or more, the display controller 48C displays the bird's-eye view video 100 on the display panel 31.

The following describes the flow of the processing in the display control device 40C of the display control system 1C, using FIG. 29. Processing performed at Steps SC31 to SC33 and SC35 to SC38 is the same as the processing at Steps SC21 to SC23 and SC25 to SC28 of the flowchart illustrated in FIG. 28.

The display control device 40C determines whether the result of the comparison by the comparing unit 45C is that the illuminance when the vehicle V1 entered the parked state differs from the illuminance when the vehicle V1 exits the parked state by the predetermined value or more (Step SC34). In the present embodiment, if the illuminance when the vehicle V1 entered the parked state does not differ from the illuminance when the vehicle V1 exits the parked state by the predetermined value or more (No at Step SC34), the display control device 40C ends the process. In this case, the bird's-eye view video 100 is not displayed. If the illuminance when the vehicle V1 entered the parked state differs from the illuminance when the vehicle V1 exits the parked state by the predetermined value or more (Yes at Step SC34), the display control device 40C proceeds to the processing at Step SC35. The difference in illuminance of the predetermined value or more mentioned herein refers to a difference from a state of higher illuminance to a state of lower illuminance.

As described above, if the comparing unit 45C determines that the illuminance when the vehicle V1 entered the parked state differs from the illuminance when the vehicle V1 exits the parked state by the predetermined value or more, the present embodiment displays the bird's-eye view video 100 generated by the bird's-eye view video generator 44C on the display panel 31. In this manner, the present embodiment can appropriately display the bird's-eye view video 100 if the illuminance when the vehicle V1 entered the parked state differs from the illuminance when the vehicle V1 exits the parked state by the predetermined value or more. This display allows the driver to appropriately check the periphery of the vehicle V1 with the bird's-eye view video 100 in addition to checking the periphery of the vehicle V1 by eyesight or using the mirror even if the illuminance when the vehicle V1 entered the parked state differs from the illuminance when the vehicle V1 exits the parked state by the predetermined value or more, and thus, the visibility around the vehicle V1 has dropped.

Fourteenth Embodiment

Figure 30:
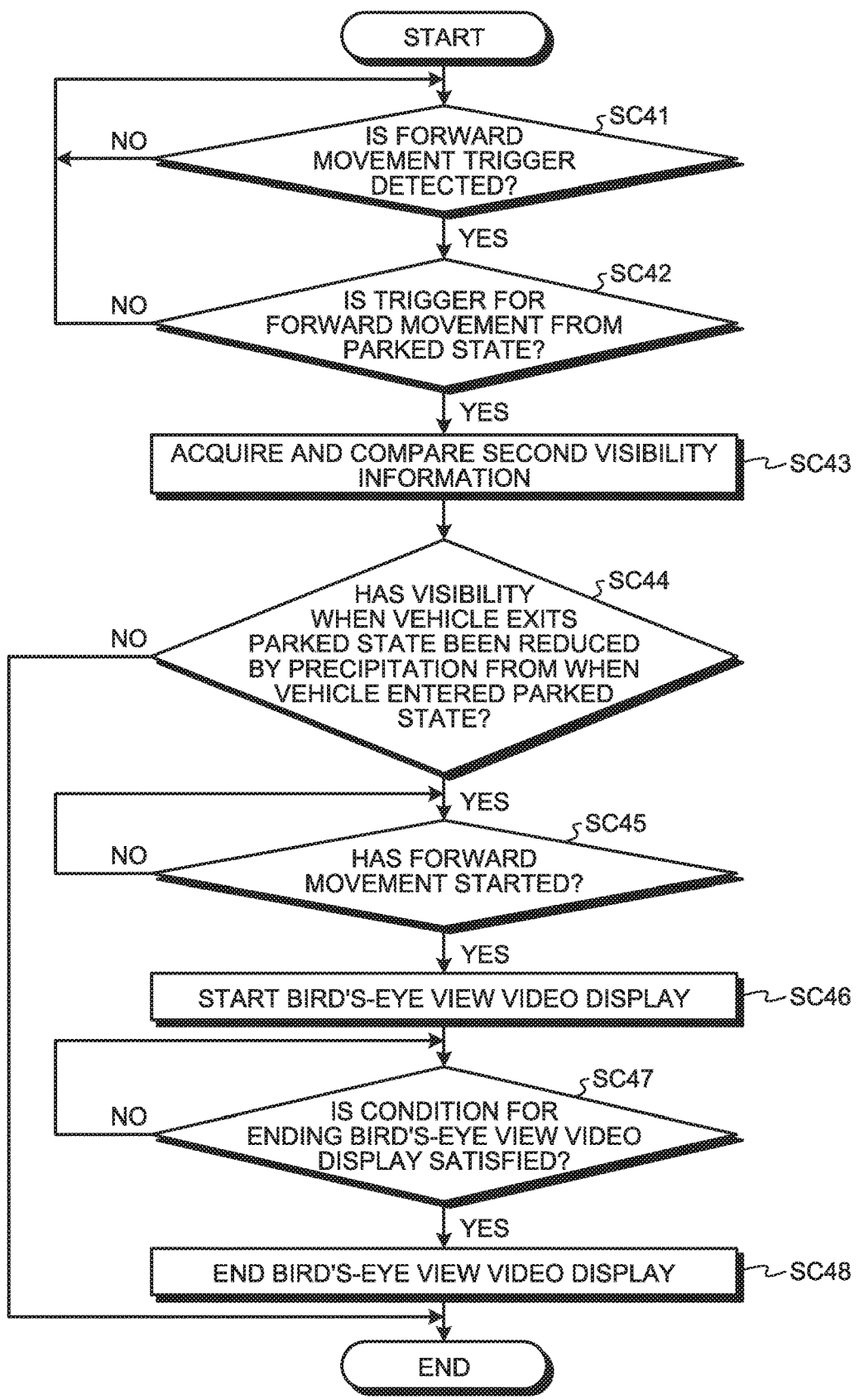
FIG. 30 is a flowchart illustrating an example of a flow of processing in the display control device of the display control system according to a fourteenth embodiment of the present disclosure.

The display control system 1C according to a fourteenth embodiment of the present disclosure will be described with reference to FIG. 30. FIG. 30 is a flowchart illustrating an example of a flow of processing in the display control device of the display control system according to the fourteenth embodiment. The display control system 1C differs from that of the twelfth embodiment in that the bird's-eye view video 100 is displayed if the visibility when the vehicle V1 exits the parked state has been reduced by precipitation from when the vehicle V1 entered the parked state.

The visibility information acquiring unit 43C acquires the first visibility information serving as information indicating weather at the current location when the vehicle V1 enters the parked state and the second visibility information serving as the information indicating the weather at the current location when the vehicle V1 exits the parked state. For example, the visibility information acquiring unit 43C may acquire the weather at the current location based on at least any of detection information from a precipitation sensor disposed on the vehicle V1, operation information about a wiper, and weather information acquired via a communication network. Alternatively, the visibility information acquiring unit 43C may acquire the weather at the current location by applying the image processing to the peripheral video data acquired by the video data acquiring unit 41.

If the comparing unit 45C determines that the visibility when the vehicle V1 exits the parked state has been reduced by a change in weather from when the vehicle V1 entered the parked state, the bird's-eye view video generator 44C generates the bird's-eye view video 100. In the present embodiment, if the comparing unit 45C determines that the visibility when the vehicle V1 exits the parked state has been reduced by the precipitation from when the vehicle V1 entered the parked state, the bird's-eye view video generator 44C generates the bird's-eye view video 100.

The comparing unit 45C compares the weather at the current location when the vehicle V1 entered the parked state with the weather at the current location when the vehicle V1 exits the parked state to determine whether the visibility when the vehicle V1 exits the parked state has been reduced by the change in weather from when the vehicle V1 entered the parked state. In the present embodiment, the comparing unit 45C compares the weather at the current location when the vehicle V1 entered the parked state with the weather at the current location when the vehicle V1 exits the parked state to determine whether the visibility when the vehicle V1 exits the parked state has been reduced by the precipitation from when the vehicle V1 entered the parked state.

If the comparing unit 45C determines that the visibility when the vehicle V1 exits the parked state has been reduced by the change in weather from when the vehicle V1 entered the parked state, the display controller 48C displays the bird's-eye view video 100 on the display panel 31. In the present embodiment, if the comparing unit 45C determines that the visibility when the vehicle V1 exits the parked state has been reduced by the precipitation from when the vehicle V1 entered the parked state, the display controller 48C displays the bird's-eye view video 100 on the display panel 31.

The following describes the flow of the processing in the display control device 40C of the display control system 1C, using FIG. 30. Processing performed at Steps SC41 to SC43 and SC45 to SC48 is the same as the processing at Steps SC21 to SC23 and SC25 to SC28 of the flowchart illustrated in FIG. 28.

The display control device 40C determines whether the result of the comparison by the comparing unit 45C is that the visibility when the vehicle V1 exits the parked state has been reduced by the precipitation from when the vehicle V1 entered the parked state (Step SC44). If the visibility when the vehicle V1 exits the parked state is determined to have not been reduced by the precipitation from when the vehicle V1 entered the parked state (No at Step SC44), the display control device 40C ends the process. In this case, the bird's-eye view video 100 is not displayed. If the visibility when the vehicle V1 exits the parked state is determined to have been reduced by the precipitation from when the vehicle V1 entered the parked state (Yes at Step SC44), the display control device 40C proceeds to the processing at Step SC45.

As described above, if the comparing unit 45C determines that the visibility when the vehicle V1 exits the parked state has been reduced by the precipitation from when the vehicle V1 entered the parked state, the present embodiment displays the bird's-eye view video 100 generated by the bird's-eye view video generator 44C on the display panel 31. In this manner, the present embodiment can appropriately display the bird's-eye view video 100 if the visibility when the vehicle V1 exits the parked state has been reduced by the precipitation from when the vehicle V1 entered the parked state. This display allows the driver to appropriately check the periphery of the vehicle V1 with the bird's-eye view video 100 in addition to checking the periphery of the vehicle V1 by eyesight or using the mirror even if the visibility around the vehicle V1 has been reduced by the precipitation.

Fifteenth Embodiment

Figure 31:
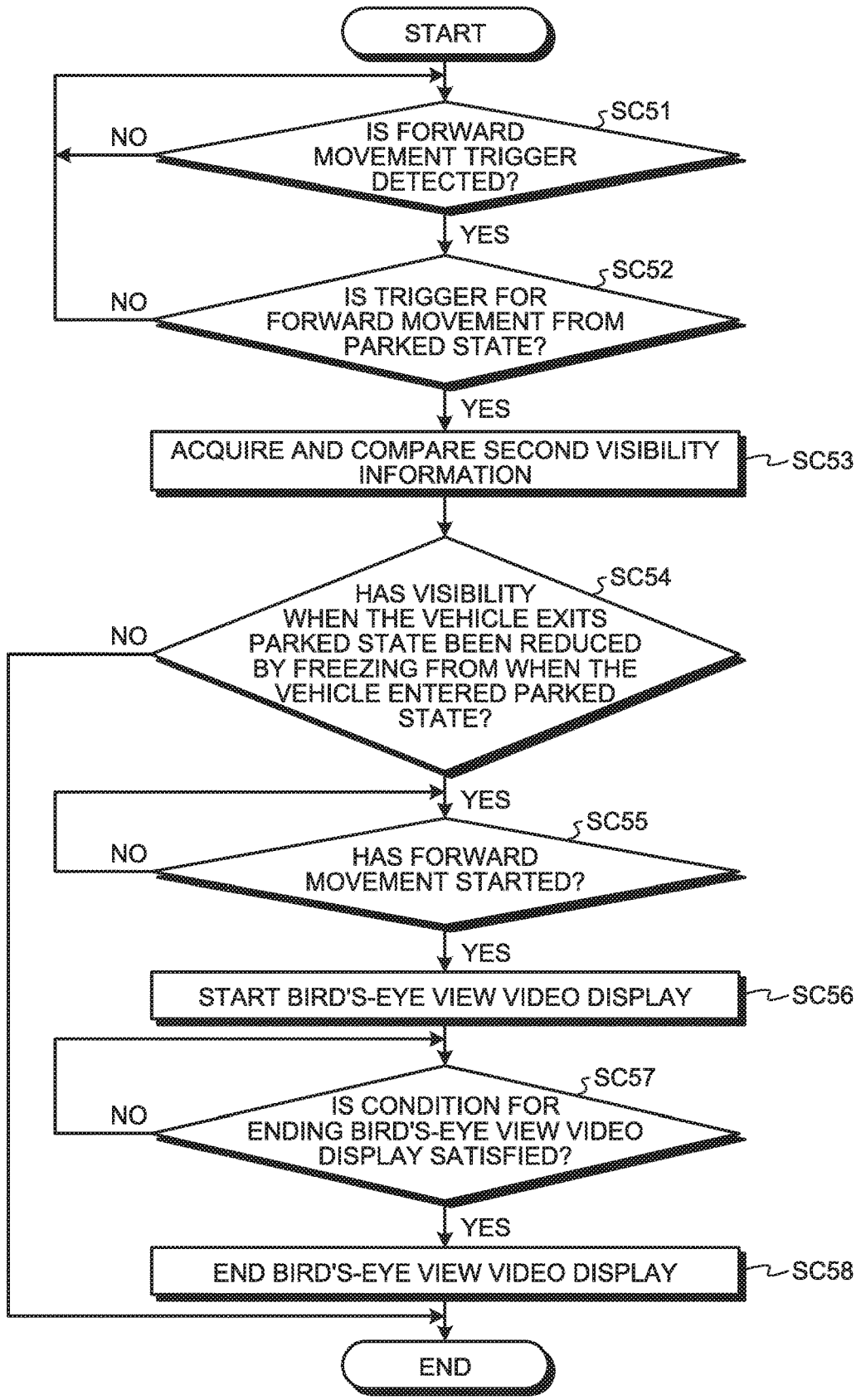
FIG. 31 is a flowchart illustrating an example of a flow of processing in the display control device of the display control system according to a fifteenth embodiment of the present disclosure.

The display control system 1C according to a fifteenth embodiment of the present disclosure will be described with reference to FIG. 31. FIG. 31 is a flowchart illustrating an example of a flow of processing in the display control device of the display control system according to the fifteenth embodiment. The display control system 1C differs from that of the twelfth embodiment in that the bird's-eye view video 100 is displayed if the visibility when the vehicle V1 exits the parked state has been reduced by freezing of window glass from when the vehicle V1 entered the parked state.

The window glass includes window glass on at least one of the front, rear, right, and left sides of the vehicle V1. The window glass includes a windshield. The window glass represents a portion of the vehicle V1 through which the outside thereof is visible.

The visibility information acquiring unit 43C acquires the first visibility information serving as information indicating a frozen state of the window glass of the vehicle V1 when the vehicle V1 enters the parked state and the second visibility information serving as the information indicating the frozen state of the window glass of the vehicle V1 when the vehicle V1 exits the parked state. For example, the visibility information acquiring unit 43C may acquire the information indicating the frozen state of the window glass based on at least any of operation information about a defroster and a defogger disposed on the vehicle V1, temperature information about outside air measured by a thermometer, and the weather information acquired via the communication network. Alternatively, the visibility information acquiring unit 43C may acquire the information indicating the frozen state of the window glass by applying the image processing to the peripheral video data acquired by the video data acquiring unit 41.

If the comparing unit 45C determines that the visibility when the vehicle V1 exits the parked state has been reduced by the freezing of the window glass from when the vehicle V1 entered the parked state, the bird's-eye view video generator 44C generates the bird's-eye view video 100.

The comparing unit 45C determines whether the visibility when the vehicle V1 exits the parked state has been reduced by the freezing of the window glass from when the vehicle V1 entered the parked state.

If the comparing unit 45C determines that the visibility when the vehicle V1 exits the parked state has been reduced by the freezing of the window glass from when the vehicle V1 entered the parked state, the display controller 48C displays the bird's-eye view video 100 on the display panel 31.

The following describes the flow of the processing in the display control device 40C of the display control system 1C, using FIG. 31. Processing performed at Steps SC51 to SC53 and SC55 to SC58 is the same as the processing at Steps SC21 to SC23 and SC25 to SC28 of the flowchart illustrated in FIG. 28.

The display control device 40C determines whether the result of the comparison by the comparing unit 45C is that the visibility when the vehicle V1 exits the parked state has been reduced by the freezing of the window glass from when the vehicle V1 entered the parked state (Step SC54). If the visibility when the vehicle V1 exits the parked state is determined to have not been reduced by the freezing of the window glass from when the vehicle V1 entered the parked state (No at Step SC54), the display control device 40C ends the process. In this case, the bird's-eye view video 100 is not displayed. If the visibility when the vehicle V1 exits the parked state is determined to have been reduced by the freezing of the window glass from when the vehicle V1 entered the parked state (Yes at Step SC54), the display control device 40C proceeds to the processing at Step SC55.

As described above, if the comparing unit 45C determines that the visibility when the vehicle V1 exits the parked state has been reduced by the freezing of the window glass from when the vehicle V1 entered the parked state, the present embodiment displays the bird's-eye view video 100 generated by the bird's-eye view video generator 44C on the display panel 31. In this manner, the present embodiment can appropriately display the bird's-eye view video 100 if the visibility when the vehicle V1 exits the parked state has been reduced by the freezing of the window glass from when the vehicle V1 entered the parked state. This display allows the driver to appropriately check the periphery of the vehicle V1 with the bird's-eye view video 100 in addition to checking the periphery of the vehicle V1 by eyesight or using the mirror even if the visibility around the vehicle V1 has been reduced by the freezing of the window glass.

In particular, in some cases, the visibility through the glass on the lateral sides of the rear seat is difficult to be improved by operating the defroster and the defogger depending on conditions such as operating time and temperature. According to the present embodiment, in such cases, the bird's-eye view video 100 is displayed, so that the periphery of the vehicle V1 can be appropriately checked.

Sixteenth Embodiment

Figure 32:
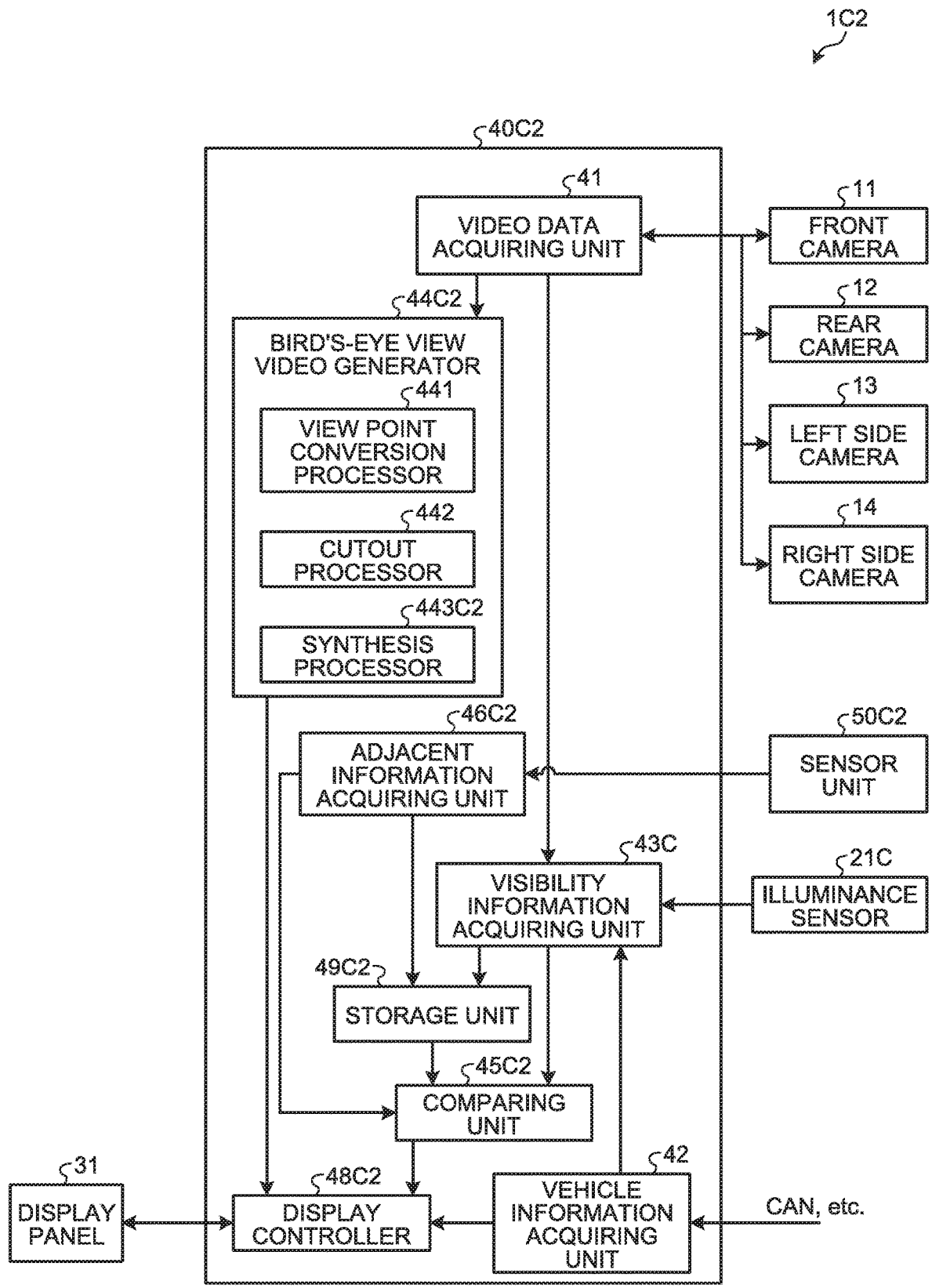
FIG. 32 is a block diagram illustrating a configuration example of a display control system according to a sixteenth embodiment of the present disclosure.
Figure 33:
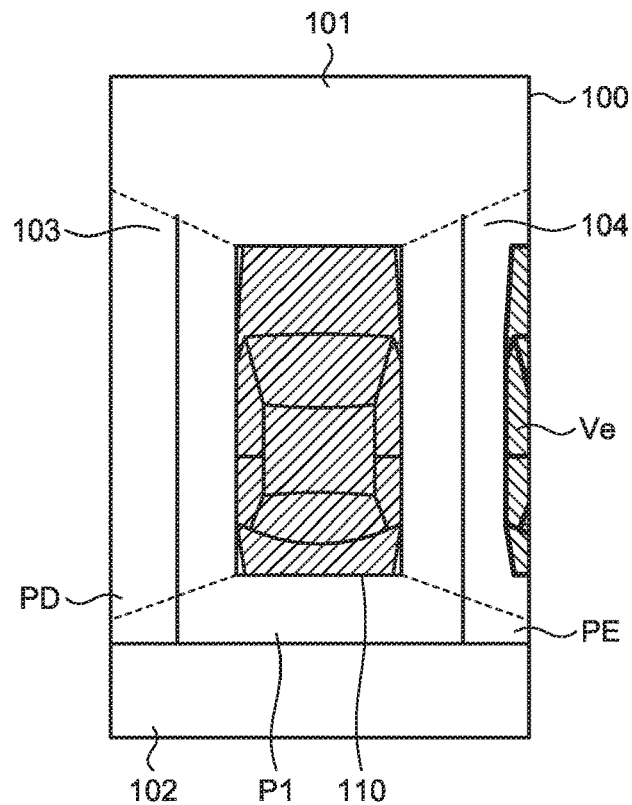
FIG. 33 is a diagram illustrating an example of the bird's-eye view video generated by a display control device of the display control system according to the sixteenth embodiment.

A display control system 1C2 according to a sixteenth embodiment of the present disclosure will be described with reference to FIGS. 32 and 33. FIG. 32 is a block diagram illustrating a configuration example of the display control system according to the sixteenth embodiment. FIG. 33 is a diagram illustrating an example of the bird's-eye view video generated by a display control device of the display control system according to the sixteenth embodiment. The display control system 1C2 differs from the display control system of the twelfth embodiment in that an adjacent vehicle serving as a detected obstacle is highlighted in the generated bird's-eye view video 100.

The display control system 1C2 further includes a sensor unit 50C2.

The sensor unit 50C2 includes a plurality of sensors disposed around the vehicle V1. The sensor unit 50C2 can detect obstacles located in all directions adjacent to the vehicle V1. In the present embodiment, the sensor unit 50C2 detects adjacent vehicles present in adjacent parking spaces as the obstacles adjacent to the vehicle V1. The sensor unit 50C2 is configured in the same manner as the sensor unit 21 of the first embodiment.

A display control device 40C2 further includes an adjacent information acquiring unit 46C2.

The adjacent information acquiring unit 46C2 acquires the obstacle information from the sensor unit 50C2 when the vehicle V1 moves forward from the parked state to exit the parked state. The adjacent information acquiring unit 46C2 stores the obstacle information acquired when the vehicle V1 exits the parked state in a storage unit 49C2, and outputs the obstacle information to a comparing unit 45C2.

If the comparing unit 45C2 determines that the illuminance when the vehicle V1 exits the parked state is lower than the illuminance when the vehicle V1 entered the parked state, a synthesis processor 443C2 of a bird's-eye view video generator 44C2 generates the bird's-eye view video 100 in which the detected adjacent vehicles are highlighted. For example, the synthesis processor 443C2 highlights the detected adjacent vehicles by coloring them or enclosing each of them with a thick line. Alternatively, in response to the result of the determination by the comparing unit 45C2, a display controller 48C2 causes the synthesis processor 443C2 to generate the bird's-eye view video 100 in which the detected adjacent vehicles are highlighted.

The display controller 48C2 displays the bird's-eye view video 100 in which the detected adjacent vehicles are highlighted on the display panel 31.

The bird's-eye view video 100 will be described using FIG. 33. In the bird's-eye view video 100, the detected adjacent vehicle Ve is colored to be highlighted.

As described above, if the comparing unit 45C2 determines that the illuminance when the vehicle V1 exits the parked state is lower than the illuminance when the vehicle V1 entered the parked state, the present embodiment displays the bird's-eye view video 100 in which the detected adjacent vehicle is highlighted on the display panel 31. According to the present embodiment, the information can easily be obtained regarding the detected adjacent vehicle when the illuminance has dropped during a period from when the vehicle V1 entered the parked state to when the vehicle V1 exits the parked state. According to the present embodiment, since the adjacent vehicle can easily be recognized in the bird's-eye view video 100, the driver can easily identify points to pay attention to when the vehicle V1 exits the parked state even if the illuminance has dropped.

Seventeenth Embodiment

Figure 34:
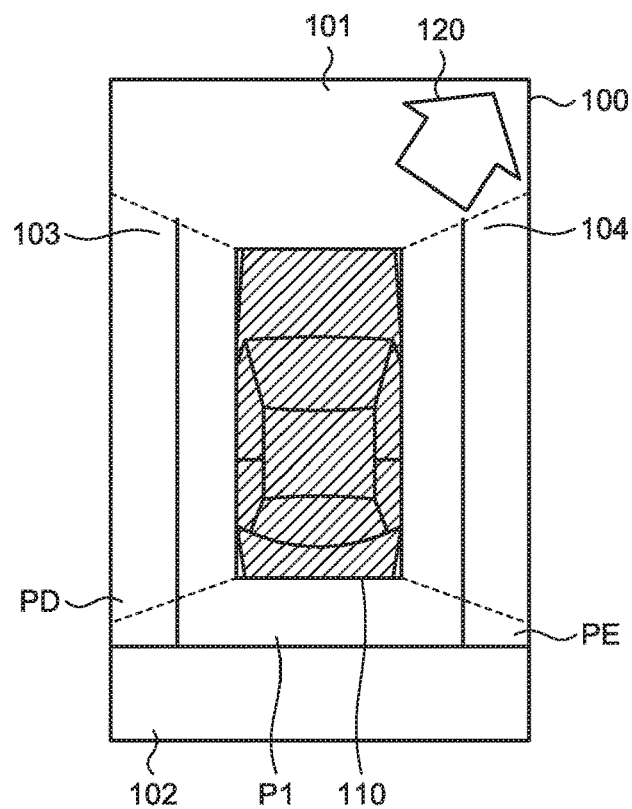
FIG. 34 is a diagram illustrating an example of the bird's-eye view video generated by the display control device of the display control system according to a seventeenth embodiment of the present disclosure.

The display control system 1C2 according to a seventeenth embodiment of the present disclosure will be described with reference to FIG. 34. FIG. 34 is a diagram illustrating an example of the bird's-eye view video generated by the display control device of the display control system according to the seventeenth embodiment. The basic configuration of the display control system 1C2 is the same as that of the display control system 1C2 of the sixteenth embodiment. The display control system 1C2 differs from that of the sixteenth embodiment in that the generated bird's-eye view video 100 displays the notification icon 120 that provides a notification of a direction in which a detected adjacent vehicle is present.

If the comparing unit 45C2 determines that the illuminance when the vehicle V1 exits the parked state is lower than the illuminance when the vehicle V1 entered the parked state, the synthesis processor 443C2 generates the bird's-eye view video 100 that displays the notification icon 120 indicating the direction in which the detected adjacent vehicle is present. For example, the synthesis processor 443C2 displays the notification icon 120 having an arrow shape.

If the comparing unit 45C2 determines that the illuminance when the vehicle V1 exits the parked state is lower than the illuminance when the vehicle V1 entered the parked state, the display controller 48C2 displays the bird's-eye view video 100 including the notification icon 120 indicating the direction of the detected adjacent vehicle on the display panel 31.

The bird's-eye view video 100 will be described using FIG. 34. The present embodiment assumes that an adjacent vehicle in the front right area outside the display region is detected. The bird's-eye view video 100 displays the notification icon 120 indicating the direction in which the detected adjacent vehicle is present.

As described above, if the comparing unit 45C2 determines that the illuminance when the vehicle V1 exits the parked state is lower than the illuminance when the vehicle V1 entered the parked state, the present embodiment displays, on the display panel 31, the bird's-eye view video 100 that displays the notification icon 120 indicating the direction in which the detected adjacent vehicle is present. According to the present embodiment, even if the detected adjacent vehicle is not displayed in the bird's-eye view video 100, the information can easily be obtained regarding the direction in which the adjacent vehicle is present. According to the present embodiment, since the detected adjacent vehicle can easily be recognized even if it is not displayed in the bird's-eye view video 100, the driver can easily identify points to pay attention to when the vehicle V1 exits the parked state.

Eighteenth Embodiment

Figure 35:
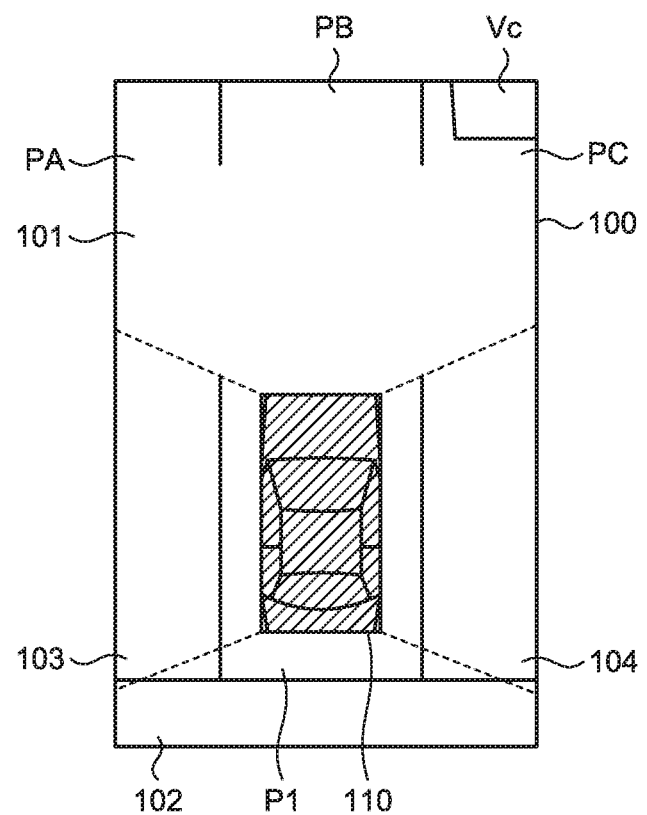
FIG. 35 is a diagram illustrating an example of the bird's-eye view video generated by the display control device of the display control system according to an eighteenth embodiment of the present disclosure.

The display control system 1C2 according to an eighteenth embodiment of the present disclosure will be described with reference to FIG. 35. FIG. 35 is a diagram illustrating an example of the bird's-eye view video generated by the display control device of the display control system according to the eighteenth embodiment. The basic configuration of the display control system 1C2 is the same as that of the display control system 1C2 of the sixteenth embodiment. The display control system 1C2 differs from the display control system of the twelfth embodiment in that the generated bird's-eye view video 100 is displayed with the display region thereof changed such that the detected adjacent vehicle is included in the display region.

The cutout processor 442 cuts out the cutout region in which the detected adjacent vehicle is included in the display region from the peripheral video data converted through the view point conversion processing. Only a part of the detected adjacent vehicle may be included in the display region of the bird's-eye view video 100.

If the comparing unit 45C2 determines that the illuminance when the vehicle V1 exits the parked state is lower than the illuminance when the vehicle V1 entered the parked state, the display controller 48C2 displays, on the display panel 31, the bird's-eye view video 100 with the display region thereof changed so as to include the detected adjacent vehicle.

The bird's-eye view video 100 will be described using FIG. 35. The present embodiment assumes that the adjacent vehicle Vc in the front right area is detected. The bird's-eye view video 100 is displayed with the display region thereof enlarged forward so as to display the detected adjacent vehicle Vc.

As described above, if the comparing unit 45C2 determines that the illuminance when the vehicle V1 exits the parked state is lower than the illuminance when the vehicle V1 entered the parked state, the present embodiment displays, on the display panel 31, the bird's-eye view video 100 with the display region thereof changed so as to display the detected adjacent vehicle. According to the present embodiment, if the illuminance when the vehicle V1 exits the parked state is determined to be lower than the illuminance when the vehicle V1 entered the parked state, what has changed from when the vehicle V1 entered the parked state can easily be recognized, so that the driver can easily identify points to pay attention to when the vehicle V1 exits the parked state.

The components of the illustrated display control system are functionally conceptual, and may not necessarily be physically configured as illustrated. In other words, the specific forms of the devices are not limited to those illustrated, and all or part thereof may be functionally or physically distributed or integrated in any units according to processing loads, use conditions, or the like of the devices.

The configuration of the display control system is implemented, for example, as software, for example, by a program loaded in a memory. The embodiments above have been described as the functional blocks implemented by cooperation of hardware or software. In other words, the functional blocks can be implemented in various forms by hardware alone, software alone, or a combination thereof.

The components described above include those easily conceivable by those skilled in the art and those substantially the same. In addition, the configurations described above can be combined as appropriate. Furthermore, the configurations can be variously omitted, replaced, or changed without departing from the gist of the present disclosure.

Figure 10:
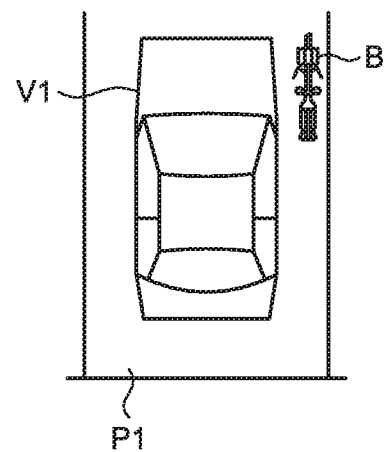
FIG. 10 is a diagram explaining the parking space of a home parking lot.

The following describes a case where the parking space P1 is a home parking lot, using FIG. 10. FIG. 10 is a diagram explaining the parking space of the home parking lot. The parking space P1 is a space for one vehicle V1 to be parked. The sensor unit 21 detects an obstacle, for example, a bicycle B present in the parking space P1, as an obstacle adjacent to the vehicle V1. The adjacent information acquiring unit 43 acquires information about the obstacle in the parking space P1 when the vehicle V1 has moved backward and entered the parked state as the first obstacle information, and the information about the obstacle in the parking space P1 when the vehicle V1 moves forward from the parked state to exit the parked state as the second obstacle information. If the comparing unit 45 determines that the number of obstacles in the parking space P1 has increased when the vehicle V1 exits the parked state, the display controller 48 displays the bird's-eye view video 100 on the display panel 31. In this manner, the present embodiment can display the bird's-eye view video not only if the number of adjacent vehicles in the adjacent parking spaces has increased, but also if the number of obstacles around the vehicle has increased.

Figure 19:
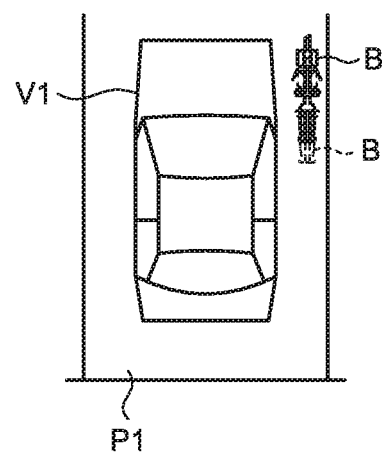
FIG. 19 is a diagram explaining the parking space of the home parking lot.

The following describes a case where the parking space P1 is the home parking lot, using FIG. 19. FIG. 19 is a diagram explaining the parking space of the home parking lot. The sensor unit 21 detects the position of the obstacle, for example, the bicycle B present in the parking space P1, as the position of the obstacle adjacent to the vehicle V1. The adjacent information acquiring unit 43 acquires position information about the obstacle in the parking space P1 when the vehicle V1 has moved backward and entered the parked state as the first obstacle position information and the position information about the obstacle in the parking space P1 when the vehicle V1 moves forward from the parked state to exit the parked state as the second obstacle position information. If the comparing unit 45 determines that the position of the obstacle in the parking space P1 has changed when the vehicle V1 exits the parked state, the display controller 48 displays the bird's-eye view video 100 on the display panel 31. In this manner, the present embodiment can display the bird's-eye view video not only if the position of the adjacent vehicle in the adjacent parking space has changed, but also if the position of the obstacle around the vehicle has changed.

Figure 11:
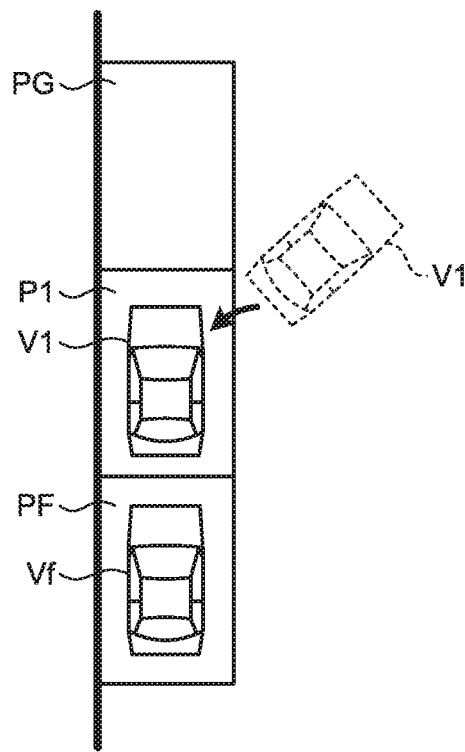
FIG. 11 is a diagram explaining parking spaces for parallel parking, and illustrates a state in which the vehicle enters one of the parking spaces.
Figure 12:
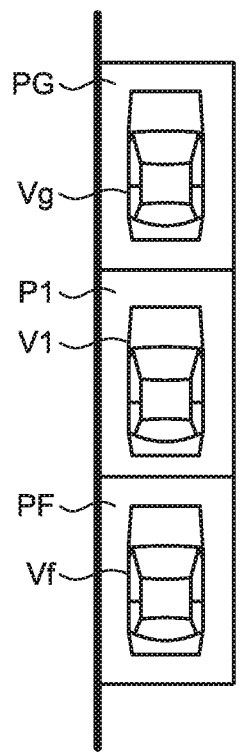
FIG. 12 is a diagram explaining the parking spaces for the parallel parking, and illustrates a state in which the vehicle exits the parking space.

The following describes a case where the parking space P1 is a parking space for parallel parking, using FIGS. 11 and 12. FIG. 11 is a diagram explaining parking spaces for the parallel parking, and illustrates a state in which the vehicle V1 enters the parked state. FIG. 12 is a diagram explaining the parking spaces for the parallel parking, and illustrates a state in which the vehicle V1 exits the parked state. A parking space PF is adjacent to the rear side of the parking space P1. A parking space PG is adjacent to the front side of the parking space P1. When the vehicle V1 enters the parked state, an adjacent vehicle Vf is present in the parking space PF, and no adjacent vehicle is present in the parking space PG. When the vehicle V1 exits the parked state, the adjacent vehicle Vf is present in the parking space PF, and an adjacent vehicle Vg is present in the parking space PG. The sensor unit 21 detects the adjacent vehicles present in the parking spaces PF and PG as obstacles adjacent to the vehicle V1. If the parking space P1 is determined to be the parking space for parallel parking based on map information of the navigation system (not illustrated), the lateral sides of the vehicle V1 are preferably excluded from the detection region of obstacles by the sensor unit 21. By excluding the lateral sides of the vehicle V1 from the detection region of obstacles, vehicles traveling on a roadway adjacent to the parallel parking spaces are avoided from being falsely detected. In the present embodiment, if the comparing unit 45 determines that an adjacent vehicle has been added in the parking space PF or the parking space PG when the vehicle V1 exits the parked state, the display controller 48 displays the bird's-eye view video 100 on the display panel 31. In this manner, the present embodiment can detect adjacent vehicles in appropriate directions in accordance with the mode of the parking space P1, and, if the number of adjacent vehicles has increased, can display the bird's-eye view video.

Figure 20:
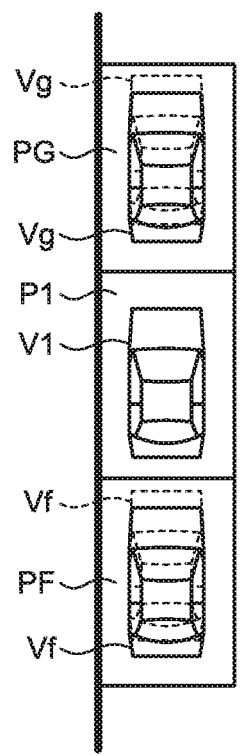
FIG. 20 is a diagram explaining the parking spaces for the parallel parking.

The following describes a case where the parking space P1 is the parking space for parallel parking, using FIG. 20. FIG. 20 is a diagram explaining the parking spaces for the parallel parking. When the vehicle V1 exits the parked state, the position of the adjacent vehicle Vf has changed in a direction away from the vehicle V1 from when the vehicle V1 entered the parked state. When the vehicle V1 exits the parked state, the position of the adjacent vehicle Vg has changed in a direction closer to the vehicle V1 from when the vehicle V1 entered the parked state. In the present embodiment, if the comparing unit 45 determines that the position of the adjacent vehicle in the parking space PF or the parking space PG has changed when the vehicle V1 exits the parked state, the display controller 48 displays the bird's-eye view video 100 on the display panel 31. In this manner, the present embodiment can detect adjacent vehicles in appropriate directions in accordance with the mode of the parking space P1, and, if the position of any of the adjacent vehicles has changed, can display the bird's-eye view video.

The adjacent information acquiring unit 43 has been described to acquire the first obstacle information and the second obstacle information, or the first obstacle position information and the second obstacle position information from the sensor unit 21, but this is not limited thereto. The adjacent information acquiring unit 43 may apply the image processing to the video data acquired by the video data acquiring unit 41, and recognize the obstacles around the vehicle V1 from the photographic subject to acquire information on the obstacles as the first obstacle information and the second obstacle information, or the first obstacle position information and the second obstacle position information.

The first obstacle information or the first obstacle position information has been described to be acquired when the vehicle V1 has moved backward and entered the parked state, but is not limited thereto. As the first obstacle information or the first obstacle position information, information about the obstacles around the vehicle V1 when the vehicle V1 has completed to enter the parked state may be acquired based on information acquired during a parking operation in which the vehicle V1 is moving backward to enter the parked state.

The driver information acquiring unit 43B has been described to acquire the first driver information and the second driver information from the video data captured by the driver's seat camera 21B, but is not limited thereto.

For example, in the tenth embodiment, whether the drivers differ may be determined using identification information acquired from an electronic device, which is owned by the driver, such as a smart key or an information terminal, that has the identification information for identifying an individual. In more detail, for example, the electronic device brought into the vehicle by the driver serves as a driver's seat detector. The driver information acquiring unit 43B may acquire the identification information from the electronic device to acquire the identification information when the vehicle V1 enters the parked state as the first driver information, and the identification information when the vehicle V1 exits the parked state as the second driver information.

Alternatively, for example, in the tenth embodiment, whether the drivers differ may be determined using driver's seat information including at least either one of weight information about the driver's seat or position information indicating a preset position thereof. In more detail, the driver's seat detector is, for example, a weight sensor that detects the driver's seat information including the weight information about a weight that acts on the driver's seat having the driver seated thereon. The driver information acquiring unit 43B may acquire the driver's seat information detected by the weight sensor as the first driver information when the vehicle V1 enters the parked state, and as the second driver information when the vehicle V1 exits the parked state. Alternatively, the driver's seat detector is a sensor that detects the position information indicating the preset position of the driver's seat. The driver information acquiring unit 43B may acquire the position information about the driver's seat detected by the sensor as the first driver information when the vehicle V1 enters the parked state, and as the second driver information when the vehicle V1 exits the parked state. The comparing unit 45B compares the driver's seat information acquired when the vehicle V1 entered the parked state with the driver's seat information acquired when the vehicle V1 exits the parked state to determine whether the driver when the vehicle V1 entered the parked state is the same as the driver when the vehicle V1 exits the parked state.

Alternatively, for example, in the eleventh embodiment, position information about a rearview mirror may serve as the information about the face position of the driver. In more detail, a sensor for detecting the position information about the rearview mirror serves as the driver's seat detector. The driver information acquiring unit 43B may acquire the position information about the rearview mirror detected by the sensor as the first driver information when the vehicle V1 enters the parked state, and as the second driver information when the vehicle V1 exits the parked state.

The first driver information has been described to be acquired when the vehicle V1 has moved backward and entered the parked state, but is not limited thereto. As the first driver information, the information about the obstacles around the vehicle V1 when the vehicle V1 has completed to enter the parked state may be acquired based on information acquired during the parking operation in which the vehicle V1 is moving backward to enter the parked state.

The visibility information acquiring unit 43C has been described to acquire the first visibility information and the second visibility information from the illuminance sensor 21C, but is not limited thereto. The visibility information acquiring unit 43C may apply the image processing to the video data acquired by the video data acquiring unit 41, and recognize the illuminance around the vehicle V1 to acquire the illuminance around the vehicle V1 as the first visibility information and the second visibility information.

If the illuminance when the vehicle V1 exits the parked state is determined to be lower than the illuminance when the vehicle V1 entered the parked state, the bird's-eye view video generator 44C may generate the bird's-eye view video that is increased in visibility based on video data obtained by photographing the periphery of the vehicle V1 using an infrared camera (not illustrated). Alternatively, if the illuminance when the vehicle V1 exits the parked state is determined to be lower than the illuminance when the vehicle V1 entered the parked state, the bird's-eye view video generator 44C may generate the bird's-eye view video that is increased in visibility by applying the image processing to the video data acquired by the video data acquiring unit 41.

While the fourteenth embodiment displays the bird's-eye view video 100 if the visibility when the vehicle V1 exits the parked state has been reduced by the precipitation from when the vehicle V1 entered the parked state, the bird's-eye view video 100 may be displayed when the visibility is reduced by occurrence of fog.

The first visibility information has been described to be acquired when the vehicle V1 has moved backward and entered the parked state, but is not limited thereto. As the first visibility information, the information about the obstacles around the vehicle V1 when the vehicle V1 has completed to enter the parked state may be acquired based on information acquired during the parking operation in which the vehicle V1 is moving backward to enter the parked state.

Furthermore, the vehicle V1 may be determined to have entered the parked state, for example, if the current location of the vehicle is determined to be in a parking lot based on the map information of the navigation system and the current location information about the vehicle, which are not illustrated, if the current location of the vehicle is determined to be in the parking space, or if the current location of the vehicle is determined to be in the parking lot through the application of the image processing to the video data acquired by the video data acquiring unit 41.

A predicted movement direction is a direction when the vehicle V1 exits the parked state in which the vehicle V1 will move after leaving the parking space P1. When the predicted movement direction can be determined, the display controller 48 may display the bird's-eye view video if the position of an adjacent vehicle located on the predicted movement direction side of the vehicle V1 has changed. Assume that the peripheral state of the vehicle V1 when the vehicle V1 exits the parked state is the state illustrated in FIG. 14, and the predicted movement direction of the vehicle V1 is the right direction. Then, the bird's-eye view video is displayed if the position of any of the adjacent vehicles in the parking space PB, the parking space PC, or the parking space PE has changed. The predicted movement direction may be acquired from an arrow or a sign indicating the direction of movement in the parking lot detected by applying the image processing to the video data acquired by the video data acquiring unit 41, or may be acquired from the navigation information.

REFERENCE SIGNS LIST

The present disclosure provides an effect of being capable of appropriately displaying a bird's-eye view video according to a change in a peripheral checking condition when a vehicle exits a parking space.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display control device comprising:
   a video data acquiring unit configured to acquire video data from a plurality of photographing units configured to photograph a periphery of a vehicle;
   a bird's-eye view video generator configured to apply view point conversion processing and synthesis processing to the video data acquired by the video data acquiring unit to generate a bird's-eye view video;
   an information acquiring unit configured to acquire first information regarding a peripheral checking condition for the vehicle when the vehicle has moved backward and entered a parked state and second information regarding the peripheral checking condition for the vehicle when the vehicle moves forward to exit the parked state;

a comparing unit configured to compare the first information with the second information to acquire a change in the peripheral checking condition between when the vehicle entered the parked state and when the vehicle exits the parked state; and a display controller configured to display the bird's-eye view video generated by the bird's-eye view video generator on a display unit when the vehicle exits the parked state, when the comparing unit determines that the peripheral checking condition has changed when the vehicle exits the parked state, wherein the information acquiring unit is configured to acquire, as the first information, first driver information about a driver when the vehicle has moved backward and entered the parked state, and acquire, as the second information, second driver information about the driver when the vehicle moves forward to exit the parked state, the comparing unit is configured to compare the first driver information with the second driver information to compare the driver between when the vehicle entered the parked state and when the vehicle exits the parked state, the comparing unit is configured to determine that the driver when the vehicle entered the parked state differs from the driver when the vehicle exits the parked state, and the display controller is configured to display the bird's-eye view video generated by the bird's-eye view video generator on the display unit when the vehicle exits the parked state, when the comparing unit determines that the second driver information acquired when the vehicle exits the parked state differs from the first driver information.

2. The display control device according to claim 1, wherein the information acquiring unit is configured to acquire, as the first information, first obstacle information serving as information about obstacles around the vehicle when the vehicle has moved backward and entered the parked state, and acquire, as the second information, second obstacle information serving as the information about the obstacles around the vehicle when the vehicle moves forward to exit the parked state, the comparing unit is configured to compare the first obstacle information with the second obstacle information to determine whether a number of obstacles around the vehicle has increased when the vehicle exits the parked state, and the display controller is configured to display the bird's-eye view video generated by the bird's-eye view video generator on the display unit when the vehicle exits the parked state, when the comparing unit determines that the number of obstacles around the vehicle has increased when the vehicle exits the parked state.

3. The display control device according to claim 2, wherein the information acquiring unit is configured to acquire, as the first obstacle information, information about adjacent vehicles adjacent to the vehicle when the vehicle has moved backward and entered the parked state, and acquire, as the second obstacle information, information about adjacent vehicles adjacent to the vehicle when the vehicle moves forward to exit the parked state, the comparing unit is configured to compare the first obstacle information with the second obstacle information to determine whether a number of adjacent vehicles has increased when the vehicle exits the parked state, and the display controller is configured to display the bird's-eye view video generated by the bird's-eye view video generator on the display unit, when the comparing unit determines that the number of adjacent vehicles has increased when the vehicle exits the parked state.

4. The display control device according to claim 3, wherein the comparing unit is configured to compare existence or nonexistence of vehicles in adjacent parking spaces when the vehicle entered the parked state with existence or nonexistence of vehicles in the adjacent parking spaces when the vehicle exits the parked state, and the display controller is configured to display the bird's-eye view video generated by the bird's-eye view video generator on the display unit when the vehicle exits the parked state, when the comparing unit determines that no vehicles were present in the adjacent parking spaces when the vehicle entered the parked state and a vehicle is present in the adjacent parking spaces when the vehicle exits the parked state.

5. The display control device according to claim 1, wherein the information acquiring unit is configured to acquire, as the first information, first obstacle position information including position information about obstacles around the vehicle when the vehicle has moved backward and entered the parked state, and acquire, as the second information, second obstacle position information including the position information about the obstacles around the vehicle when the vehicle moves forward to exit the parked state, the comparing unit is configured to compare the first obstacle position information with the second obstacle position information to acquire a change in position of any one of the obstacles between when the vehicle entered the parked state and when the vehicle exits the parked state, and the display controller is configured to display the bird's-eye view video generated by the bird's-eye view video generator on the display unit when the vehicle exits the parked state, when the comparing unit determines that the obstacle has changed in position when the vehicle exits the parked state.

6. The display control device according to claim 5, wherein the information acquiring unit is configured to acquire, as the first obstacle position information, information including position information about adjacent vehicles adjacent to the vehicle when the vehicle has moved backward and entered the parked state, and acquire, as the second obstacle position information, information including the position information about the adjacent vehicles adjacent to the vehicle when the vehicle moves forward to exit the parked state, the comparing unit is configured to compare the first obstacle position information with the second obstacle position information to determine whether any one of the adjacent vehicles has changed in position between when the vehicle entered the parked state and when the vehicle exits the parked state, and the display controller is configured to display the bird's-eye view video generated by the bird's-eye view video generator on the display unit, when the comparing unit determines that the adjacent vehicle has changed in position when the vehicle exits the parked state.

7. The display control device according to claim 6, wherein the comparing unit is configured to compare the first obstacle position information with the second obstacle position information to determine whether any one of the adjacent vehicles has changed in position in a direction closer to the vehicle when the vehicle exits the parked state, and the display controller is configured to display the bird's-eye view video generated by the bird's-eye view video generator on the display unit when the vehicle exits the parked state, when the comparing unit determines that the position of the adjacent vehicle when the vehicle exits the parked state has changed in the direction closer to the vehicle from the position of the adjacent vehicle when the vehicle entered the parked state.

8. The display control device according to claim 6, wherein the comparing unit is configured to compare the first obstacle position information with the second obstacle position information to determine whether any one of the adjacent vehicles has changed in position in an exiting direction of the vehicle when the vehicle exits the parked state, and the display controller is configured to display the bird's-eye view video generated by the bird's-eye view video generator on the display unit when the vehicle exits the parked state, when the comparing unit determines that the position of the adjacent vehicle when the vehicle exits the parked state has changed in the direction in the exiting direction of the vehicle from the position of the adjacent vehicle when the vehicle entered the parked state.

9. The display control device according to claim 1, wherein the information acquiring unit is configured to cause a driver's seat detector disposed on a driver's seat for detecting information capable of recognizing the driver to acquire information recognizing the driver when the vehicle enters the parked state as the first driver information, and acquire information recognizing the driver when the vehicle exits the parked state as the second driver information, the comparing unit is configured to compare the information recognizing the driver when the vehicle entered the parked state with the information recognizing the driver when the vehicle exits the parked state to determine whether the driver when the vehicle entered the parked state is the same as the driver when the vehicle exits the parked state, and the display controller is configured to display the bird's-eye view video on the display unit, when the comparing unit determines that the driver when the vehicle entered the parked state differs from the driver when the vehicle exits the parked state.

10. The display control device according to claim 1, wherein the information acquiring unit is configured to acquire information about a face position of the driver when the vehicle enters the parked state as the first driver information, and acquire information about the face position of the driver when the vehicle exits the parked state as the second driver information, the comparing unit is configured to compare the face position of the driver when the vehicle entered the parked state with the face position of the driver when the vehicle exits the parked state to determine whether a difference in position of a predetermined distance or longer is present in an up-down direction between the face position of the driver when the vehicle entered the parked state and the face position of the driver when the vehicle exits the parked state, and the display controller is configured to display the bird's-eye view video on the display unit, when the comparing unit determines that the face position of the driver when the vehicle exits the parked state is lower than the face position of the driver when the vehicle entered the parked state by a predetermined distance or longer.

11. The display control device according to claim 9, wherein the information acquiring unit is configured to acquire driver's seat information when the vehicle enters the parked state as the first driver information and the driver's seat information when the vehicle exits the parked state as the second driver information, the driver's seat information being detected by the driver's seat detector and including at least either one of weight information about a weight that acts on the driver's seat of the vehicle when having the driver seated thereon and position information about the driver's seat, and the comparing unit is configured to compare the driver's seat information acquired when the vehicle entered the parked state with the driver's seat information acquired when the vehicle exits the parked state to make the determination.

12. The display control device according to claim 1, wherein the information acquiring unit is configured to acquire, as the first information, first visibility information serving as information indicating visibility around the vehicle when the vehicle has moved backward and entered the parked state, and acquire, as the second information, second visibility information serving as the information indicating the visibility around the vehicle when the vehicle moves forward to exit the parked state, the comparing unit is configured to compare the first visibility information with the second visibility information to compare the visibility around the vehicle between when the vehicle entered the parked state and when the vehicle exits the parked state, and the display controller is configured to display the bird's-eye view video generated by the bird's-eye view video generator on the display unit when the vehicle exits the parked state, when the comparing unit determines that the visibility in the second visibility information acquired when the vehicle exits the parked state is lower than that in the first visibility information.

13. The display control device according to claim 12, wherein the information acquiring unit is configured to acquire illuminance information around the vehicle when the vehicle enters the parked state as the first visibility information and the illuminance information around the vehicle when the vehicle exits the parked state as the second visibility information, the comparing unit is configured to compare the illuminance around the vehicle when the vehicle entered the parked state with the illuminance around the vehicle when the vehicle exits the parked state to determine whether the illuminance when the vehicle exits the parked state is lower than the illuminance when the vehicle entered the parked state, and the display controller is configured to display the bird's-eye view video on the display unit, when the comparing unit determines that the illuminance when the vehicle exits the parked state is lower than the illuminance when the vehicle entered the parked state.

14. The display control device according to claim 13, wherein the comparing unit is configured to compare the illuminance around the vehicle when the vehicle entered the parked state with the illuminance around the vehicle when the vehicle exits the parked state to determine whether the illuminance when the vehicle entered the parked state differs from the illuminance when the vehicle exits the parked state by a predetermined value or more, and the display controller is configured to display the bird's-eye view video on the display unit, when the comparing unit determines that the illuminance when the vehicle entered the parked state differs from the illuminance when the vehicle exits the parked state by the predetermined value or more.

15. The display control device according to claim 12, wherein the information acquiring unit is configured to acquire information indicating weather at a current location when the vehicle enters the parked state as the first visibility information and the information indicating the weather at the current location when the vehicle exits the parked state as the second visibility information, the comparing unit is configured to compare the weather at the current location when the vehicle entered the parked state with the weather at the current location when the vehicle exits the parked state to determine whether the visibility when the vehicle exits the parked state has been reduced by precipitation from when the vehicle entered the parked state, and the display controller is configured to display the bird's-eye view video on the display unit, when the comparing unit determines that the visibility when the vehicle exits the parked state has been reduced by the precipitation from when the vehicle entered the parked state.

16. The display control device according to claim 12, wherein the information acquiring unit is configured to acquire information indicating a frozen state of window glass of the vehicle when the vehicle enters the parked state as the first visibility information and the information indicating the frozen state of the window glass when the vehicle exits the parked state as the second visibility information, the comparing unit is configured to compare the information indicating the frozen state of the window glass of the vehicle when the vehicle entered the parked state with the information indicating the frozen state of the window glass when the vehicle exits the parked state to determine whether the visibility when the vehicle exits the parked state has been reduced by the freezing of the window glass from when the vehicle entered the parked state, and the display controller is configured to display the bird's-eye view video on the display unit, when the comparing unit determines that the visibility when the vehicle exits the parked state has been reduced by the freezing of the window glass from when the vehicle entered the parked state.

17. A display control system comprising:

the display control device as claimed in claim 1; and at least either of a plurality of photographing units from which the video data acquiring unit acquires video data and a display unit on which the display controller displays a bird's-eye view video.

18. A display control method comprising:

a video data acquiring step of acquiring video data from a plurality of photographing units that photograph a periphery of a vehicle;

a bird's-eye view video generating step of applying view point conversion processing and synthesis processing to the video data acquired at the video data acquiring step to generate a bird's-eye view video;

an adjacent information acquiring step of acquiring first information regarding a peripheral checking condition for the vehicle when the vehicle has moved backward and entered a parked state and second information regarding the peripheral checking condition for the vehicle when the vehicle moves forward to exit the parked state;

a comparing step of comparing the first information with the second information to acquire a change in the peripheral checking condition between when the vehicle entered the parked state and when the vehicle exits the parked state; and a display control step of displaying the bird's-eye view video generated at the bird's-eye view video generating step on a display unit when the vehicle exits the parked state, when the comparing step determines that the peripheral checking condition has changed when the vehicle exits the parked state, wherein the adjacent information acquiring step acquires, as the first information, first driver information about a driver when the vehicle has moved backward and entered the parked state, and acquires, as the second information, second driver information about the driver when the vehicle moves forward to exit the parked state, the comparing step compares the first driver information with the second driver information to compare the driver between when the vehicle entered the parked state and when the vehicle exits the parked state, the comparing step determines that the driver when the vehicle entered the parked state differs from the driver when the vehicle exits the parked state, and the display control step displays the bird's-eye view video generated by the bird's-eye view video generator on the display unit when the vehicle exits the parked state, when the comparing step determines that the second driver information acquired when the vehicle exits the parked state differs from the first driver information.

19. A non-transitory computer readable recording medium storing therein a program for causing a computer that operates as a display control device to execute:

a video data acquiring step of acquiring video data from a plurality of photographing units that photograph a periphery of a vehicle;

a bird's-eye view video generating step of applying view point conversion processing and synthesis processing to the video data acquired at the video data acquiring step to generate a bird's-eye view video;

an adjacent information acquiring step of acquiring first information regarding a peripheral checking condition for the vehicle when the vehicle has moved backward and entered a parked state and second information regarding the peripheral checking condition for the vehicle when the vehicle moves forward to exit the parked state;

a comparing step of comparing the first information with the second information to acquire a change in the peripheral checking condition between when the vehicle entered the parked state and when the vehicle exits the parked state; and a display control step of displaying the bird's-eye view video generated at the bird's-eye view video generating step on a display unit when the vehicle exits the parked state, when the comparing step determines that the peripheral checking condition has changed when the vehicle exits the parked state, wherein the adjacent information acquiring step acquires, as the first information, first driver information about a driver when the vehicle has moved backward and entered the parked state, and acquires, as the second information, second driver information about the driver when the vehicle moves forward to exit the parked state, the comparing step compares the first driver information with the second driver information to compare the driver between when the vehicle entered the parked state and when the vehicle exits the parked state, the comparing step determines that the driver when the vehicle entered the parked state differs from the driver when the vehicle exits the parked state, and the display control step displays the bird's-eye view video generated by the bird's-eye view video generator on the display unit when the vehicle exits the parked state, when the comparing step determines that the second driver information acquired when the vehicle exits the parked state differs from the first driver information.

\* \* \* \* \*